US010114609B2

(12) United States Patent
Annett et al.

(10) Patent No.: US 10,114,609 B2
(45) Date of Patent: Oct. 30, 2018

(54) COMPUTING INTERFACE FOR USERS WITH DISABILITIES

(71) Applicant: Opportunity Partners Inc., Minnetonka, MN (US)

(72) Inventors: Douglas John Annett, Minneapolis, MN (US); Adam Wayne Grise, Brooklyn Center, MN (US); Donald J. Flower, II, Maple Grove, MN (US)

(73) Assignee: Opportunity Partners Inc., Minnetonka, MN (US)

( * ) Notice: Subject to any disclaimer, the term of this patent is extended or adjusted under 35 U.S.C. 154(b) by 222 days.

(21) Appl. No.: 15/044,955

(22) Filed: Feb. 16, 2016

(65) Prior Publication Data

US 2016/0162179 A1  Jun. 9, 2016

Related U.S. Application Data

(63) Continuation-in-part of application No. 13/843,026, filed on Mar. 15, 2013, now Pat. No. 9,262,068.

(60) Provisional application No. 61/653,897, filed on May 31, 2012.

(51) Int. Cl.
*G06F 3/0488* (2013.01)
*G06F 3/01* (2006.01)
*G06F 3/16* (2006.01)

(52) U.S. Cl.
CPC .............. *G06F 3/167* (2013.01); *G06F 3/011* (2013.01); *G06F 3/017* (2013.01); *G06F 3/0488* (2013.01)

(58) Field of Classification Search
CPC ........ G06F 3/0488; G06F 3/011; G06F 3/017; G06F 3/167
See application file for complete search history.

(56) References Cited

U.S. PATENT DOCUMENTS

| 8,659,548 | B2 | 2/2014 | Hildreth | |
|---|---|---|---|---|
| 8,818,027 | B2 | 8/2014 | Forutanpour et al. | |
| 2005/0166163 | A1 | 7/2005 | Chang et al. | |
| 2006/0053372 | A1* | 3/2006 | Adkins | G06F 9/4446 715/709 |
| 2007/0159453 | A1 | 7/2007 | Inoue | |
| 2007/0208568 | A1* | 9/2007 | Blanchard | H04M 3/4936 704/270 |
| 2009/0079813 | A1* | 3/2009 | Hildreth | H04N 7/147 348/14.03 |
| 2009/0167677 | A1* | 7/2009 | Kruse | A63B 24/0062 345/156 |
| 2011/0164029 | A1 | 7/2011 | King et al. | |

(Continued)

OTHER PUBLICATIONS

'Delft University of Technology,' [online]. "Research into fair-weather clouds important in climate predictions," Dec. 4, 2008, [retrieved on Dec. 26, 2013]. Retrieved from the Internet: <URL:http://www.tudelft.nl/en/current/latest-news/article/detail/onderzoek-naar-mooiweerwolken-belangrijk-voor-klimaatvoorspellingen/>, 2 pages.

(Continued)

*Primary Examiner* — Charles Hicks
(74) *Attorney, Agent, or Firm* — Fish & Richardson P.C.

(57) ABSTRACT

Computer-implemented techniques, systems, devices, and program products for providing user interfaces that are adapted for users with disabilities. For example, user interfaces, such as touchscreen user interfaces, can be provided through which users with disabilities can learn to perform various tasks.

20 Claims, 46 Drawing Sheets

(56) References Cited

U.S. PATENT DOCUMENTS

2012/0299876 A1  11/2012  De Leon et al.
2013/0100277 A1   4/2013  Prieto Loefkrantz et al.
2013/0257748 A1  10/2013  Ambrus et al.

OTHER PUBLICATIONS

Leibe et al., "Towards Spontaneous Interaction with the Perceptive Workbench, a Semi-Immersive Virtual Environment," GVU Center, Georgia Institute of Technology, 2000, 16 pages.
Waterworth, "3 Medical VR: the main application areas and what has been done," Informatik, Jul. 1999, 24 pages.

\* cited by examiner

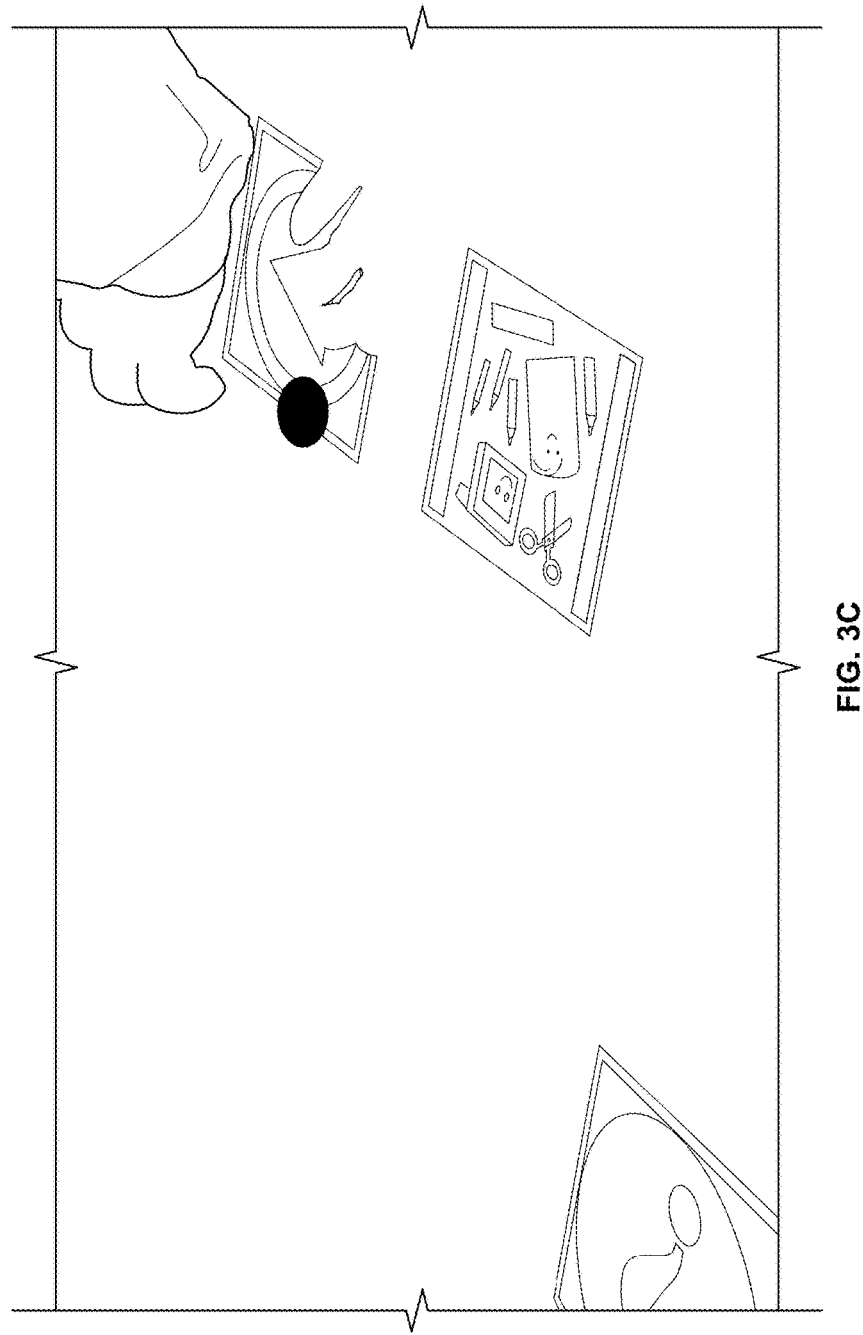

COMPUTING INTERFACE FOR USERS WITH DISABILITIES

CROSS-REFERENCE TO RELATED APPLICATIONS

This application is a continuation-in-part of U.S. application Ser. No. 13/843,026 (to be issued as U.S. Pat. No. 9,262,068), filed on Mar. 15, 2013, which claims the benefit of priority under 35 U.S.C. § 119(e) to U.S. Provisional Application Ser. No. 61/653,897, which was filed on May 31, 2012. The entire contents of which are incorporated herein by reference.

TECHNICAL FIELD

This document generally describes computer-based technology for providing an interactive visual interface on a surface.

BACKGROUND

Computer-based technologies have been developed to detect physical movements of users without the aid of special electronic devices, such as remote controllers containing motion sensing technology, being held or otherwise used by the users. For instance, depth sensors have been developed to determine the x, y, and z coordinates ("3D coordinates") of physical objects that are located in front of the depth sensors. The MICROSOFT KINECT input device is one example of such a depth sensor. The MICROSOFT KINECT uses an infrared laser projector and a monochrome CMOS sensor to determine 3D coordinates of objects in real time.

Computing devices have been developed to incorporate touchscreen technology and user interfaces have been designed with touchscreen input in mind. For example, desktop and laptop computing devices have been developed with touchscreen monitors through which inputs can be received and operating systems, such as MICROSOFT WINDOWS, have been designed to use inputs from touchscreen monitors. In another example, mobile computing devices (e.g., smartphones, tablets) have been developed with touchscreen interfaces, such as the MICROSOFT SURFACE tablet computer with MICROSOFT WINDOWS which includes a touchscreen interface.

SUMMARY

This document generally describes computer-based technology for providing an interactive interface on a surface, such as a desk, countertop, a table, a work surface, an object (e.g., refrigerator, stove top, machine surface), a wall, the floor, and/or any other surface onto which an image can be projected and visible with sufficient clarity. The interactive interface can be provided on surfaces that may not include any electronic sensors or display screens—the interactive interface can be provided on a standard surface made out of wood, plastic, stone, and/or any other appropriate material. The interactive interface can be provided using a projector that is mounted above/in-front of the target surface and that is configured to project images onto the target surface. The projector can receive information to visually project onto a surface from one or more computing devices, which can be programmed to interpret user motion and/or gestures with regard to the interface projected onto the surface. Such one or more computing devices can obtain information regarding user motion and/or gestures using one or more depth sensors that are configured to detect the user and his/her motions in three-dimensional ("3D") space. Depth sensors can be aimed in a direction that is substantially parallel (along at least one axis) to a surface so as to detect the motions of a user standing before the surface.

In one implementation, a computer-implemented method includes accessing, by a computing device, a real-time three dimensional ("3D") image of at least a portion of a user who is standing in front a surface, wherein the 3D image is obtained using one or more depth sensors that are directed horizontally at the user and substantially parallel to the surface; identifying, by the computing device, coordinates in 3D space for at least one appendage of the user from the 3D image, wherein the coordinates are in 3D space relative to a vantage point of the depth sensor; determining, by the computing device, a position of the at least one appendage of the user over the surface based on the coordinates of the at least one appendage in 3D space; determining whether the position of the appendage is within one or more active areas of the surface; and based on the determination of whether the appendage is within the one or more active areas of the surface, updating a visual image that is being projected onto the surface by a projector that is located above the surface.

The method can include one or more of the following features. The one or more active areas can be indicated in the visual image that is being projected onto the surface by the projector. The one or more active areas can include one or more icons that are projected onto the surface. The appendage can be determined to be within the one or more active areas when the appendage is located over the one or more active areas for at least a threshold period of time indicating a selection of the one or more active areas. The surface can be a table that does not include electronic sensors. The 3D image can include a 3D wireframe model of the user in 3D space. The at least one appendage can include an arm of the user. Updating the visual image can include causing a menu of selectable options to be projected onto the surface. The menu of selectable options can include i) an order option that, selection of which, will cause an interface through which the user can order components to be projected onto the surface, ii) a task option that, selection of which, will cause an interface through which the use can view instructions for performing one or more tasks at the surface, and iii) a help option that, selection of which, will cause a help request to be provided to a supervisor. Updating the visual image can include causing a video to be projected onto the surface, wherein the video depicts one or more tasks that can be performed at the surface. The method can also include identifying a scale to be applied to the video based, at least in part, on a distance between the projector and the surface; and applying the scale to the video, causing the video to be projected on the surface in a size so that objects depicted in the video are substantially the same size as physical objects that are located on the surface.

In another implementation, system includes a depth sensor that is positioned horizontally and that is programmed to provide three dimensional ("3D") images of objects; a projector that is positioned to project an image onto a horizontal surface; and a computing device that is programmed to i) correlate, using the 3D images, 3D positioning of the objects relative to the depth sensor to particular locations over the surface, and ii) update the image that is projected onto the surface by the projector based on the particular locations over the surface.

The system can include one or more of the following features. For example, the system can include a mounting rack to which the depth sensor, the projector, and the surface are mounted. The mounting rack can include i) a bracket that mounted to the surface, ii) a support affixed at a first end to the bracket and extending vertically from the bracket to a second end, iii) a projector mount extending from the support near or at the second end of the support, and iv) a depth sensor mount affixed to the support that is positioned along the support between the bracket and the projector mount. The support can include a first portion and a second portion, the first portion extending vertically from the first end and the second portion curving from or being at an angle relative to the first portion so as to extend over a surface to which the bracket is mounted. The projector mount can be affixed to the support at an angle that is between perpendicular and 45 degrees, inclusive, relative to the surface. The depth sensor mount can be affixed to the support at an angle that is substantially parallel to the surface.

In another implementation, a computer-implemented method includes accessing, by a computing device, a real-time three dimensional ("3D") image of at least a portion of a user who is located in front of one or more depth sensors; determining, by the computing device, an identity for the user based on the 3D image and a repository of user profiles; determining whether the user is permitted to be located in an area that includes the one or more depth sensors based on the determined identity for the user and list of approved users; and providing, by the computing device based on the determination of whether the user is permitted to be located in the area, a message indicating that the user is present in the area. The list of approved users can include a list of users who are approved to visit a particular user in the area.

In another implementation, A computer-implemented method includes accessing, by a computing device, a real-time three dimensional ("3D") image of at least a portion of a user who is located in front of one or more depth sensors; identifying, by the computing device using the 3D image, i) a position of the user's head relative to the user's shoulders and ii) an angle of the user's shoulders relative to the ground; determining whether the position includes the user's head being located above the user's shoulders and the angle includes the user's shoulder's being substantially parallel to the ground; based on the determining, monitoring for changes to the position of the user's head and changes to the angle of the user's shoulders; and in response to detecting a change within a threshold period of time from i) the position and angle of the user's head and shoulders to ii) the user's head being located below at least one of the user's shoulders and the user's shoulders being within a threshold angle of being perpendicular to the ground, providing a notification that the user has fallen.

In another implementation, a computer-implemented method includes receiving, at a computing device with a touchscreen display, first user input that selects a particular interactive presentation from among a plurality of interactive presentations, wherein each of the plurality of interactive presentations provides step by step instructions on how to perform a task in a user interface that is configured for users with disabilities; accessing, by the computing device and in response to receiving the first user input, content for the particular interactive presentation and rules for presenting the user interface in a manner that is configured for users with disabilities; identifying, by the computing device and from the content, materials for performing a particular task that depicted in the particular interactive presentation, wherein the materials are associated with, at least, (i) digital images that depict the materials and (ii) first text that corresponds to names for the materials; identifying, by the computing device and from the content, information identifying steps for the particular interactive presentation, wherein the steps are associated with (i) videos depicting the steps, (ii) second text describing the steps, and (iii) warning codes that identify potential dangers associated with the steps; accessing, by the computing device, (i) the digital images, (ii) the first text, (iii) the videos, (iv) the second text, and (v) the warning codes; identifying, by the computing device and based on the rules, a minimum image size for the digital images, a minimum video size for the videos, a minimum spacing between the visual elements in the user interface, and a minimum font size for the first text; displaying, by the computing device and in a first screen of the user interface, (i) the digital images sized according to the minimum image size and arranged apart from each other by at least the minimum spacing, (ii) the first text using the minimum font size and adjacent to and separated from corresponding ones of the digital images with at least the minimum spacing, and (iii) a selectable button to begin the particular presentation separated from the digital images and the first text by at least the minimum spacing, wherein the digital images are presented in association with selectable areas on the touchscreen display; receiving, through the touchscreen display of the computing device, a selection of the selectable button; displaying, by the computing device and in a second screen of the user interface, (i) a first video, from the videos, with at least the minimum video size, (ii) a portion of the second text corresponding to the first video, (iii) a warning image associated with a warning code for the first video, and (iv) a return button to return to a first step of the particular interactive presentation; receiving, through the touchscreen display of the computing device, a selection of an area on the touchscreen corresponding to the first video; and playing, on the touchscreen display of the computing device and in response to the selection of the area on the touchscreen, the first video.

The details of one or more embodiments are set forth in the accompanying drawings and the description below. Various advantages can be provided by the disclosed systems and methods. For example, users can be provided with an interactive interface that is displayed on top of a non-interactive surface (e.g., wooden table, kitchen counter, desk), which can allow users to perform interactive tasks at the surface, like ordering more physical supplies for a work station with a work surface, requesting help from a supervisor, and learning how to perform jobs at the work station through instructions and videos projected onto the surface. This can provide easier use, can allow a user to be more independent, and can use less direct supervision by others. Users can also benefit by being able to use their hands to interact with the interface, making the interface more intuitive and requiring less training for users to operate. Users with physical and/or developmental disabilities can especially benefit from this technology by allowing users to operate a work station more independently.

As opposed to using touch sensitive surfaces (e.g., work stations with capacitive touchscreens), this technology can be implemented at less cost and can include less associated long term maintenance. For example, tasks performed at a work station with a work surface may be messy and may involve using sharp tools. Overtime a touch sensitive work surface may have poor performance as a result of such tasks. In contrast, with the described technology a standard, non-interactive surface can be used, like wood or plastic. If the surface becomes damaged overtime, the surface can be replaced at a cost that is much less than a touch sensitive surface.

In other example, presentation rules can be used so that visual elements are presented on a user interface, such as a touchscreen user interface, in a manner that maximizes both the limited space on the screen and the usability of the interface by users with disabilities. Touchscreen user interfaces, which can be implemented on smaller form factor devices, like smartphones and tablets, can present a technical problem in that they have limited screen space to display and receive inputs, particularly with users who may have impaired vision and/or motor skills. User interfaces described in this document can provide technical solutions by presenting particular arrangements, organizations, spacing, input mechanisms, output mechanisms, and other features that allow for such smaller form factor devices to be customized and used in non-conventional ways.

As discussed in greater detail below, 3D images (e.g., 3D wireframe models of users) obtained from depth sensors can be used to identify individuals based on their physical profile and/or movements. For instance, a first user can have a 3D profile that is different (e.g., different spacing between joints and parts of the body) than a second user. A computer system can identify users based on 3D images obtained from one or more depth sensors and stored 3D profiles for users, and can determine whether the identified users are permitted to be in a particular area based on designated white and/or black lists. For instance, a user who is vulnerable (e.g., an elderly user, a user with a developmental disability) and living alone can have depth sensors mounted throughout their house and can have a computing device that is configured to identify users in various portions of the house based on 3D images provided by the depth sensors. When an unpermitted user is identified as being in the house (e.g., the user is on a blacklist, the user is not on a preapproved whitelist, the user is unidentified), the computing device can provide a notification to a party outside the user's home, such as to a social worker or to the police. These features can allow users to live independently with greater safety and security.

Also discussed in greater detail below, 3D images obtained from depth sensors can be used to detect when a user has fallen. For instance, if a user transitions from standing (e.g., head above shoulders with the shoulders substantially parallel to the ground) to falling (e.g., head below at least one of the shoulders and shoulders within a threshold angle of perpendicular to the ground) within a threshold period of time (e.g., within 0.1 seconds, within 0.25 second, within 0.5 second, within 0.75 second, within 1.0 second, within 1.5 second, within 5.0 seconds), a notification can provided to an external party, such as to medical professionals (e.g., nurse, emergency medical technicians) and/or to the police. These features can help users, especially those at risk of falling, live and work more independently. Additionally, this can provide alerts for users who have fallen regardless of whether they are able to trigger an alert after they have fallen (e.g., provide voice commands to a system, pull a cord, push a button for a remote).

As further discussed in detail below, an interactive interface displayed on top of a non-interactive surface can allow users to work more independently and productively. Workers with physical and/or developmental disabilities may especially benefit from this technology by allowing them to operate a work station more independently. Workers who may have difficulty using traditional inputs (e.g., keyboards, mice, styluses) that require fine motor skills to operate effectively can benefit from the broad spatial selection capability of the interactive interface. These workers may achieve greater efficiencies and may require less overhead or direct supervision. Users may additionally benefit by being able to use their hands to interact with the interface through touching pictures, buttons, words, or icons to make intuitive selections, request assistance, enter commands, etc. as they complete tasks at their work station. This intuitive interaction capability may also reduce the amount and cost of worker training.

Other features, objects, and advantages of the invention will be apparent from the description and drawings, and from the claims.

DESCRIPTION OF DRAWINGS

FIGS. 3A-E are screenshots of an example system for providing an interactive interface on a surface.

Like reference symbols in the various drawings indicate like elements.

DETAILED DESCRIPTION

This document generally describes computer-based technologies for providing an interactive interface on a traditionally non-interactive surface, such as a desk, a table, a countertop, a wall, and/or a floor.

Figure 1:
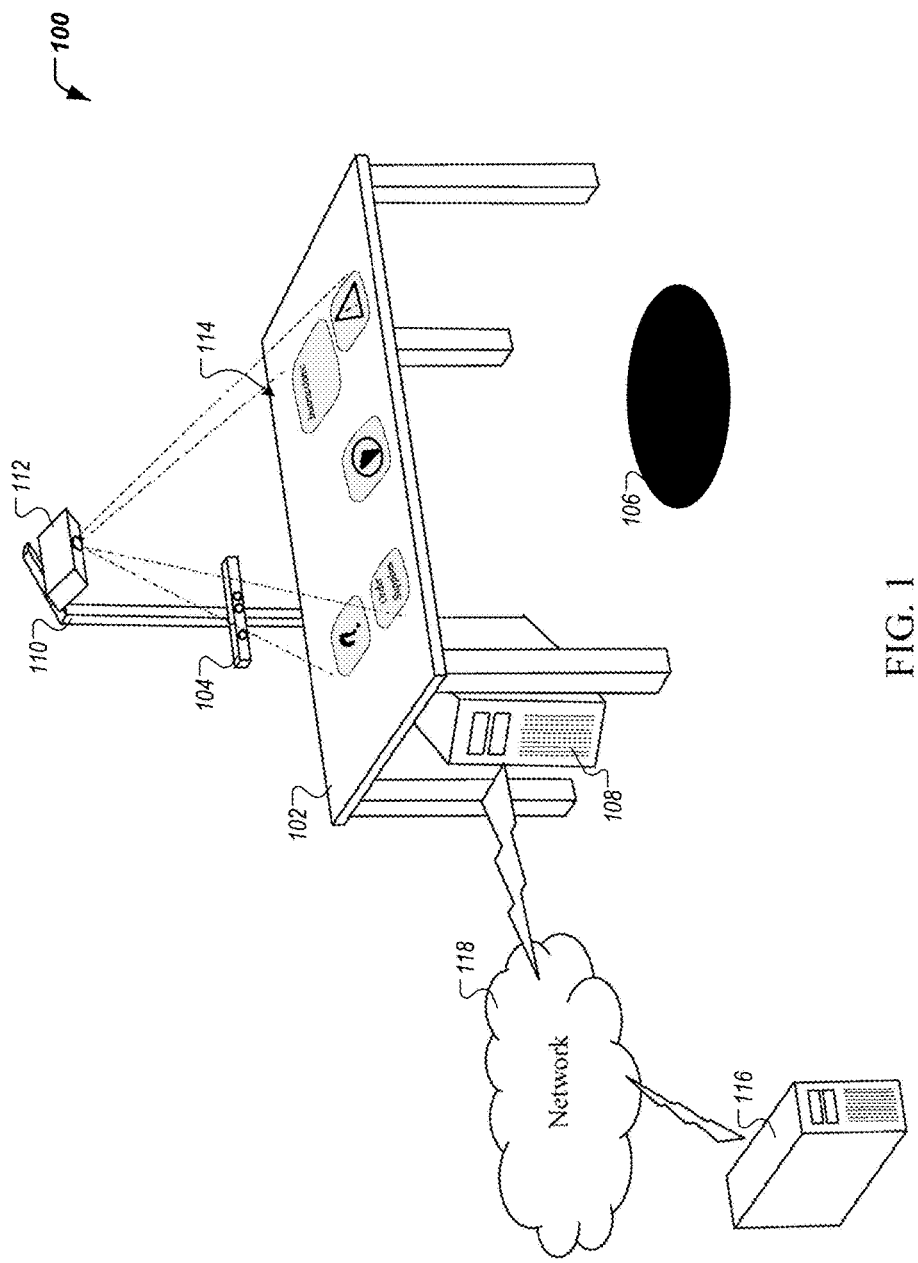
FIG. 1 depicts an example system for providing an interactive interface on a surface.

FIG. 1 depicts an example system 100 for providing an interactive interface on a traditionally non-interactive surface 102. The example surface 102 can be any of a variety of appropriate non-interactive surfaces, such as a table, a desk, a counter top, an object (e.g., a refrigerator), a wall, a floor, and/or any other surface onto which a projected image will be sufficiently visible to a user. The surface 102 can be made out of materials that are sufficiently strong to sustain work activities, such as wood, plastic, glass, and/or metal. The surface 102 can be an ordinary/standard surface and need not include any sensors or display devices, such as capacitive touch sensors and/or touchscreen surfaces.

The example system 100 includes a depth sensor 104 that identifies the contours of objects in 3D space located in front of the sensor 104. For example, the depth sensor 104 is aimed such that it would detect the contours of a user standing at location 106, which is in front of the surface 102. The depth sensor 104 can be any of a variety of appropriate depth sensors, such as the MICROSOFT KINECT sensor. The depth sensor 104 can provide data that indicates the location of various objects in 3D space, such as x, y, and z coordinates relative to the location of the depth sensor 104. The depth sensor 104 can detect 3D data at various rates, such as 10 frames/second, 20 frames/second, 35 frames/second, 50 frames/second, and/or 100 frames/second. In some implementations, the depth sensor 104 identifies parts of a user's body, such as the user's joints and limbs, and provides a 3D wireframe model of the user. In some implementations, a separate computing device interprets data from the depth sensor 104 and, using the data, generates a 3D wireframe model of a user.

The 3D data and/or 3D wireframe model can be provided by the depth sensor 104 to a computing device 108. The computing device 108 can be any of a variety of appropriate computing devices, such as a desktop computer, a laptop computer, a small form factor computing device, and/or video game console. The computing device 108 can use the information obtained from the depth sensor 104 to correlate the 3D positions of portions of a user's body, such as the user's arms, hands, fingers, and/or legs, to locations on the surface 102. To perform such correlations, the computing device 108 may use information that identifies the location of the depth sensor 104 relative to a location of the surface 102 (e.g., 4 inches above the surface 102 and 2 inches from the near edge of the surface 102) and/or information that identifies the size of the surface 102 (e.g., 4 feet by 8 feet). For example, the computing device 108 can use the data provided by the depth sensor 104 to determine where over the surface 102 the user's hands are located. As indicated in FIG. 1, the surface 102 can be substantially parallel (e.g., within 5 degrees, 10 degrees, 15 degree, 30 degrees, etc. of parallel with regard to at least one axis in 3D space) to the general direction at which the depth sensor 104 is aimed (e.g., the surface 102 is horizontal and the depth sensor 104 is generally aimed at the location 106 in a horizontal direction).

Based on the detected locations of the user's hands relative to the surface 102, the computing device 108 can determine whether the user has selected any active areas of the interactive interface that is projected onto the surface 102. The active areas of the surface can be identified by icons that are projected onto the surface 102 by a projector 112 that is mounted above/in-front of the surface 102 by a support 110. For instance, in the example depicted in FIG. 1 the projector 112 is projecting an image 114 onto the surface 102 that includes selectable action areas such as the question mark action area, the "order supplies" action area, the play button action area, the instructions action area, and the warning action area. A user can select these options in any of a variety of ways, such as by placing their hand over the action area for at least a threshold period of time (e.g., one second, two second, three seconds). Selection of the action area can cause a corresponding action to be performed, such as providing a sub-menu of additional options and corresponding action areas, transmitting an order for additional supplies, playing a video that depicts the steps for performing tasks at the surface 102, displaying textual instructions for performing tasks at the surface 102, and/or requesting help from a supervisor. Input in the form of user motion and gestures is received through the depth sensor 104, analyzed by the computing device 108, and corresponding output, such as playing a video, is projected onto the surface 102 by the projector 112.

The computing device 108 can additionally communicate with one or more other computing devices 116 through one or more communication networks 118 (e.g., local area network (LAN), wide area network (WAN), virtual private network (VPN), Wi-Fi network, the Internet, 3G/4G network, cellular network, or any combination thereof). For example, if the user selects an option to order supplies through the interface projected onto the surface 102, the computing device 108 can transmit a request for additional supplies to an appropriate other computing device, such as the computing device 116.

In addition to receiving input through a user moving and/or gesturing with his/her hands and arms, the computing device 108 can obtain user input based on movement of other parts of a user's body. For example, the 3D data provided by the depth sensor 104 to the computing device 108 can include sufficient detail for the computing device 108 to detect blinking, facial expressions, and/or other small movements of a user's head or other body parts. The computing device 108 can interpret such small movements as forms of input—permitting a user with limited ability to move their body, such as a quadriplegic, to provide motion-based input. In a simplified example, the computing device 108 may interpret a single blink as a "no" input and two blinks occurring within a threshold period of time (e.g., one second) as a "yes" input. Similarly, the computing device 108 may interpret a user shaking his/her head laterally as a "no" input and vertically as a "yes" input. More complex small movement input schemes can be used by the computing device 108 in conjunction with visual images projected by the projector 112 onto the surface.

The computing device 108 can also receive voice input and provide audio output to users. For example, the computing device 108 can receive audio signals from one or more microphones (not depicted), which can be included in the computing device 108 itself, in the projector 112, in the depth sensor 104, and/or as a standalone microphone which may be mounted to the support 110. Audio signals received through the microphones can be analyzed for speech using one or more speech recognition operations running on the computing device 108 and/or through the use of an external computing device, such as the computing device 116. The recognized speech can be analyzed to determine whether the user has provided one or more predefined verbal commands, such as uttering the word "help" or saying "order supplies." In response to determining that the user has provided a verbal command, the computing device 108 can perform an associated operation, such as transmitting a request for help to the user's supervisor or a request for additional supplies, and the computing device 108 can also update the image 114 projected onto the surface 102.

The computing device 108 can also use one or more speakers (not depicted) to provide audio output to the user. The one or more speakers can be included in the computing device 108, the projector 112, the depth sensor 104, and/or can be standalone speaker that may be mounted on the support 110. Audio output can be provided to compliment the visual image 114 projected onto the surface 102. For example, if the user's hand passes over one of the icons projected onto the surface 102, the computing device 108 may provide audio output through the one or more speakers to audibly identify the icon (e.g., audibly output "instruction" if the user's hand passes over the instructions icon). In another example, audible noises can be output to indicate when motion/gesture based input has been identified and received by the computing device 108, such as playing a particular noise (e.g., a click noise) when selection of an icon based on motioning/gesturing by the user.

Figure 2:
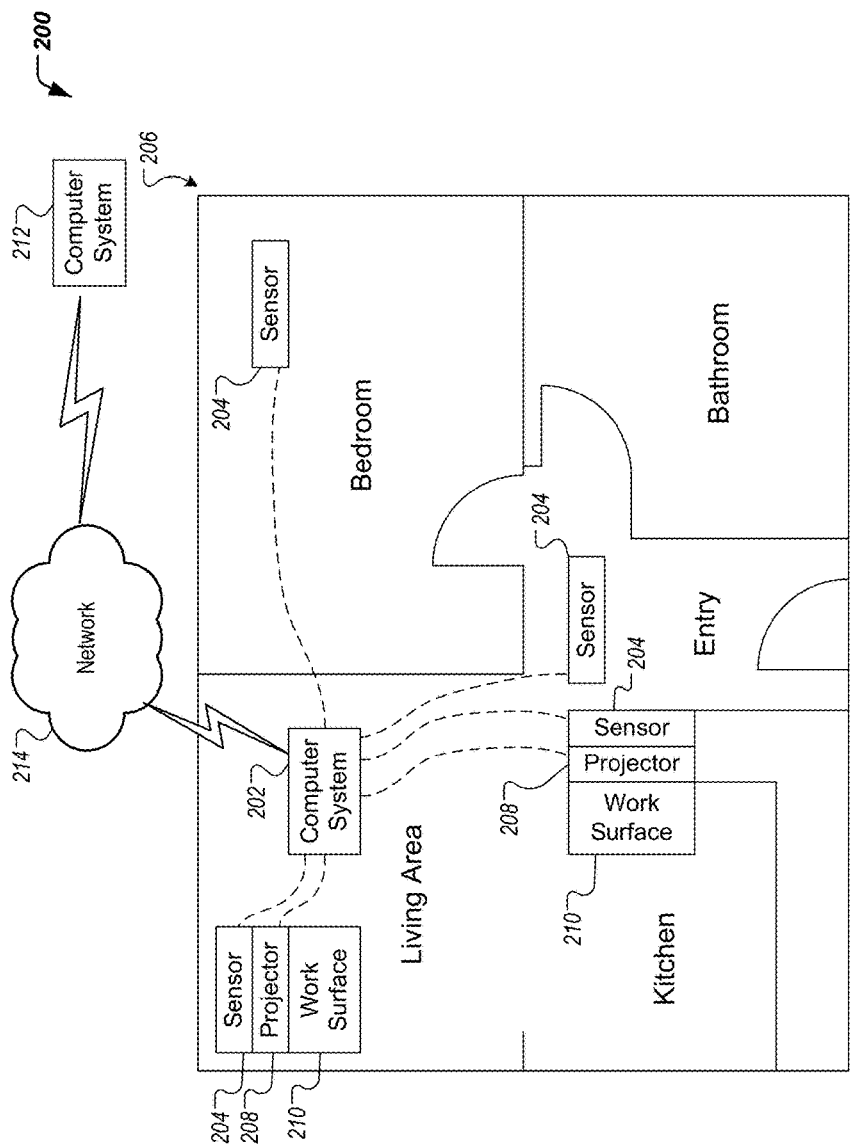
FIG. 2 is a schematic diagram of a an example system for providing interactive interfaces on surfaces, for monitoring for unauthorized visitors, and for detecting falls by a user.

FIG. 2 is a schematic diagram of a an example system 200 for providing interactive interfaces on surfaces, for monitoring for unauthorized visitors, and for detecting falls by a user. The example system 200 includes a computer system 202 that receives 3D data from four sensors 204 that are placed in different locations of the house 206. The computer system 202 can include one or more computing devices, such as a collection of one or more desktop computing devices and/or computer servers. Two of the depth sensors 204 are associated with projectors 208 and corresponding work stations 210. These two depth sensors 204 and corresponding projectors 208 and work stations 210 can operate in a similar manner to the system 100 discussed above with regard to FIG. 1.

In addition to performing the features discussed above with regard to FIG. 1, the computer system 202 can monitor for unauthorized visitors and can monitor for falls. The computer system 202 can monitor for unauthorized visitors by comparing 3D models (e.g., 3D wireframe models) for users who are detected to be present in one or more rooms of the house 206 (using data from the depth sensors 204) to 3D user profiles for known users. If a user is identified from a corresponding 3D user profile, the computer system 202 can determine whether the identified user is permitted to be present in the house 206 at the current time and/or with other people who are also present in the house 206. If the user is determined to not be permitted to be in the house 206, the computer system 206 can transmit a notification to an external computer system 212 over one or more networks 214 that an unauthorized user is present in the house 206. Such a notification can include various details, such as the address of the house 206, the identity of the user who is unauthorized to be in the house 206, the identities of other users who are present in the house 206 and who are authorized to be in the house, a time of day, and/or other pertinent details to assist users associated with the external computer system 212 to respond appropriately to the notification.

The computer system 202 can also monitor for one or more users who are present in the house 206 falling based on 3D data from the sensors 204. The computer system 202 can analyze the 3D data from the sensors 204 to determine whether a fall has likely occurred. A fall can be detected in a variety of ways. In one example, the computer system 202 can monitor for sudden changes in the position of a user's head relative to the user's shoulders and the ground. If the user's body positioning transitions, within a threshold period of time, from a first position where the user's head is above his/her shoulders and the shoulders are substantially parallel to the ground to a second position where the user's head is below at least one of the user's shoulders and the user's shoulders are within a threshold angle of being perpendicular to the ground (e.g., within 45 degrees of being perpendicular to the ground), the computer system 202 can determine that the user is likely falling. Based on such a determination, the computer system 202 can transmit a notification to the external computer system 212 (or another computing device) that indicates that a user has fallen in the house 206. The notification can include a variety of pertinent details, such as an identity of the user, an address of the house 206, a location in the house 206 where the fall was detected, a time at which the fall occurred, and/or relevant health information associated with the user who fell (e.g., information regarding medical conditions, preexisting resuscitation orders).

The computer system 202 can also monitor for seizures based on the 3D data provided by the depth sensors 204. It may be difficult to determine the difference between a user who is simply in a reclined position and a user who is experiencing a seizure. However, determining the difference between the two can be critical with regard to user health so that users can be promptly provided with appropriate medical care. The computer system 202 can differentiate between a user who is in a reclined position and a user who is experiencing a seizure in a variety of ways. In one example, the computer system 202 can determine that a user is experiencing a seizure based on there being continuous and rapid changes (e.g., changes in the joints' location in 3D space, changes in the joints' articulation) in at least two of the user's joints for at least a threshold period of time (e.g., 3 seconds, 5 seconds, 8 seconds, 10 seconds, 15 seconds). If a seizure is detected, the computer system 202 can transmit a notification to the external computer system 212 (or to another computing device) indicating that a user is currently experiencing a seizure in the house 206. The notification can include a variety of additional details, such as the duration of the seizure, the magnitude of physical motion detected as part of the seizure (e.g., the magnitude of physical movement), the areas of the body where the motion was detected, a location in the house 206 where the user is experiencing the seizure, an address of the house 206, an identity of the user experiencing the seizure, and/or relevant health information associated with the user.

Figure 3A:
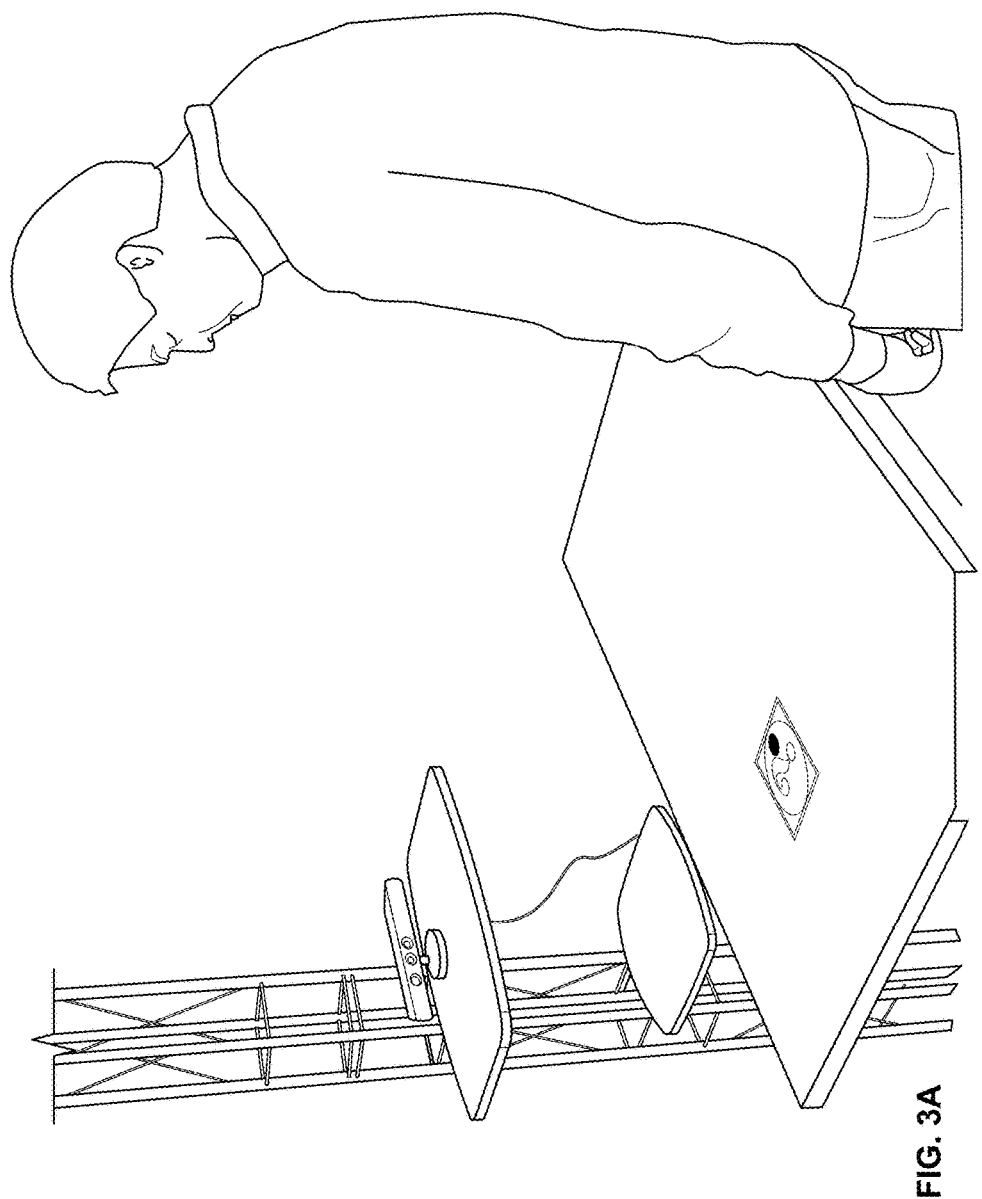

FIG. 3A illustrates an example system for providing an interactive interface on a surface, and a user standing in a position so as to interact with the interface. The example shown is generally a workstation for performing manual tasks such as assembly or packaging. The workstation's components may include a surface, a depth sensor, a projector (not shown—located generally above the user's head and directed to the surface), a support structure, and supplies for the task to be performed. The surface can be an ordinary table or workbench. In addition to providing a surface on which to perform the work tasks, the surface can also function as a surface on which to display a user interface. The depth sensor, as explained previously, generally provides the system with 3D data for the user, which can be used to sense the position of the user's arms and upper torso. The depth sensor, as shown, may be located on a side of the surface opposite from the side of the surface at which the user is positioned. The projector can be positioned so as to project images onto the surface (e.g., images such as the question mark icon image shown in FIG. 3A and those described further below). The support structure can be a mechanical framework suited to appropriately locate and physically support workstation components, such as the depth sensor and projector, in relation to the user and the surface. Supplies can include the physical materials that are components of the items to be assembled or packaged at the workstation, and will vary depending on the particular task to be performed (also referred to herein as the "job"). In the example shown, the pens, rubber bands, and box are supplies.

Figure 3B:
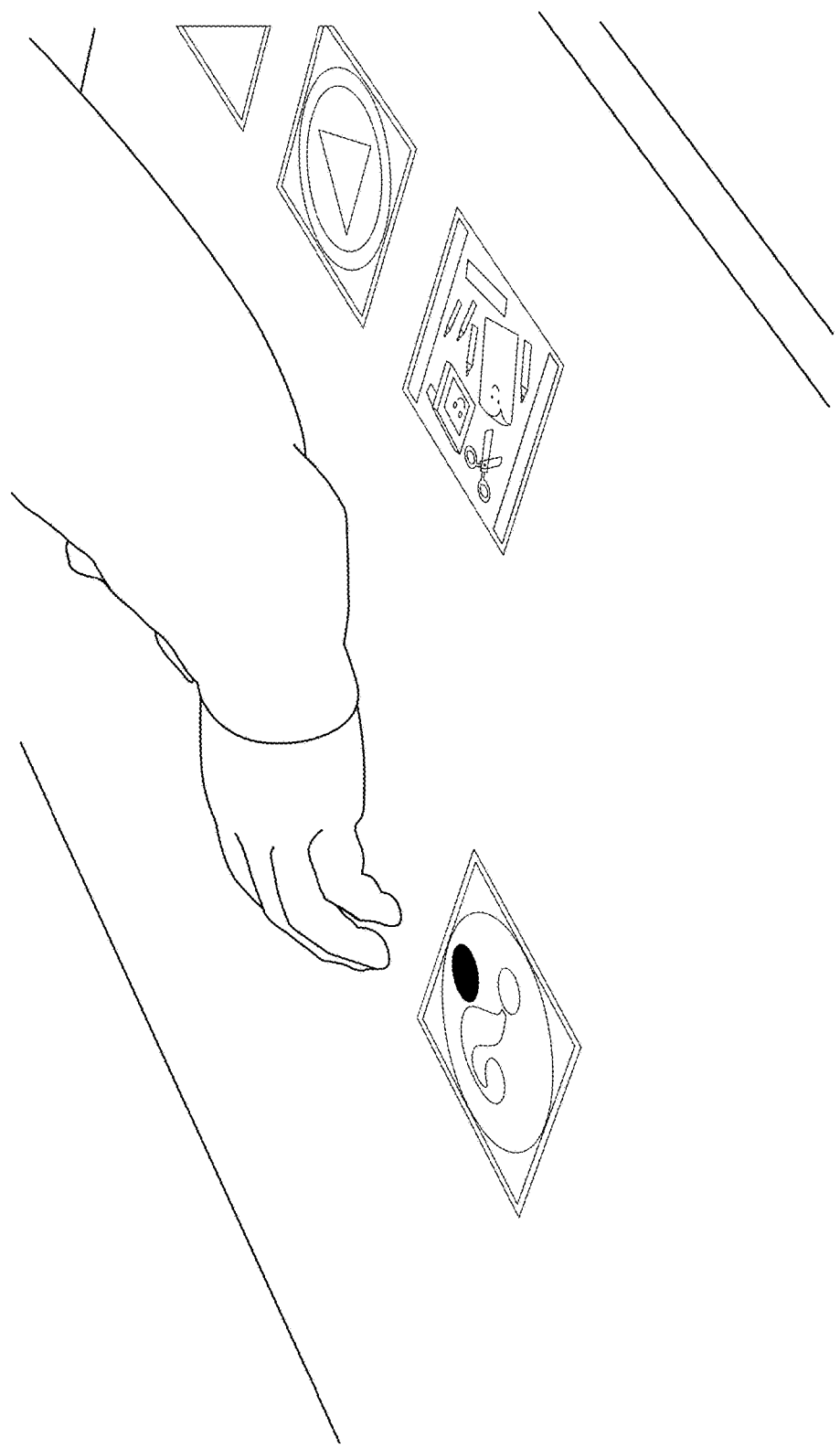

FIG. 3B shows a closer view of the surface of the exemplary workstation. As previously mentioned, the projector can display images on the surface such as the question mark icon shown. The user, in order to initiate further interaction with the system, can select the question mark. The selection can be accomplished by various ways, such as by the user moving their hand to a location generally above the question mark and maintaining it in that position for at least a threshold period of time (also referred to herein as "hovering"). The projector can display an indicator corresponding to the user's hand, such as the circle shown on the question mark icon, to indicate the system's sensed-position of the user's hand. The user can position their hand so as to cause the indicator to be in the location on the surface as desired. For example, in FIG. 3B the user's desired position of the indicator is on the question mark icon. When the user has made a selection in a prescribed manner, the system may respond in various ways such as by providing further information, such as text, icons, and/or videos. The further information may be provided to the user by the projector's display of further information on the surface. In the example shown, for example, in response to the user's selection of the question mark icon, the system responded by displaying additional indicators by which the user can request supplies, play a video showing the procedure for performing the work task, or request help from a supervisor. The user can thereafter make a selection from among the further options such as by positioning their hand so as to hover over the desired information in the manner previously described.

FIG. 3C shows the user making a selection of an icon representing a play button—in this example to play a video. The user can make the selection by positioning their hand so that the corresponding indicator displayed by the projector (e.g., the circle shown) is displayed and maintained on the option that the user desires to select. When such a selection has been successfully made, the system may provide a response to the user's selection that is displayed on the surface.

Figure 3D:
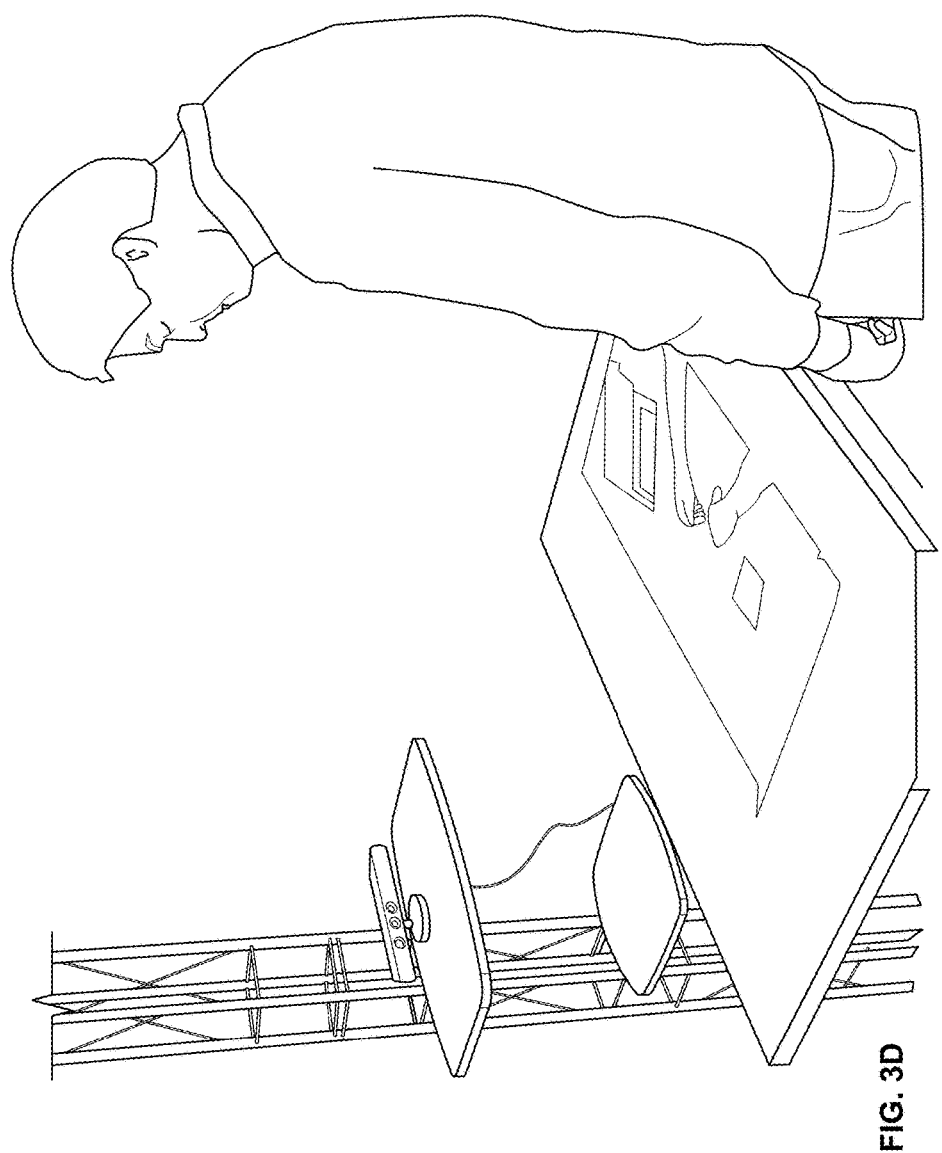

FIG. 3D illustrates the projection of a video onto the surface displayed in response to the user's selection of a play button as described previously. The projector can display a video, for example, of a work procedure to train the user to perform the steps associated with a particular work task. In the example shown, the video shows the arms and hands of an actual person properly performing the steps that the user will perform. The video, since it is displayed on the surface, can closely depict the scale, spatial orientation, and overall general manner of the tasks to be performed by the user, so as to instruct them to properly perform the task independently.

Figure 3E:
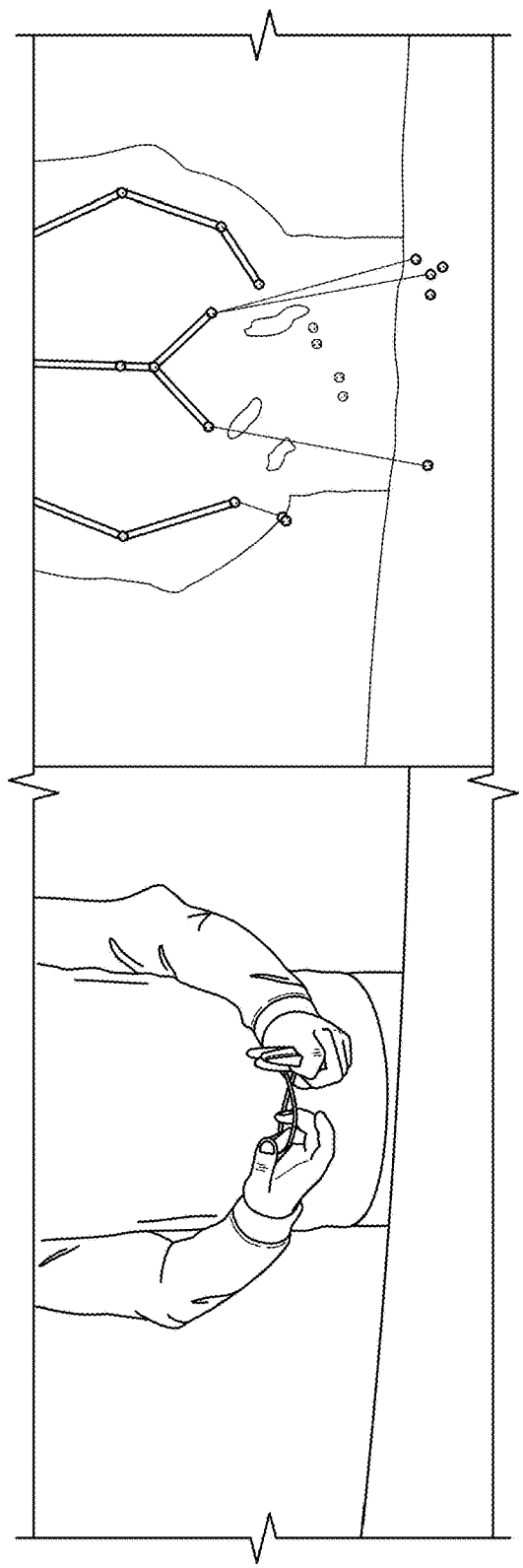

FIG. 3E provides an example comparison of a view of a user's upper torso as seen by a human (on the left side of FIG. 3E) and by the system's depth sensor (on the right side of FIG. 3E). As shown, the depth sensor may operate by rendering a three-dimensional wireframe figure corresponding to the sensed size and orientation of the torso of the user. By creating such a wireframe body the depth sensor may, for example, determine an estimated location of the user's hands in relation to the surface. With the information pertaining to the estimated location of the user's hands, the system can, among other things, determine the user's interactions with the user interface displayed on the surface (such as the selection process described previously).

Figure 4A:
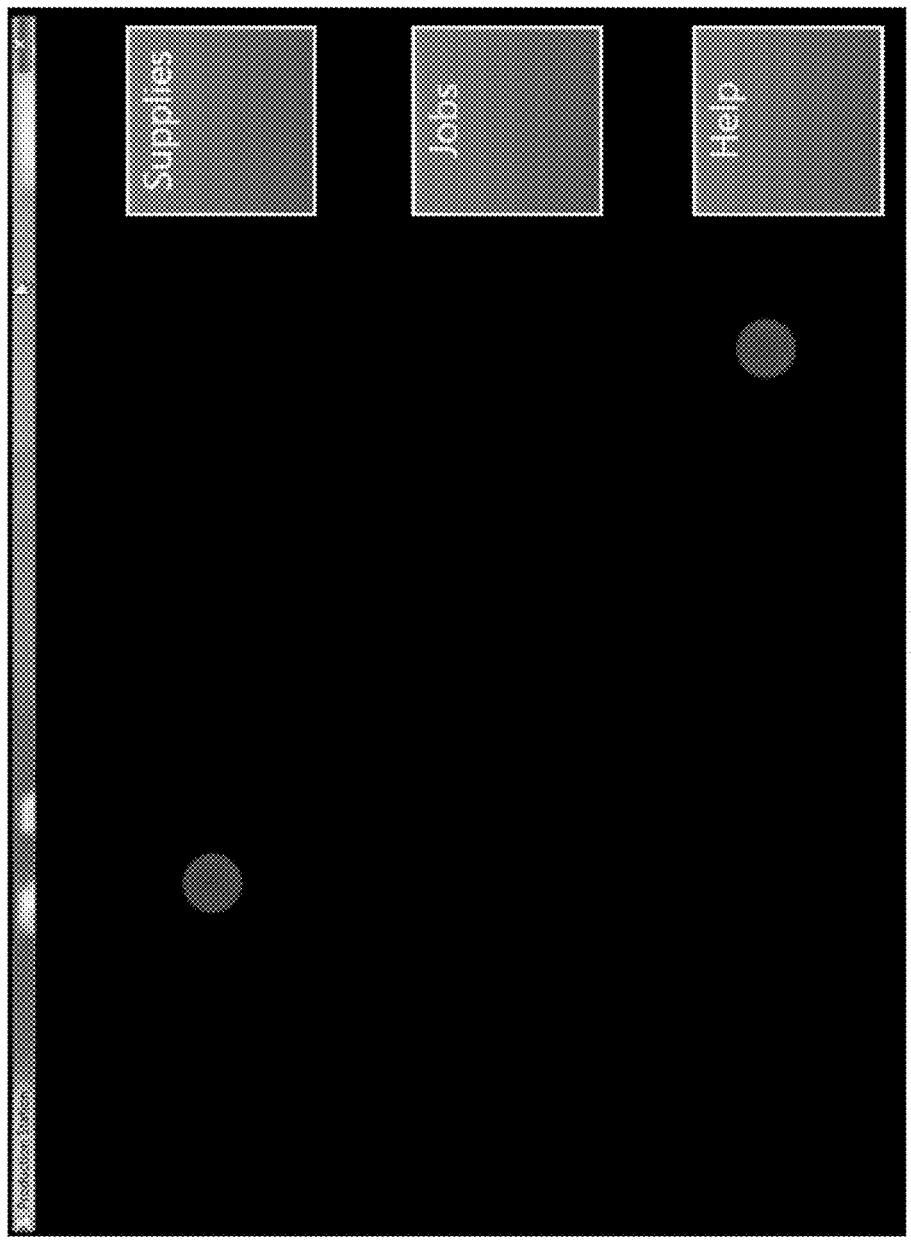
FIGS. 4A-W are screenshots of an example interactive interface that is projected on a surface.

FIG. 4A depicts an example display from the projector as seen on the surface. The two circles shown can correspond to the positions of the user's hands in relation to the surface as determined by the depth sensor. The three squares illustrate example user interface selection options (example active areas of the interface) available to the user via the user interface projected onto the surface.

Figure 4B:
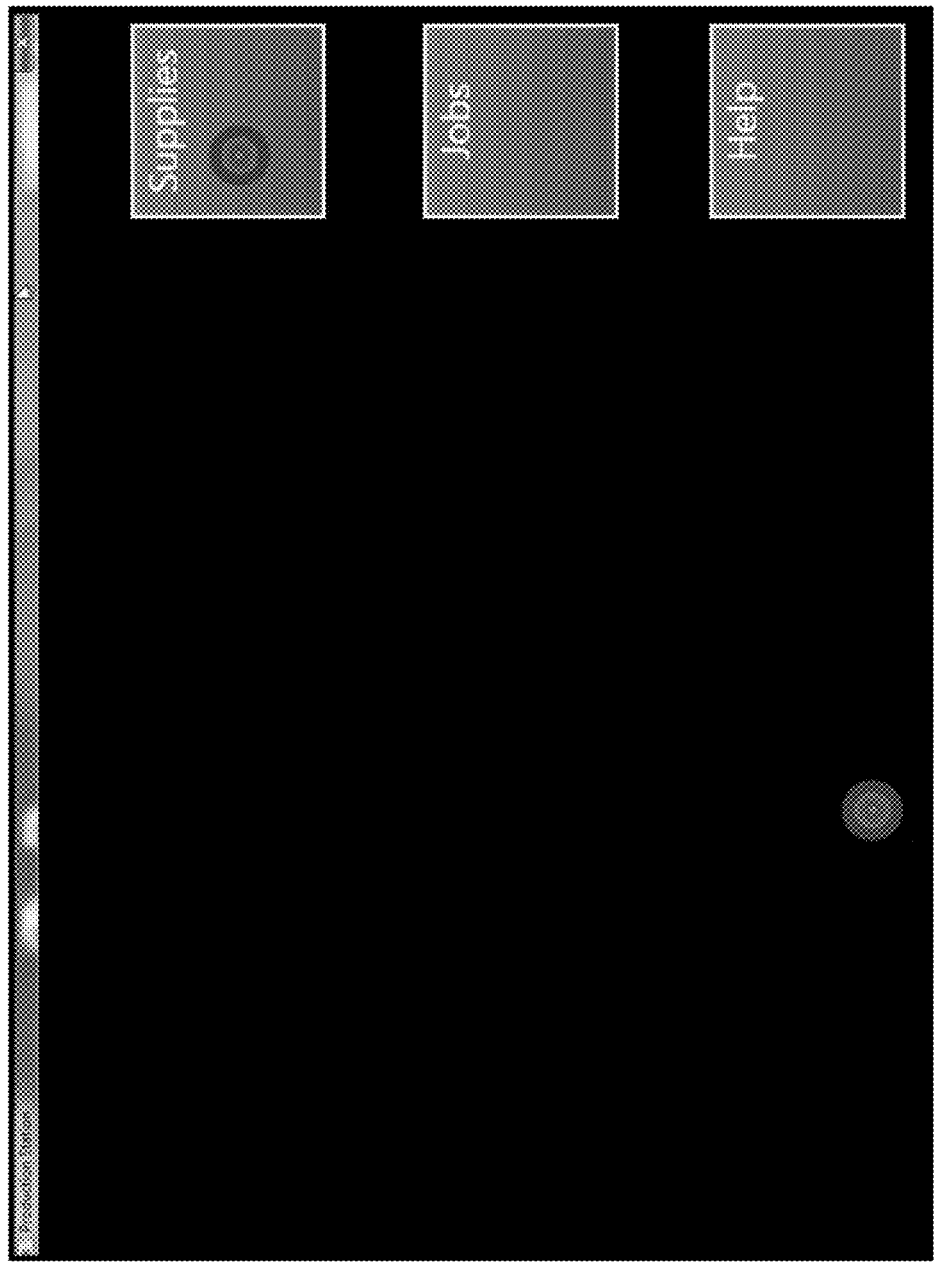

In the example of FIG. 4B, the position of the circles corresponding to the position of the user's hands indicate that the user is making a selection to get further information regarding supplies. For example, when the system senses the user's hand has hovered over the supplies option icon long enough to indicate a selection has been intended by the user, the system may then respond to the selection.

Figure 4C:
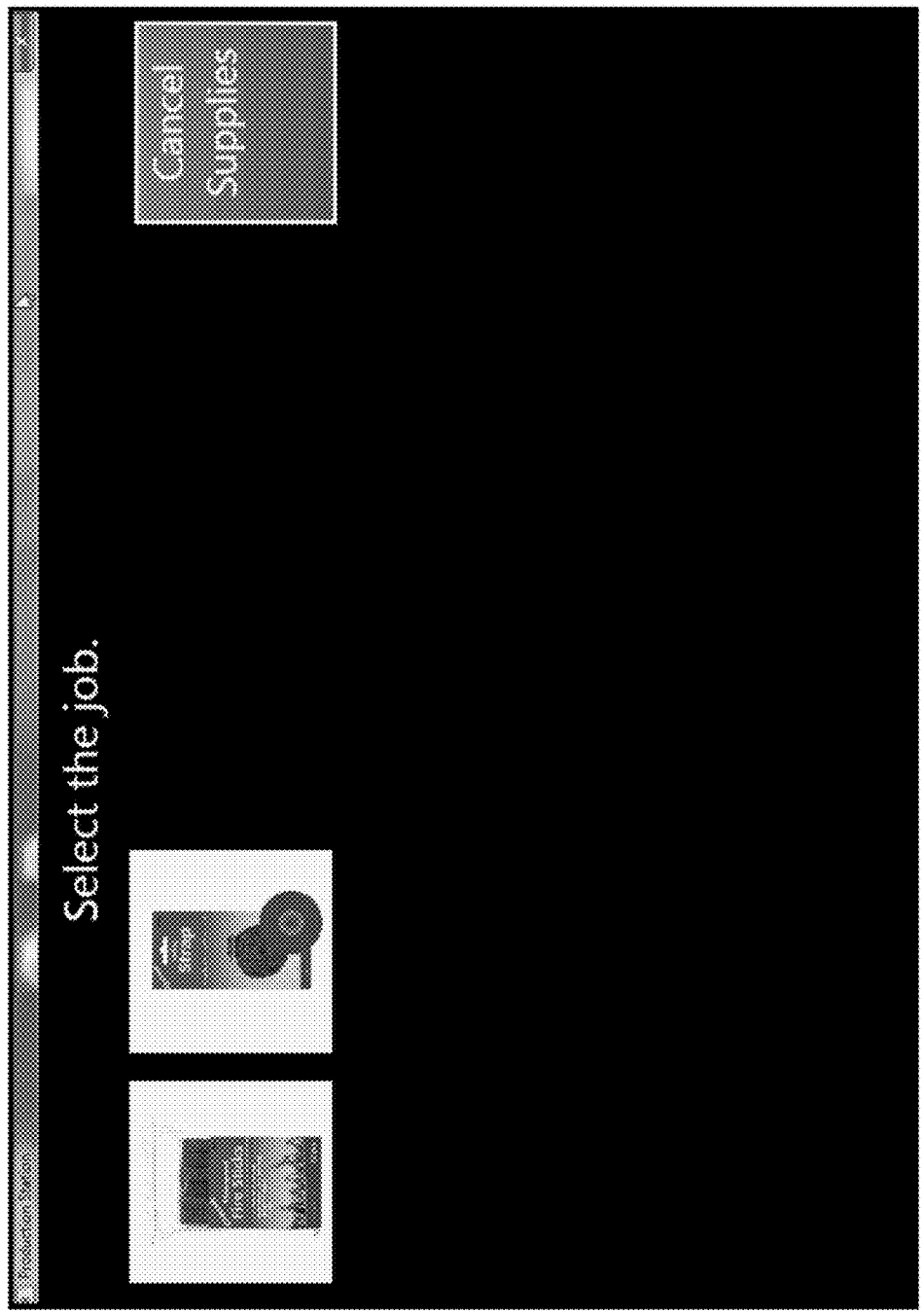

FIG. 4C illustrates an exemplary response to the user's selection of the supplies icon. As a next step, the user may be asked to make a further selection to indicate the "job" they want supplies for. As shown, the user may be presented with a plurality of options to choose from—represented in various manners such as by text, icons, and/or photographs. As described previously, the user may make a selection by holding their hand in position to place a corresponding indicator (e.g., circle) on the option the user desires to select. In the example of FIG. 4C, the user has indicated a selection of the supplies for the "Strap" product job.

Figure 4D:
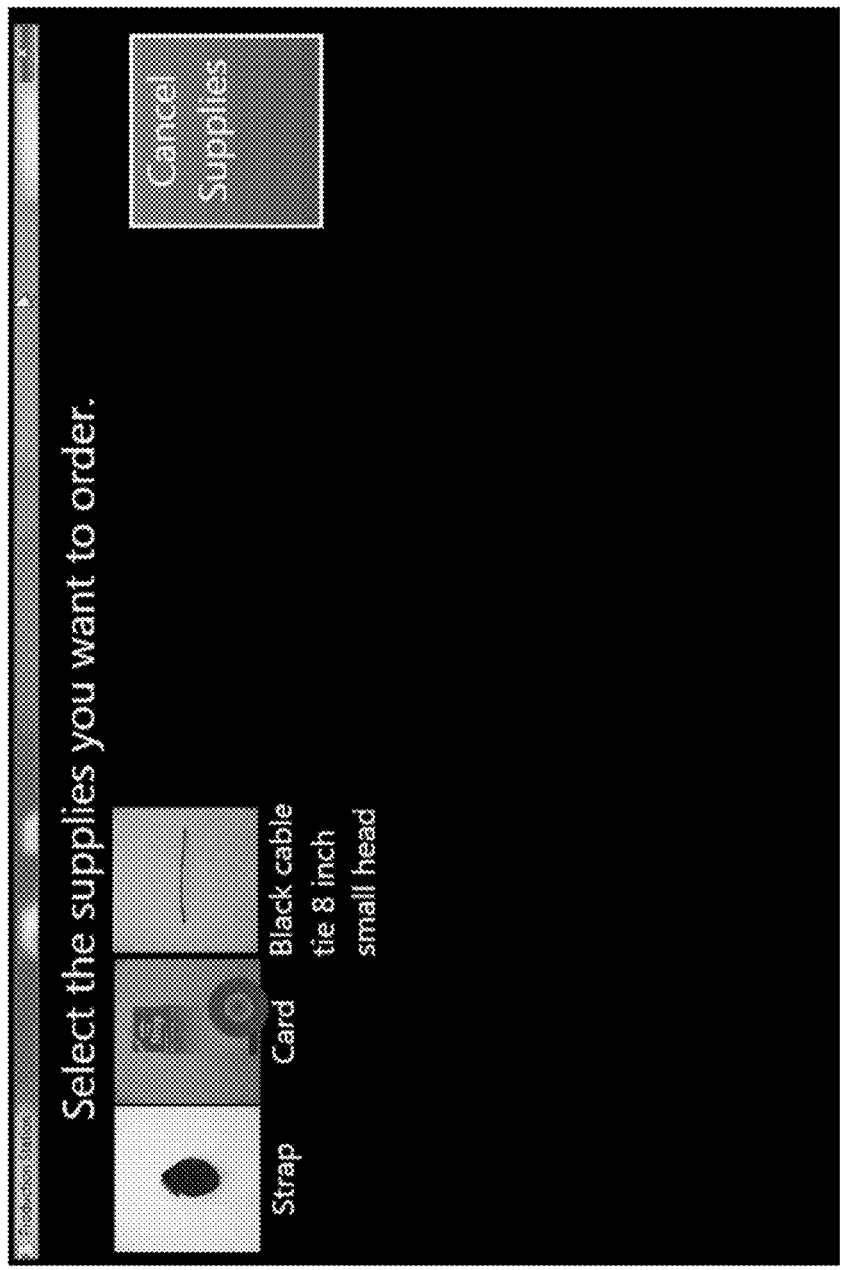

The system may respond to the user's input selecting supplies for the "Strap" product job by displaying further information on the surface as shown in FIG. 4D. In this example, each of the three component parts used to make the "Strap" product is displayed via text and a photograph. In addition to component supplies, an option to cancel the ordering of supplies may be provided (as shown by the square in the upper right corner of FIG. 4D). The user may place an order for a particular component by, for example, positioning their hand over the area of the display corresponding to the desired component for a threshold time period. In the example of FIG. 4D, the user is selecting the "Card" component as an item they wish to enter an order for.

Figure 4E:
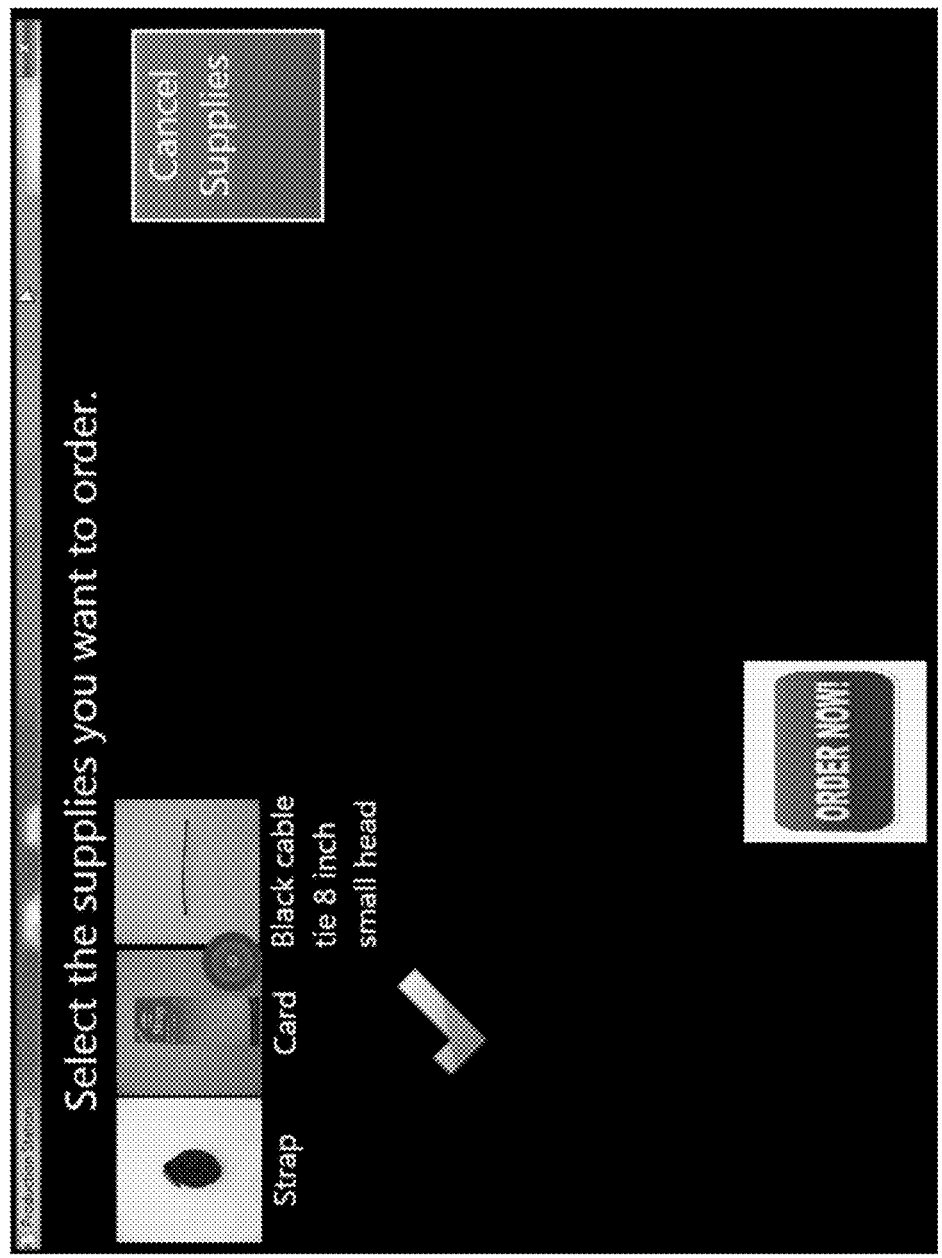

As FIG. 4E illustrates, the system may respond to the selection of the "Card" component by displaying an order confirmation step. For example, the "Card" component may be indicated as selected (e.g., with a check mark as shown). The system may then require the user to register an additional selection to confirm the order—such as the "ORDER NOW!" button icon shown—to finalize the placement of the order.

Figure 4F:
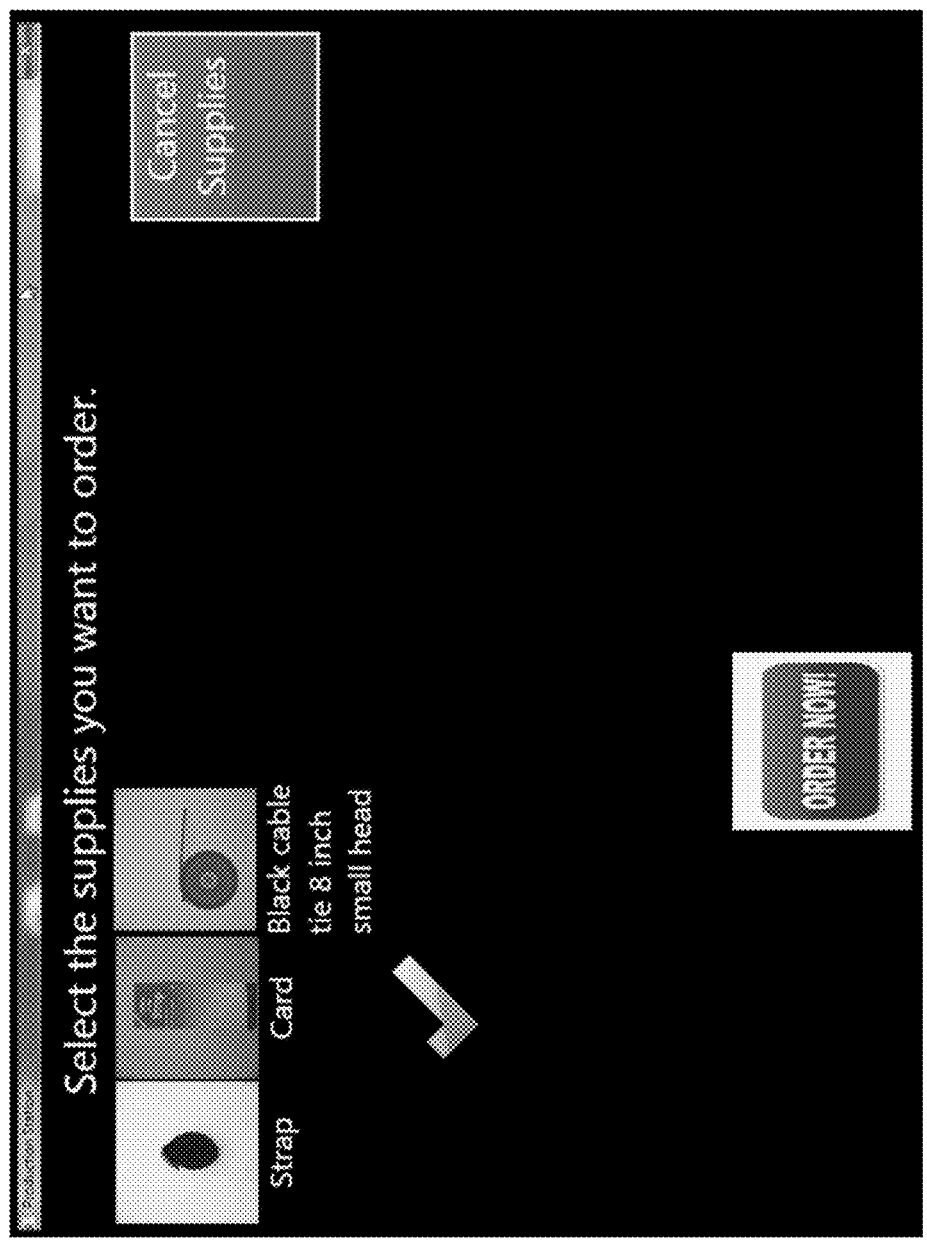

FIG. 4F illustrates that the user can proceed to order additional supplies. In the example shown, the position of the circle indicates the user desires to order some cable ties that are a component for the job they are going to perform.

Figure 4G:
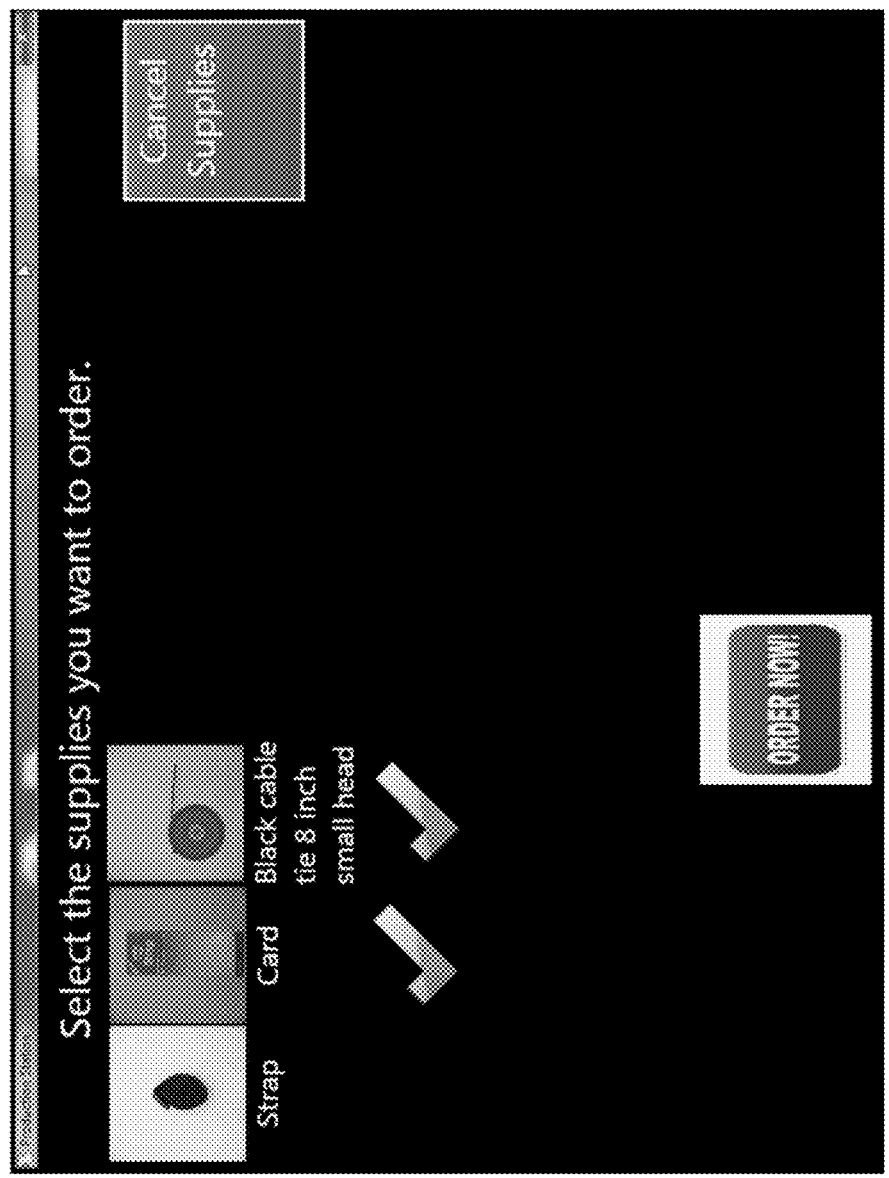

As shown in FIG. 4G, when the user has properly input the selection of the cable ties, the system may respond by requesting a confirmation of the user's order. The confirmation can include the display of an indicator, such as the check mark shown, and a selection option to confirm the placement of the order—such as the "ORDER NOW!" button icon.

Figure 4H:
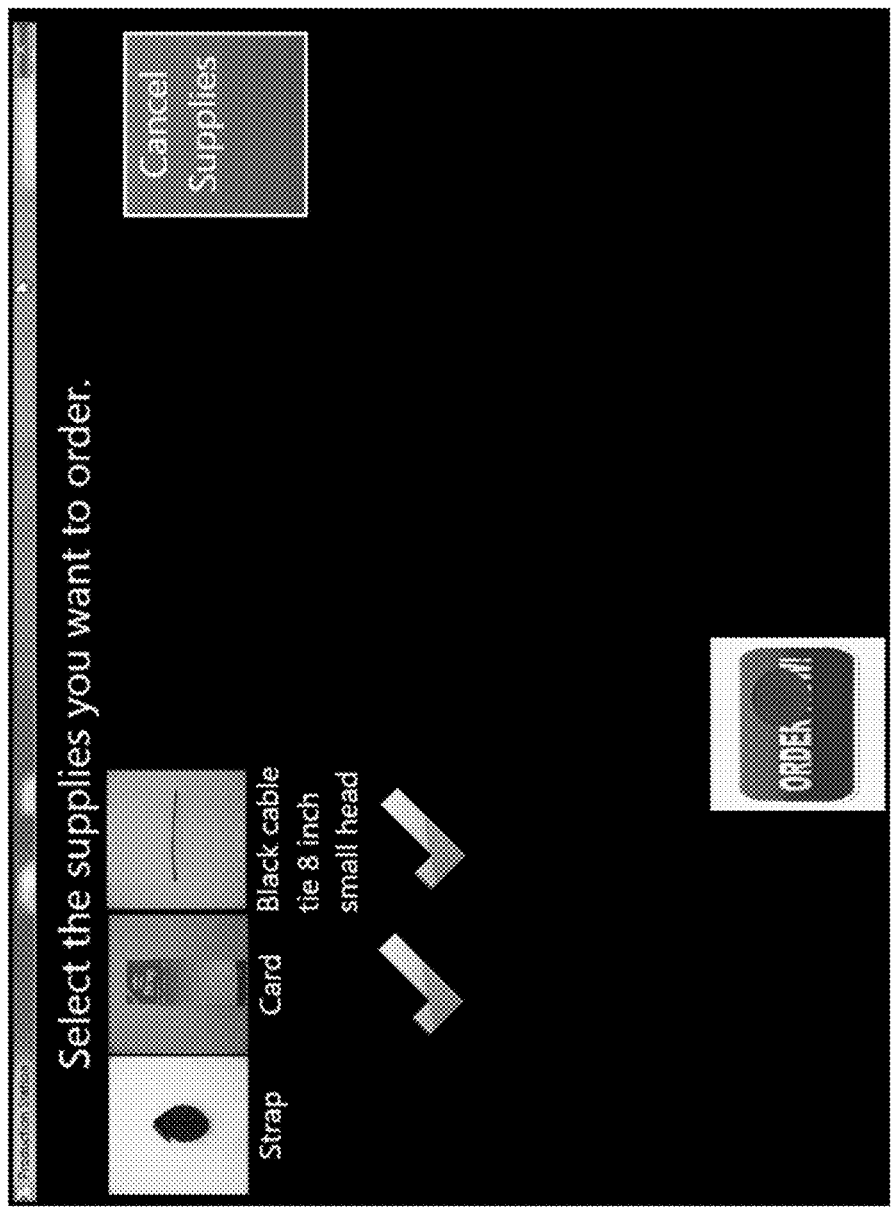

FIG. 4H illustrates the user may confirm an order for the cable ties in a prescribed manner such as by hovering their hand over the "ORDER NOW!" button icon (as represented by the circle on the icon).

Figure 4I:
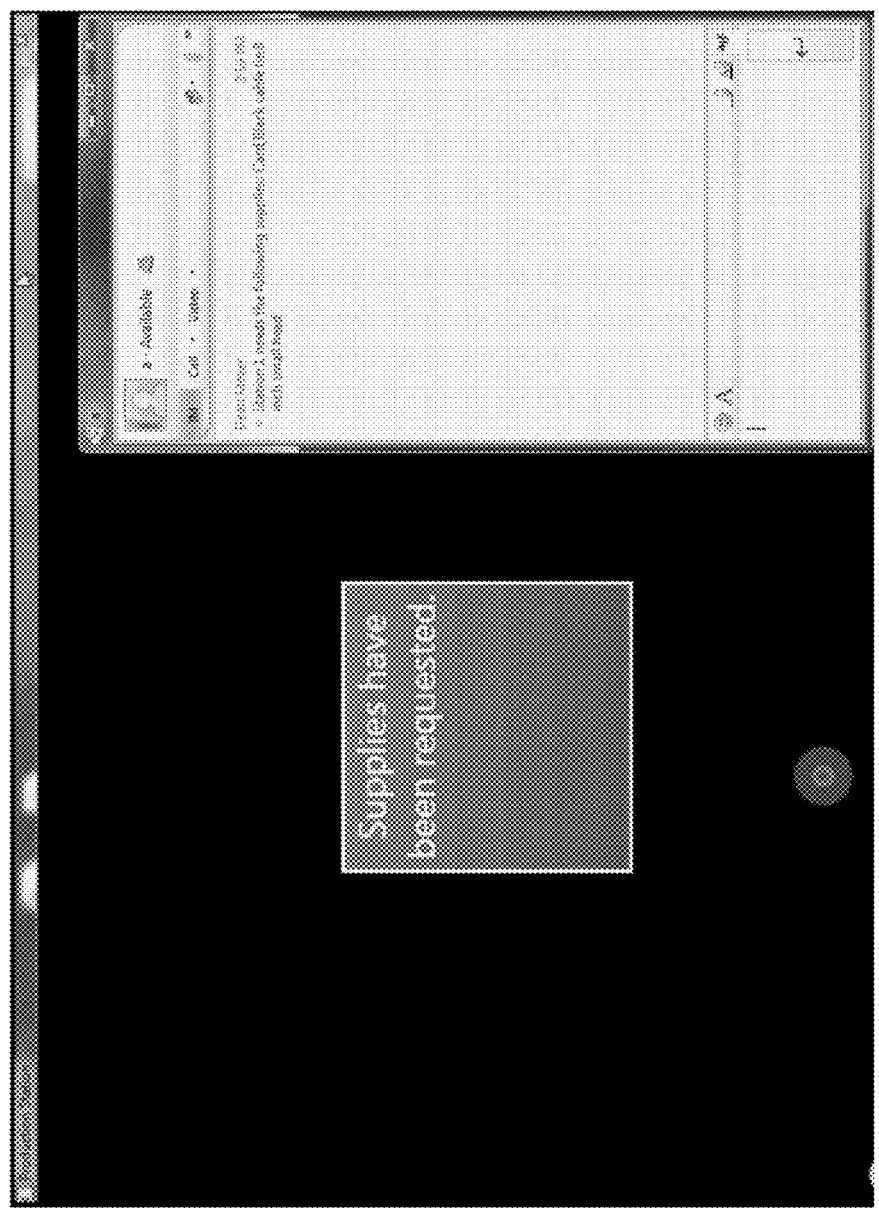

FIG. 4I is an example of the way in which the system may process an order for supplies. On the right side of the display—the display projected on the surface—shows the system sending a message to request the supplies that were ordered by the user. The square near the middle of the surface display area can be a type of message to confirm that the order has been placed.

Figure 4J:
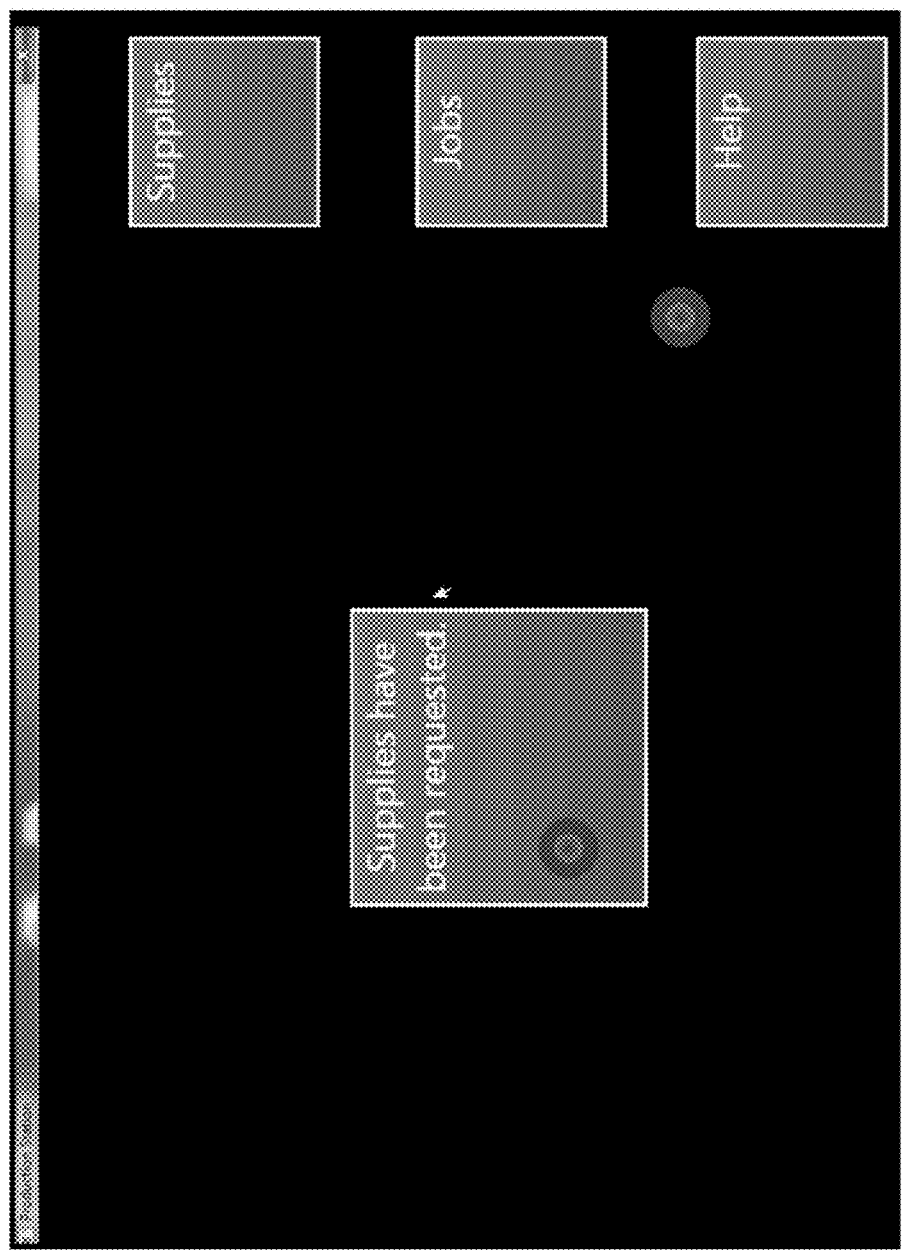

FIG. 4J illustrates additional ways the user can interact with the system using the user interface. For example, the user may hover their hand over a notification/message window so as to acknowledge and/or close the notification/message window. The user may proceed to make another selection from among the user interface choices displayed on the surface by the projector. In the example shown, the user is proceeding to request help by moving their hand to hover over a "Help" selection.

Figure 4K:
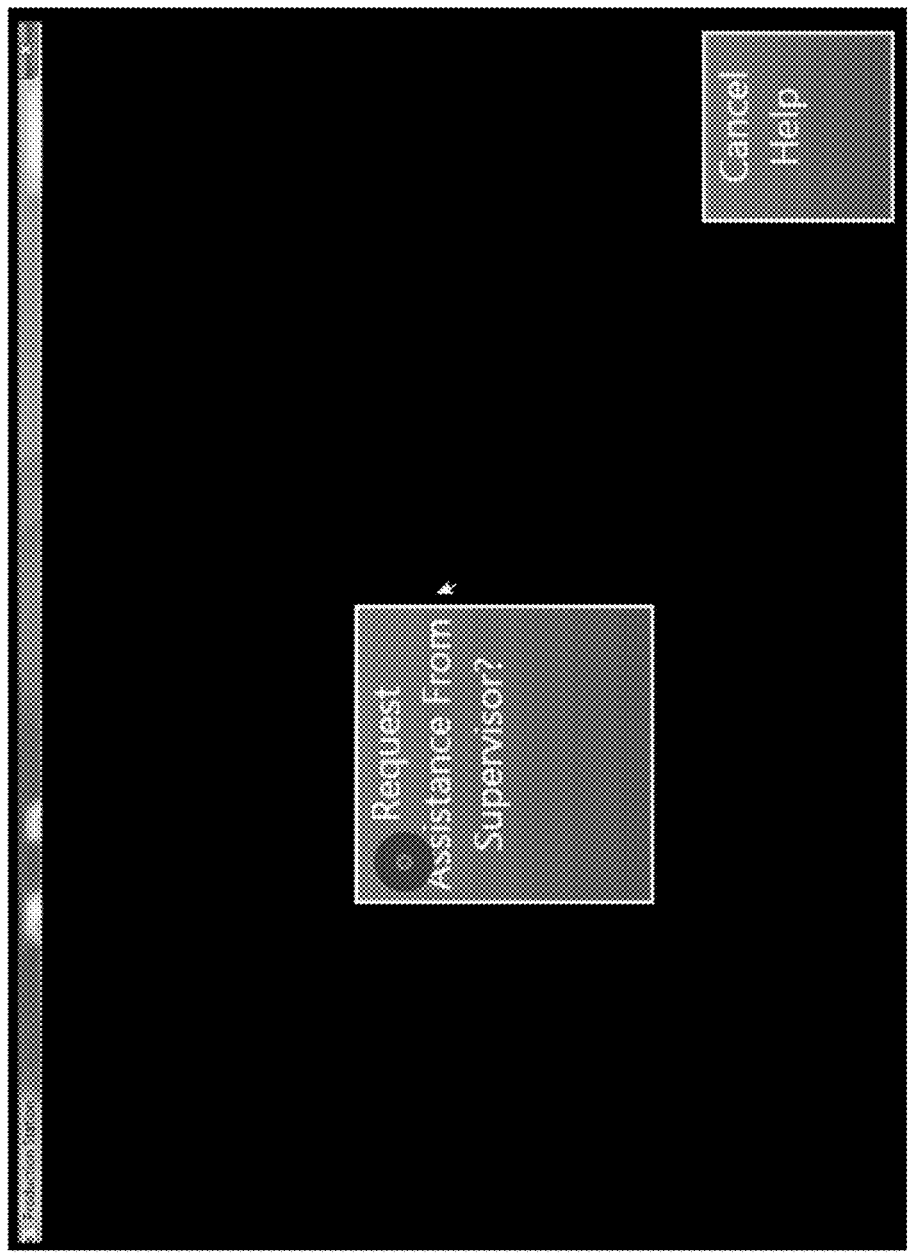

FIG. 4K illustrates how the user interface may respond to a selection by the user of a "Help" option. As shown, the user interface may require the user to confirm the request for help by displaying a window that the user must select (e.g., the "Request Assistance From Supervisor?" window). If the user no longer needs help from a Supervisor, the user may alternatively select a "Cancel Help" option.

Figure 4L:
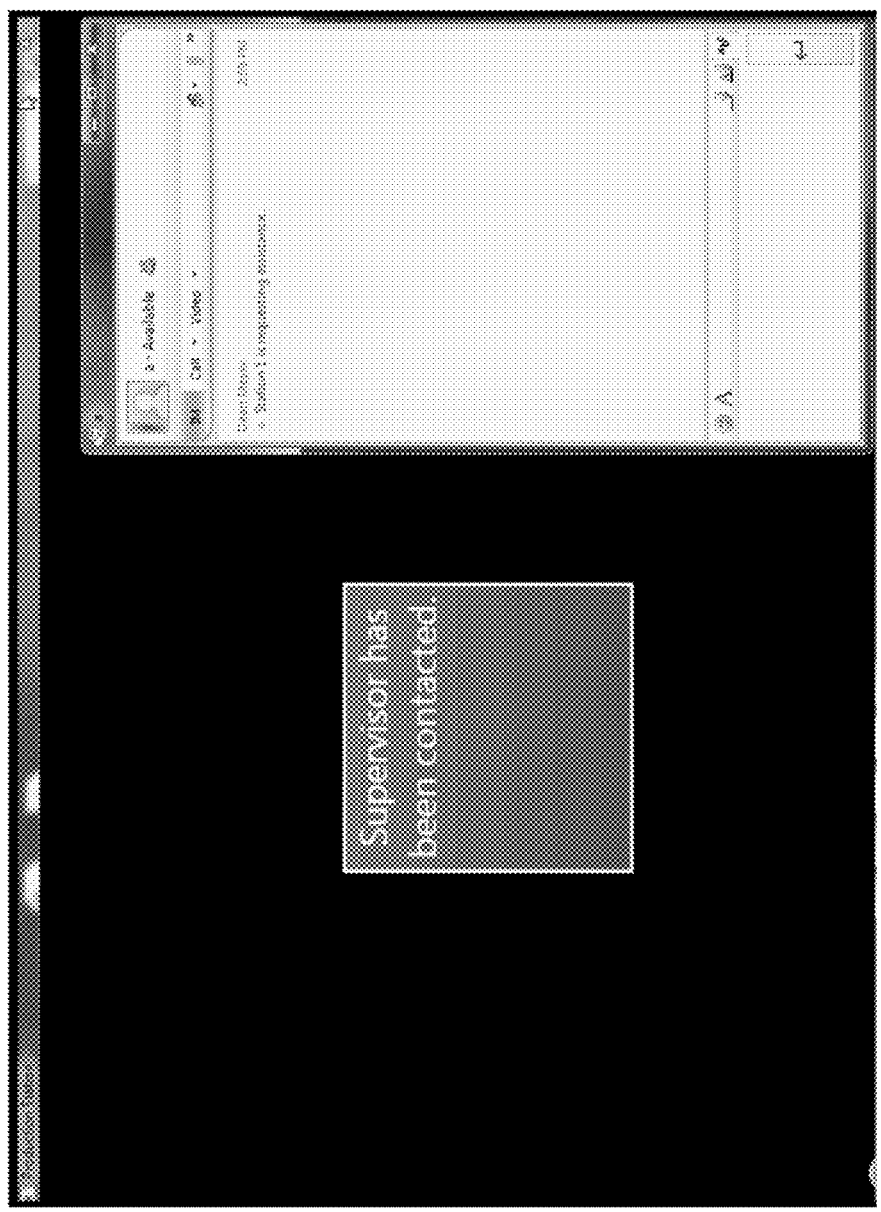

FIG. 4L illustrates how the system may respond to a user's request for help. As shown, the user interface may display the sending of a message, and display a notification window to inform the user that a request for help has been made.

Figure 4M:
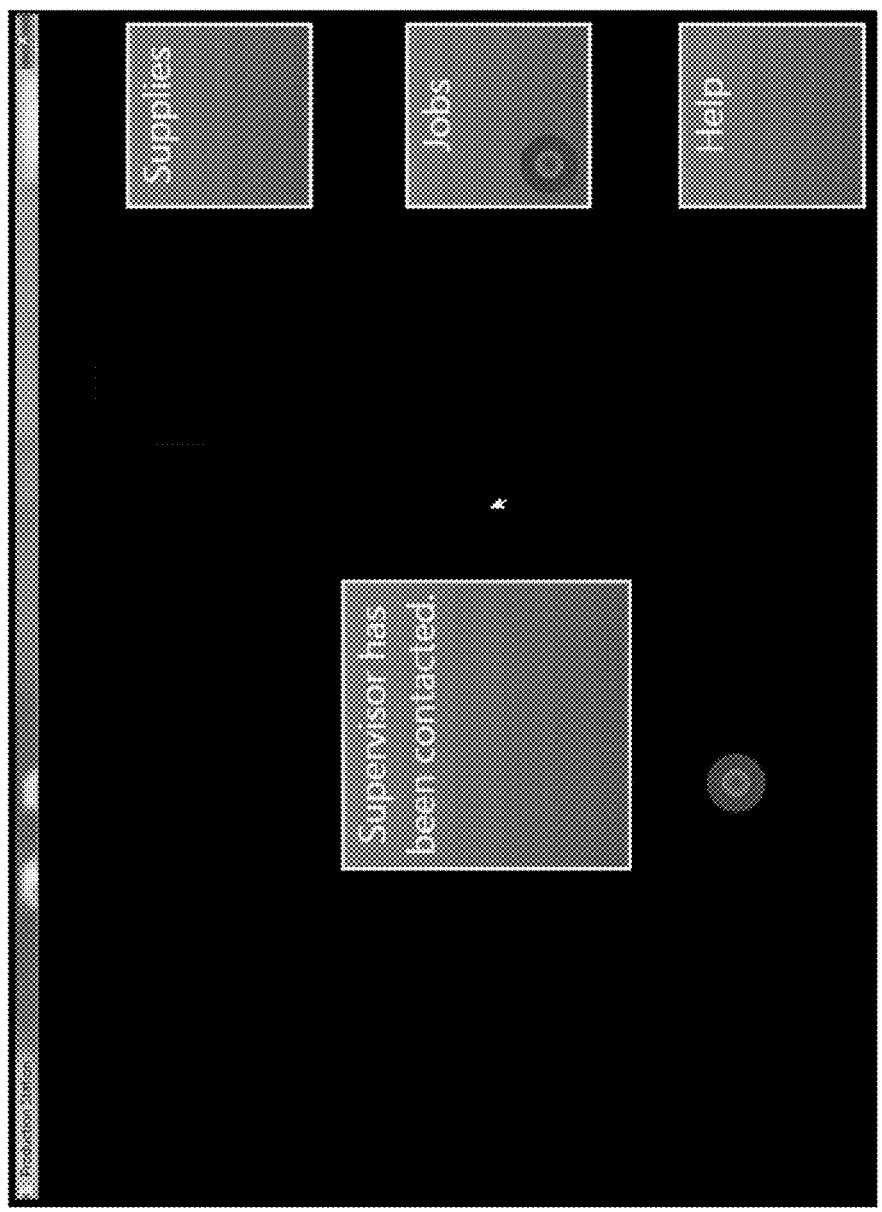

FIG. 4M shows that user can make an additional selection from among the options displayed by the user interface. In the example shown, the user is selecting the "Jobs" option (as indicated by the circle superimposed on the displayed "Jobs" square).

Figure 4N:
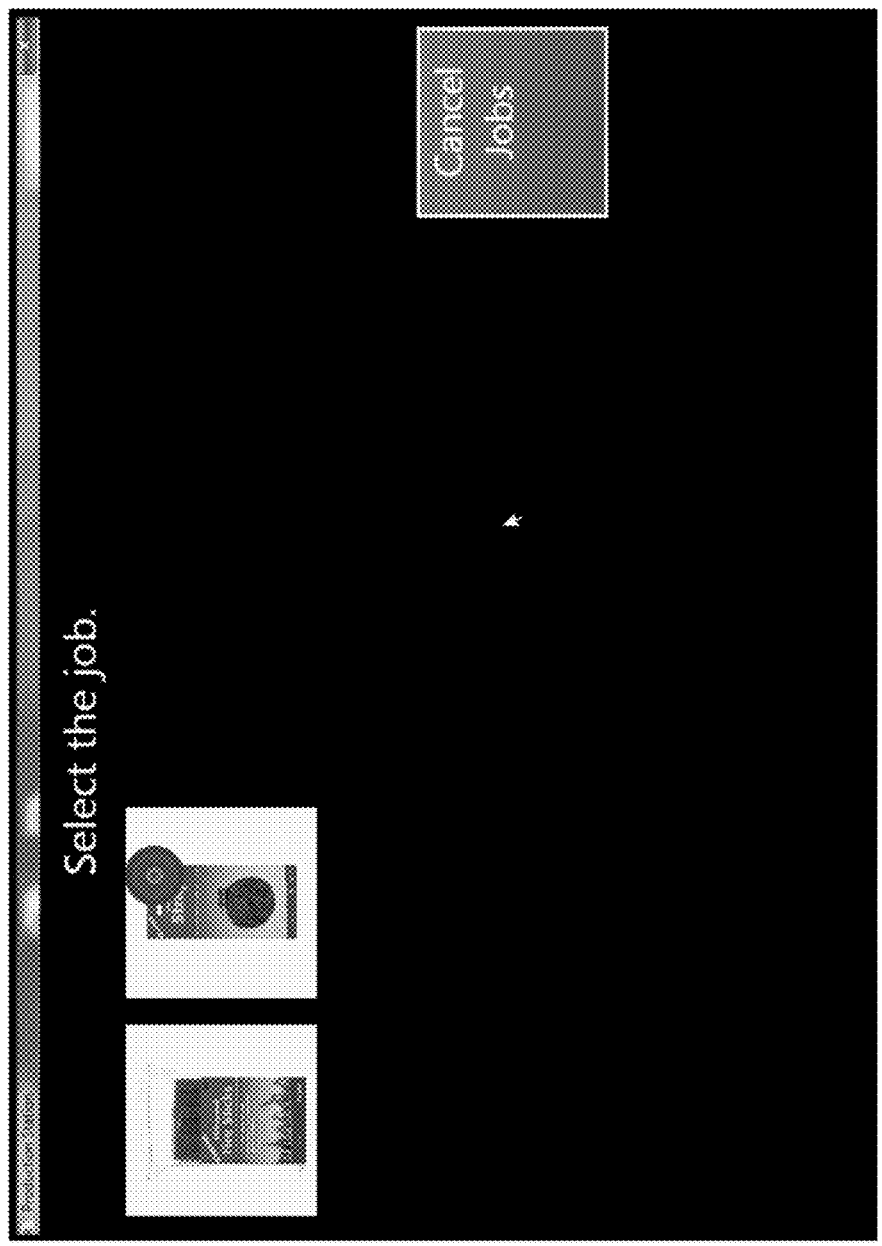

In response to the user's selection of the "Jobs" option, as shown in FIG. 4N, the system may respond by displaying on the surface some various jobs the user can select. The display may be in a variety of forms such as, text, photographs, icons, and/or in any combination thereof. The example of FIG. 4N shows the system has presented the user with two jobs to select from. The position of the circle on the "Strap" product photograph indicates the user is making a selection of that particular job. As described previously, the user may indicate their selection by, for example, positioning their hand to hover it over the corresponding option for a threshold period of time.

Figure 4O:
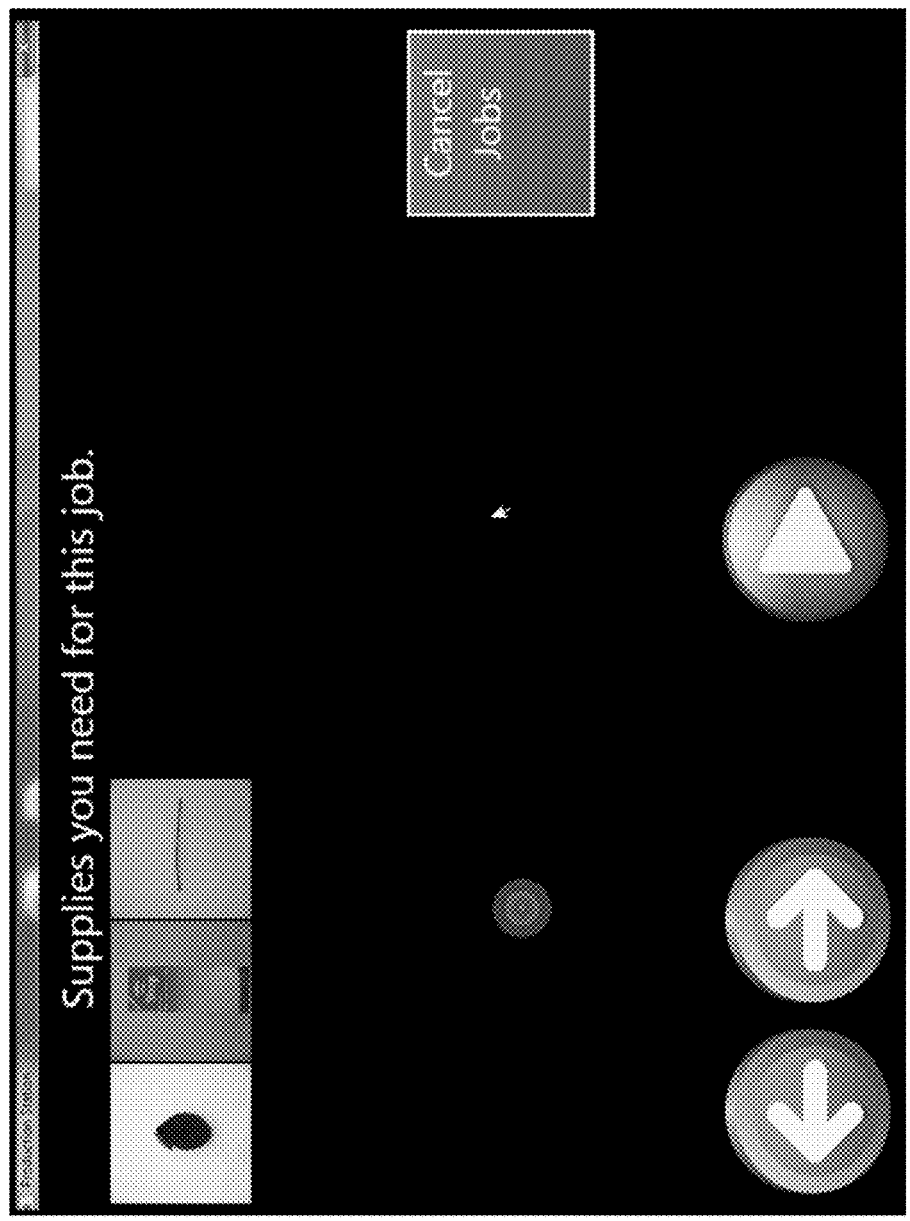
Figure 4P:
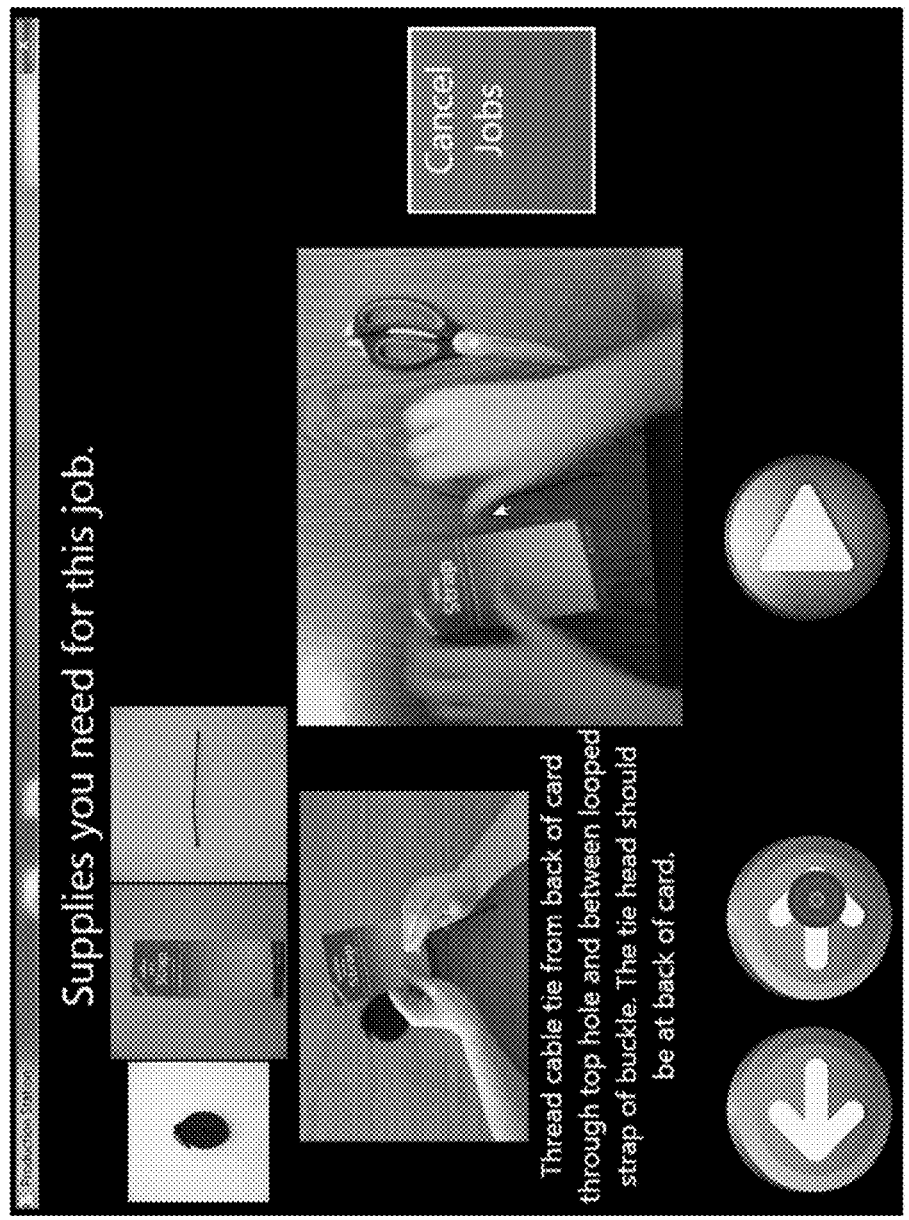
Figure 4Q:
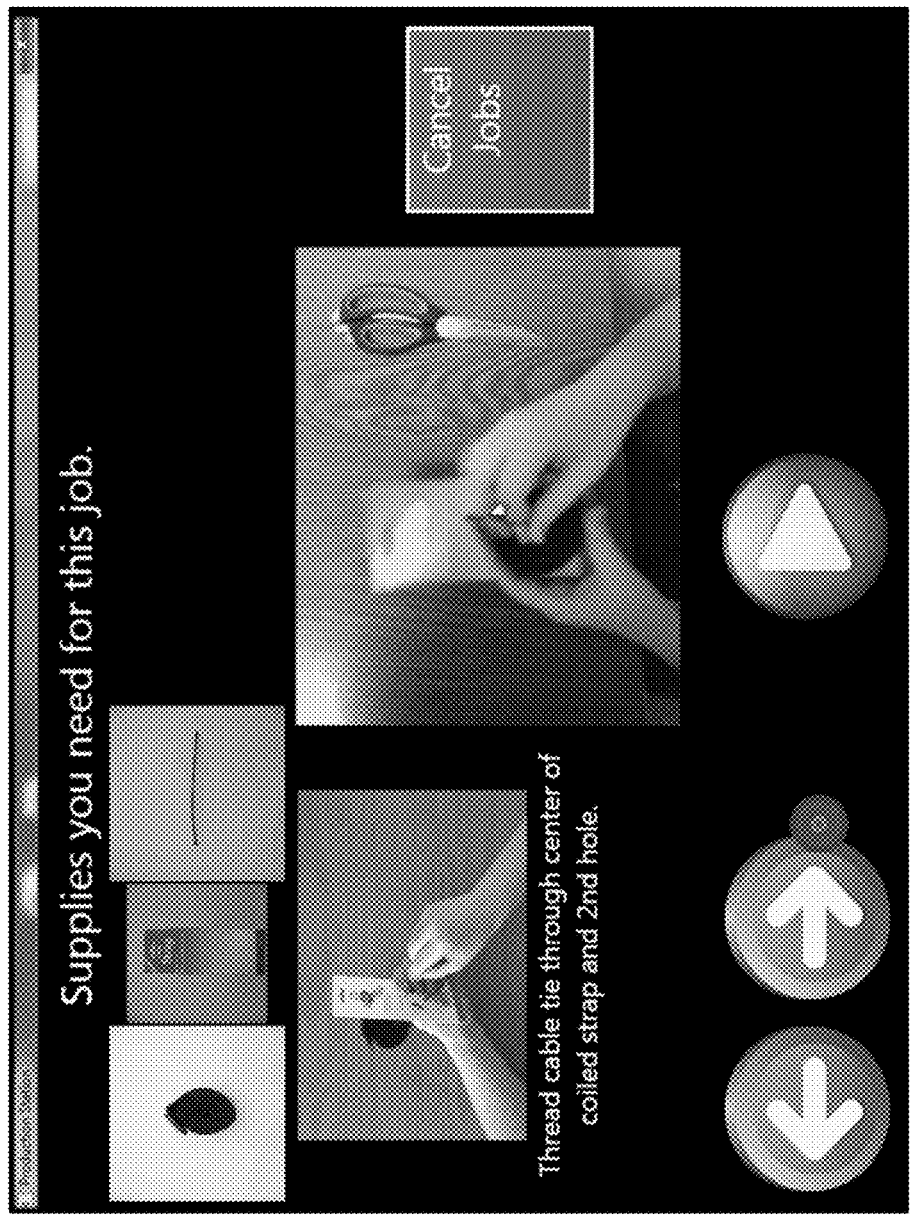
Figure 4R:
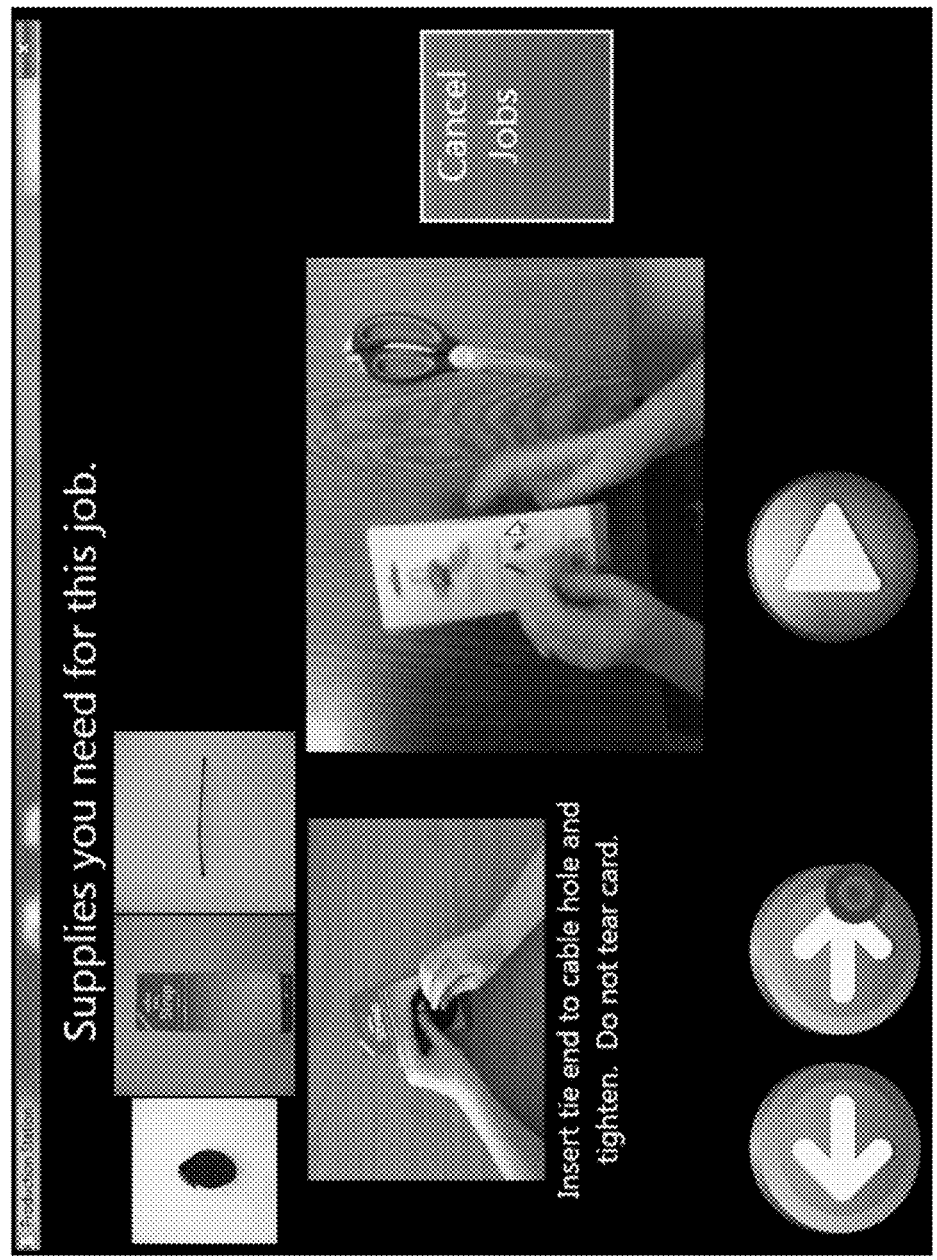
Figure 4S:
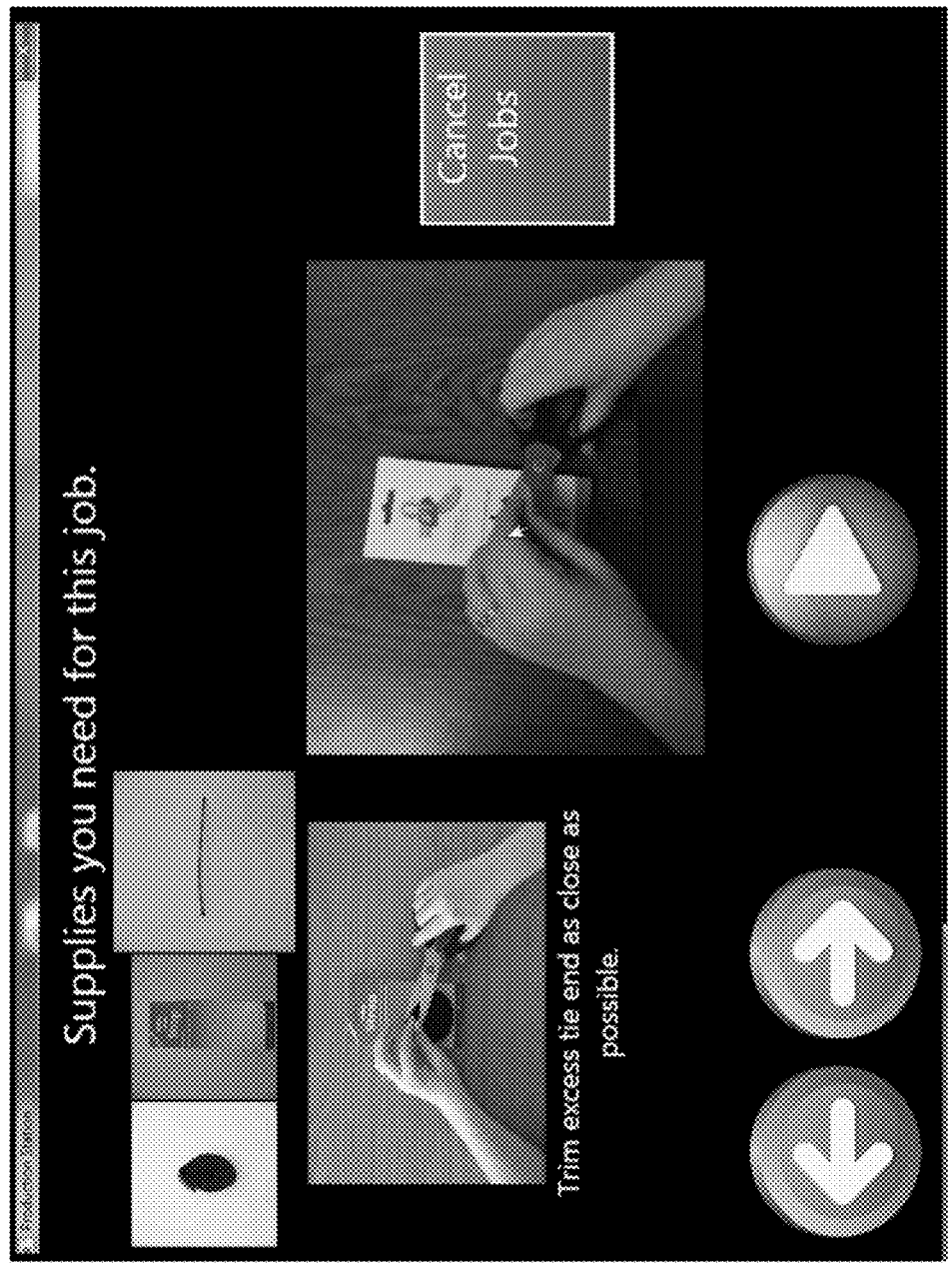
Figure 4T:
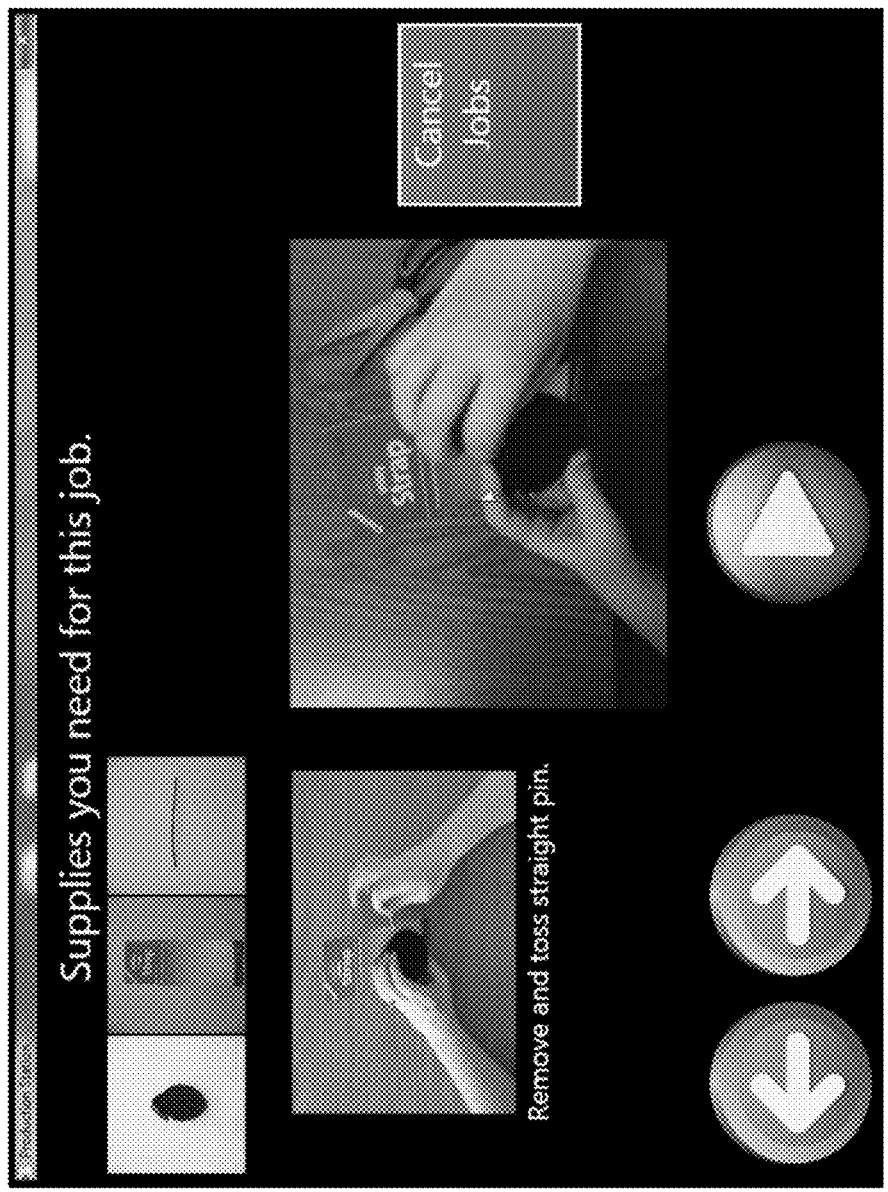
Figure 4U:
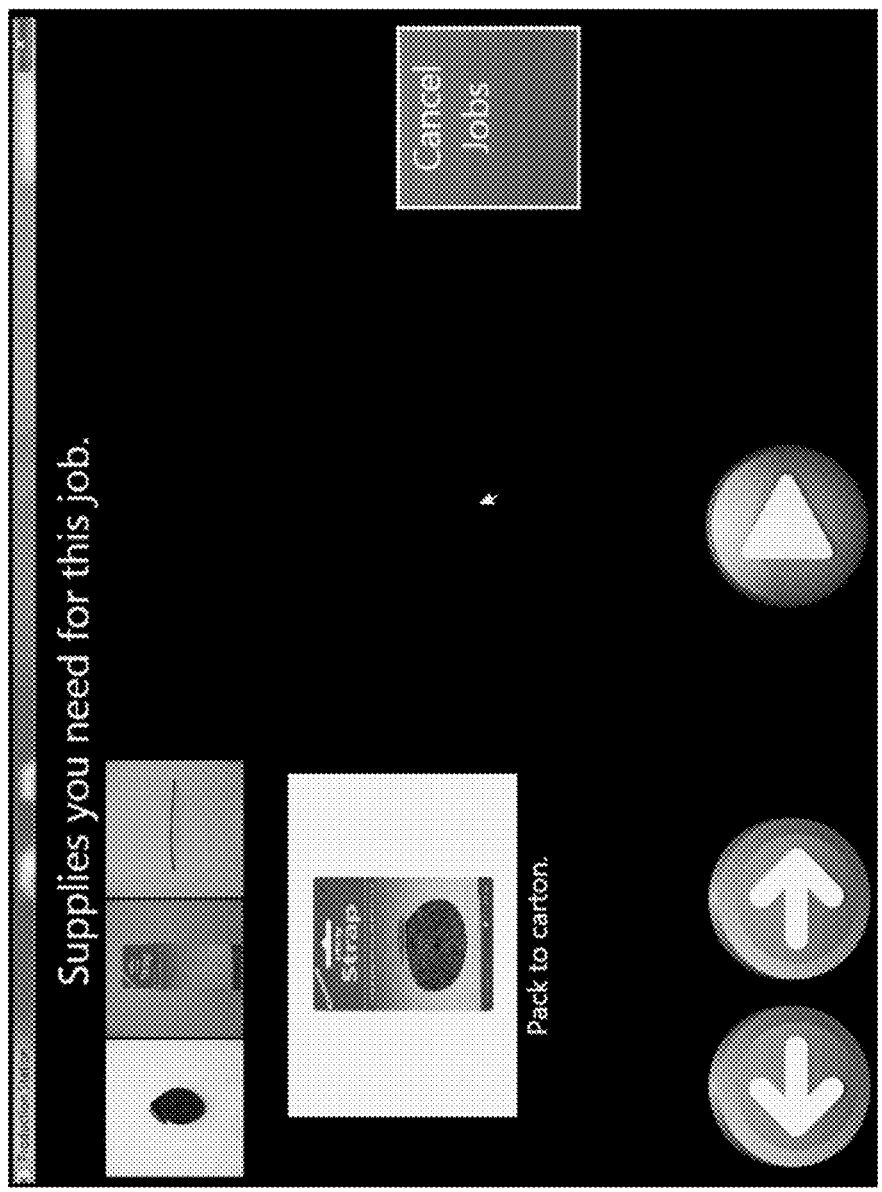
Figure 4V:
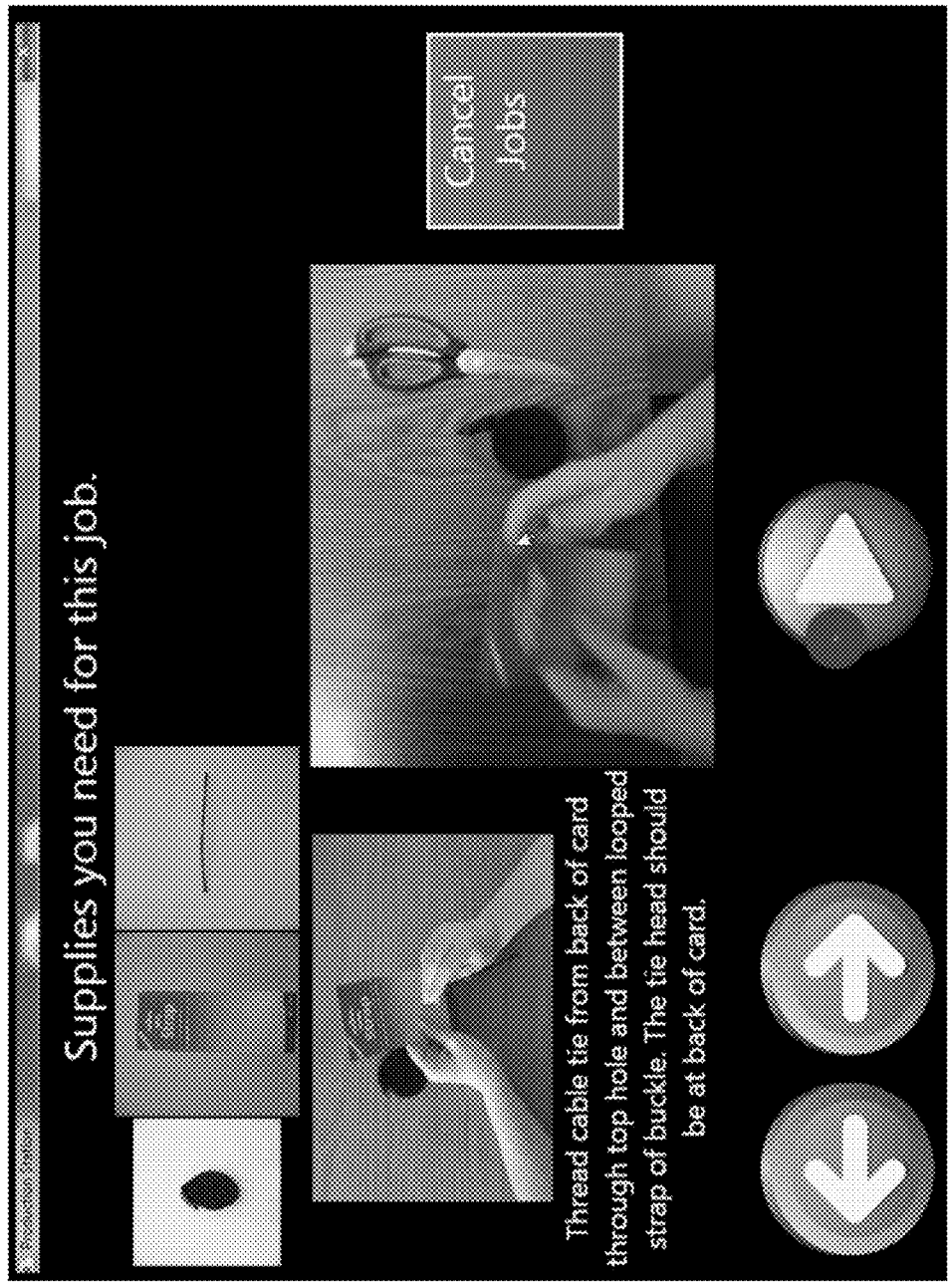
Figure 4W:

FIG. 4O shows how the system may respond to a selection made by a user to begin a particular task or "job." In the example shown, the system projects images of the supplies needed for the job in the upper left corner of the display. Further, the user may be offered icons to maneuver through the user interface presentation pertaining to the job (e.g., the forward and reverse arrow icons in the lower left of the display). Another option presented to the user, as shown, may be a play button icon used to display a video pertaining to the job.

FIGS. 4P-4W show further examples of how the system's user interface may present the user with information to assist the user with the performance of a particular job. As shown, the system's projector may display on the surface any combination of various types of information, such as, photographs, textual instructions, icons, and/or videos. The user can proceed with their review of a series of instructional information at their own pace by selecting the forward and reverse arrow icons. The user may choose to start a video showing the task being performed by selecting the play button for some or all of the steps of the job. The user selections can be made via the user interface displayed on the same surface as where the tasks will be performed, as described previously.

Figure 5:
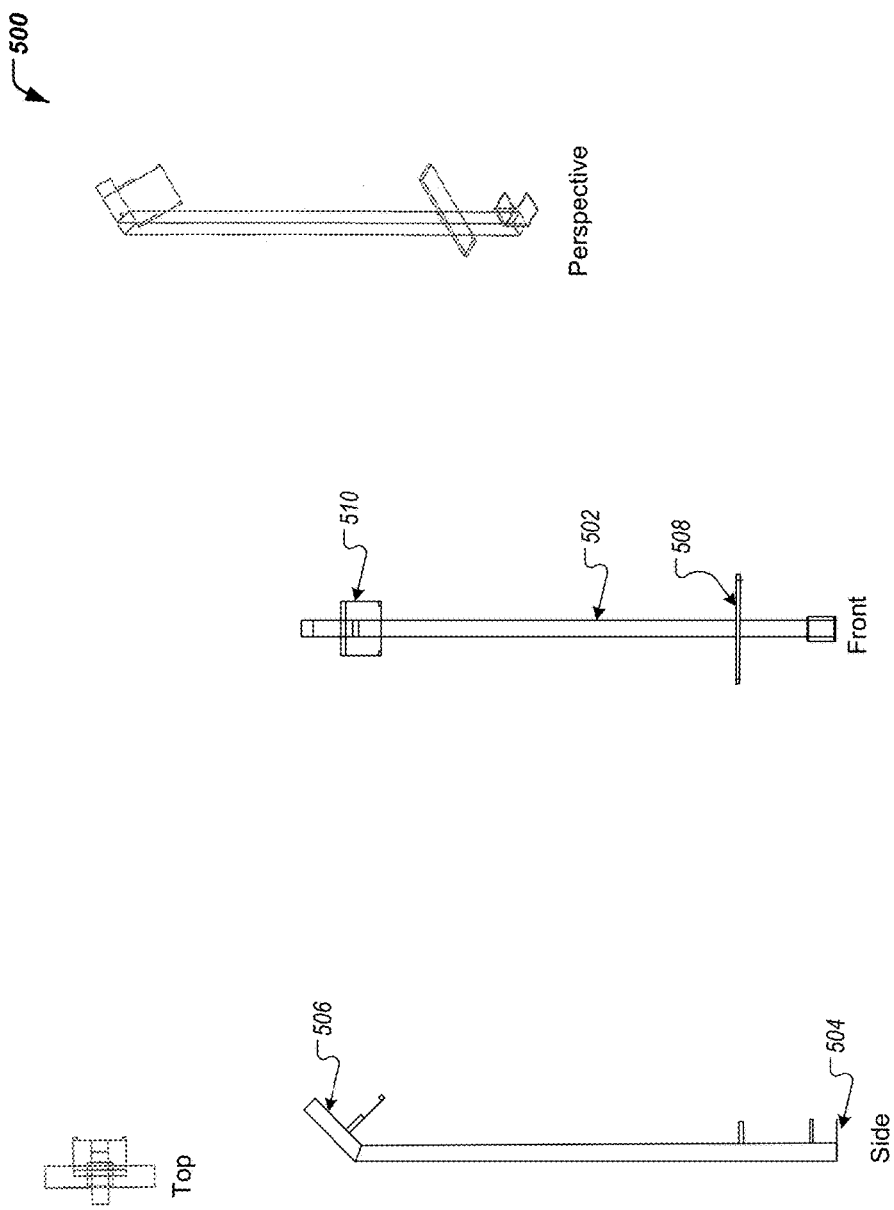
FIG. 5 depicts an example of a support structure that may be used, for example, in conjunction with an example workstation described above.

FIG. 5 depicts an example of a support structure 500 that may be used, for example, in conjunction with an example workstation described above. Support structure 500 can be a generally vertical mechanical member configured to be mounted to the top of a work table/bench, and to support a system's depth sensor and projector. Support structure 500 will typically be made of metal (and/or any other sufficiently strong material), and may be constructed by welding, bolting, or a combination of welding and bolting individual pieces together. As FIG. 5 illustrates, support structure 500 can have a main vertical structural member 502. As an example, main vertical structural member 502 can be made from materials, such as, 2 inch square aluminum tubing, or as a structural weldment of metal bars and pieces. The lower end of main vertical structural member 502 can have an attached table clamp 504 configured for engagement with the top surface of a work table. For example, table clamp 504 (or bracket) can have a c-shaped cross-section as shown in the side view of FIG. 5, which can mate with the side of a typical table/bench top. Table clamp 504 may be attached to a table top in various ways, such as, using a clamp mechanism (not shown) or by simply bolting table clamp 504 to a table top. The top end of main vertical structural member 502 can have an angled portion 506. Angled portion 506 may facilitate the proper orientation of a projector so as to display the system's user interface on the surface. Lower shelf 508 can be used to support the system's depth sensor. Lower shelf 508 can be positioned at a height for a depth sensor mounted thereon to obtain 3D data of the upper torso of a user at the work table. Upper shelf 510 can be used to support the system's projector. As shown, upper shelf 510 can be configured at an angle in order to support a projector in an orientation that causes the projector's images to be displayed on the surface. The dimensions shown in FIG. 5 are in inches and are merely for reference as to one example implementation of a support structure 500. Other dimensions may be used for the support structure 500.

Figure 6A:
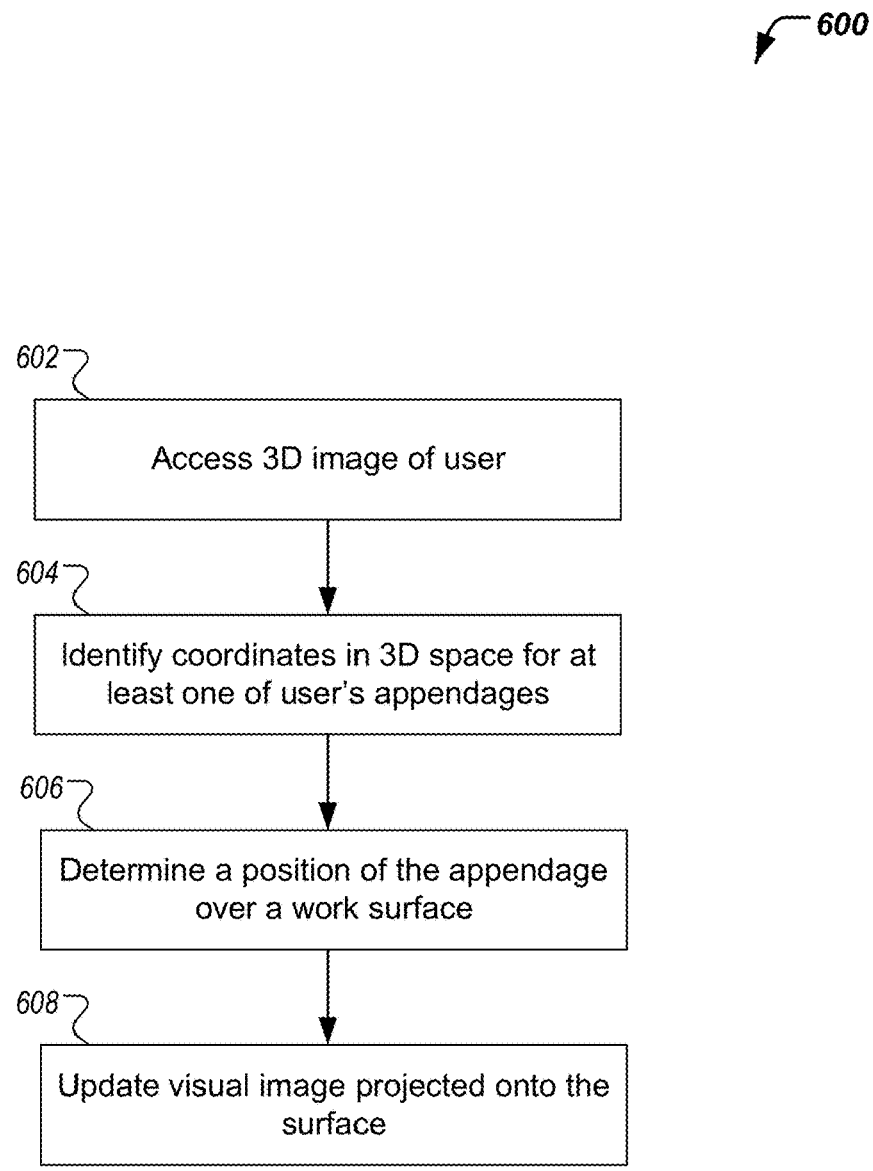
FIGS. 6A-C are flowcharts of example processes for providing interactive interfaces on surfaces, for monitoring for unauthorized visitors, and for detecting falls by a user.

FIG. 6A is a flowchart of an example technique 600 for providing an interactive interface on a work space. The example technique 600 can be performed by any of a variety of appropriate computing device, such as the computing device 108, the computer system 202, and/or the computer system 702 described below.

The technique 600 includes accessing a 3D image (e.g., 3D wireframe image, 3D data of the user) of a user that is provided in real time by a depth sensor (602). For example, the 3D unit 720 of the computer system 702 can access a 3D image of a user that is captured by the depth sensor 706. Using the 3D image, 3D coordinates are identified for one or more appendages of the user (e.g., hand, arm, foot) (604). For example, the body position locator 722 of the computer system 702 can identify the coordinates of various body parts for a user (e.g., arms, legs, torso, head) in 3D space. A position of the appendage over a surface is determined based on the 3D coordinates (606). For example, the surface location correlation unit 724 can correlate the location of a body part in 3D space to a location on a surface and to a location in an interactive interface that is projected onto the surface. A visual image that is projected onto the surface is updated based on the identified position of the appendage (608). For example, the one or more applications 726 can receive information indicating a location of a user's body part (e.g., hand) with regard to an interactive interface that is projected onto a surface and can proceed to update the interactive interface accordingly.

Figure 6B:
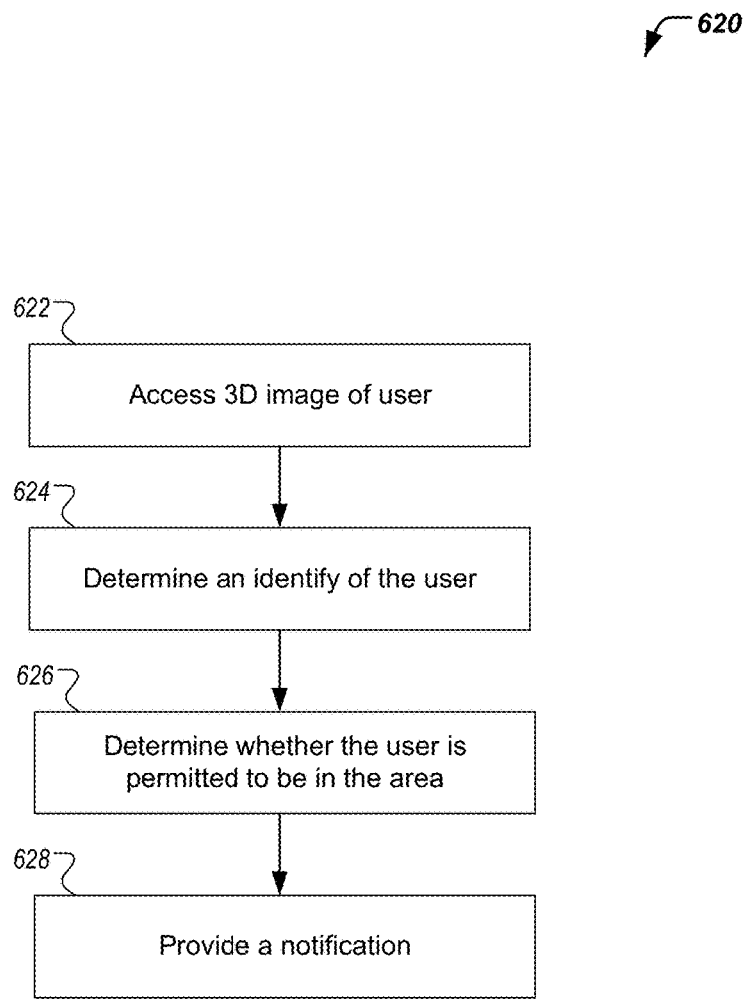

FIG. 6B is a flowchart of an example technique 620 for monitoring for unauthorized users in a particular area. The example technique 620 can be performed by any of a variety of appropriate computing device, such as the computing device 108, the computer system 202, and/or the computer system 702 described below.

The technique 620 includes accessing a 3D image (e.g., 3D wireframe image, 3D data of the user) of a user that is provided in real time by a depth sensor (622). For example, the 3D unit 720 of the computer system 702 can access a 3D image of a user that is captured by the depth sensor 706. An identity of the user can be determined based on a comparison of the 3D image and one or more 3D user models (624). For example, the user identification module 732 can identify a user based on the 3D image obtained by the 3D unit 720 and 3D models for users that are stored in the user profile repository 734. Using the user identification (or information indicating that the user is unknown), a determination can be made as to whether the user is permitted to be in a particular area where the depth sensor is located (626) and a notification can be provided when it is determined that an unauthorized or unknown user is present in the area (628). For example, the user identity can be provided to the permission module 736 and, if the user is determined to not be permitted to be in the location, a notification can be provided by the notification unit 744.

Figure 6C:
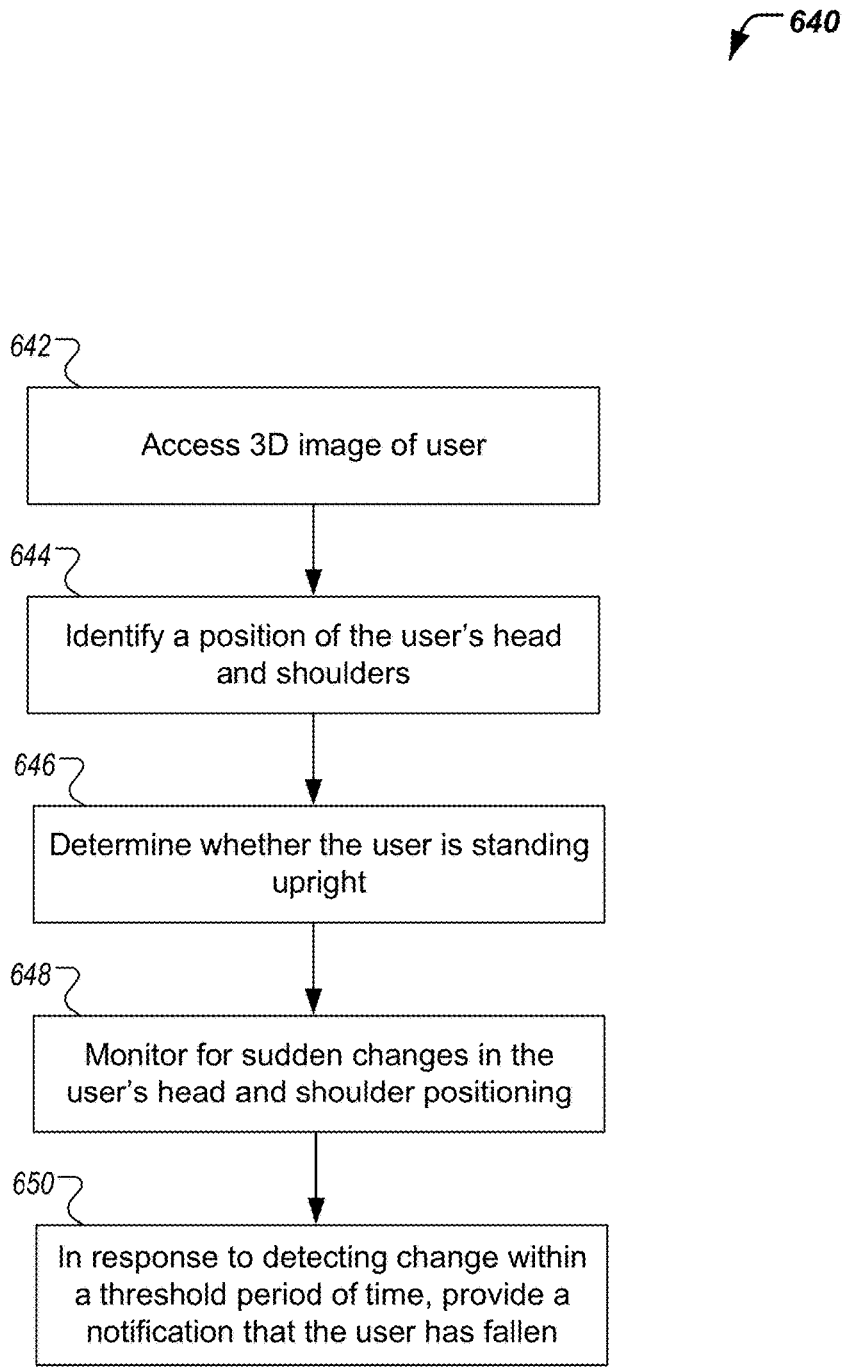

FIG. 6C is a flowchart of an example technique 640 for monitoring for a user falling down. The example technique 640 can be performed by any of a variety of appropriate computing device, such as the computing device, the computer system 202, and/or the computer system 702 described below.

The technique 640 includes accessing a 3D image (e.g., 3D wireframe image, 3D data of the user) of a user that is provided in real time by a depth sensor (642). For example, the 3D unit 720 of the computer system 702 can access a 3D image of a user that is captured by the depth sensor 706. A position of the user's head and the user's shoulders can be identified (644) and, based on the identified position, a determination can be made as to whether the user is standing upright (646). In response to determining that the user is standing upright, the position of the user's head and shoulders can be monitored (648). If a change in the position of the user's head and shoulders is detected over a threshold period of time such that the user's head and shoulders move from a first position where the user's head is above the user's shoulders and the user's shoulders are substantially parallel to the ground to a second position where the user's head is at or below the level of at least one of the user's shoulders and the user's shoulders are within a threshold angle of perpendicular to the ground, a notification can be provided (650). The notification can indicate that the user has fallen. For example, the fall detection unit 752 can perform the steps 644-650 based on 3D information provided by the 3D unit 720 and, if a fall is detected, the fall detection unit 752 can provide a notification using the notification unit 744.

Figure 7:
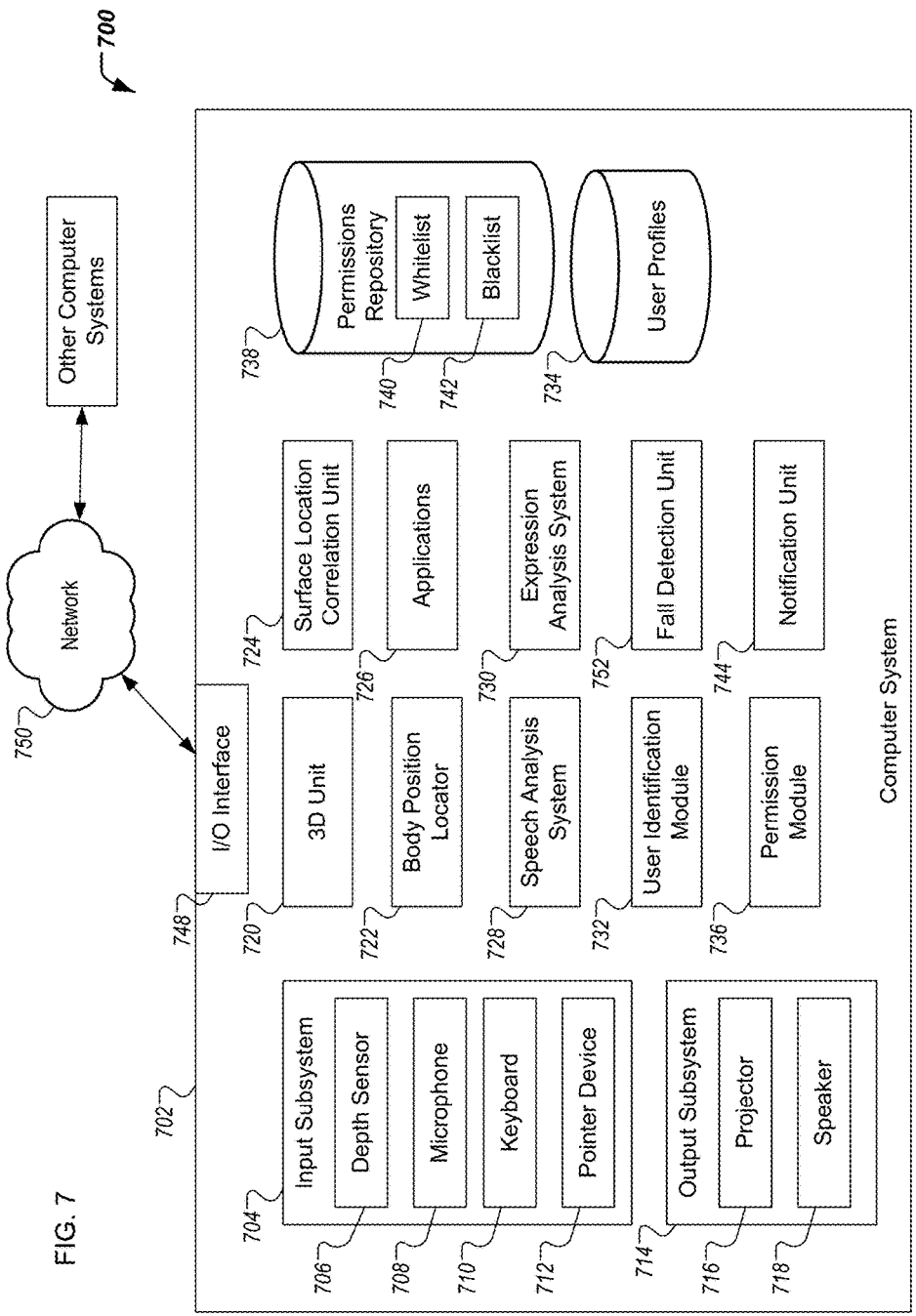
FIG. 7 is a block diagram of an example system for providing an interactive interface on a surface.

FIG. 7 is a block diagram of an example system 700 for providing an interactive interface on a surface. The example system 700 includes a computer system 702 that can be any of a variety of appropriate computer systems, such as a desktop computer, a laptop computer, a smartphone, and/or a network of one or more computing devices.

The computer system 702 includes an input subsystem 704 through which user input can be received. The input subsystem 704 can include a depth sensor 706, a microphone 708, a keyboard 710, and pointer device 712 (e.g., mouse, touchpad). Other components of the input subsystem 704 are also possible. The computer system 702 can also include an output subsystem 714 through which output can be provided by the computer system 702. The output subsystem 714 can include a projector 716 and a speaker 718. Other components of the output subsystem 714 are also possible, such as a display device and/or haptic feedback devices.

The computer system 702 includes a 3D unit 720 that is programmed to generate a representation of a user's body in 3D space, such as generating a 3D wireframe model for a user. The computer system 702 can also include a body position locator 722 that is programmed to determine the position of a user's body within 3D space relative to one or more reference objects, such as a vantage point of the depth sensor 706 and/or a location of a surface that is near the user. The computer system 702 can also include a surface location correlation unit 724 that is programmed to correlate the position of a user's body to locations of a surface onto which an interactive interface is being projected and, as a corollary, can identify the positioning of the user's body relative to areas of the projected interface. Information identifying the positioning of the user's body relative to areas of the projected interface can be provided by the surface location correlation unit 724 to one or more applications 726 that are providing the interface on the surface. The one or more applications 726 can receive the positing information and, when appropriate, visually adjust the user interface, which is provided by the applications 726 to the projector 718.

The computer system 702 also includes a speech analysis system 728 that can detect and interpret speech that is received through the microphone 708. The computer system 702 can further include an expression analysis system 730 that can detect expressions (e.g., facial expressions, body language) that may be based on small physical movements, such as a user blinking his/her eyes, nodding his/her head, and shrugging his/her shoulders. The input detected from the speech analysis system 730 and the expression analysis system 730 can be provided as input to the one or more applications 726.

The computer system 702 can also include a user identification module 732 that can be programmed to identify a user by comparing 3D information provided by the 3D unit 720 to information contained in user profile repository 734 that identifies unique body size information for users (e.g., spacing between joints). User identifications from the user identification module 732 can be provided to a permission module 736 that is programmed to determine whether an identified user is permitted to be in a location where he/she has been detected. The permission module 736 can use a permissions repository 738 to make such determinations. The permissions repository 738 can include a whitelist 740 that identifies users who are permitted to be in particular locations and a blacklist 742 that identifies users who are not permitted to be in particular locations. When a user is identified as not be permitted in a particular location, the permission module 736 can provide such information to a notification unit 744 that is programmed to provide a notification of such an unpermitted user to one or more other computer systems 746 using an I/O interface 748 (e.g., network card) and a communication network 750 (e.g., the internet). The computer system 702 can also include a fall detection unit 752 that is programmed to detect when a user has fallen based on 3D information from the 3D unit 720.

The components 720-732, 736, 744, and 752 of the computer system 702 can be implemented in hardware (e.g., application specific integrated circuits (ASICs)), software, and/or firmware.

The description and discussion of the systems and instrumentalities of FIGS. 1-7 herein can be extended to incorporate other user interfaces, such as touchscreens, to assist people with disabilities in accessing and interacting with content on devices and systems. Such extensions may not require a projector or 3D depth sensor. As one example, the user interfaces of the systems and instrumentalities described and discussed through FIGS. 1-7 can be extended to touchscreen user interfaces on which instructional or tutorial videos are presented to the user. The instructions and videos that are presented to users via touchscreen interfaces may provide the users, for example, with step-by-step instructions. The user interfaces on such devices may also be configured specifically for people with disabilities.

Figure 9:
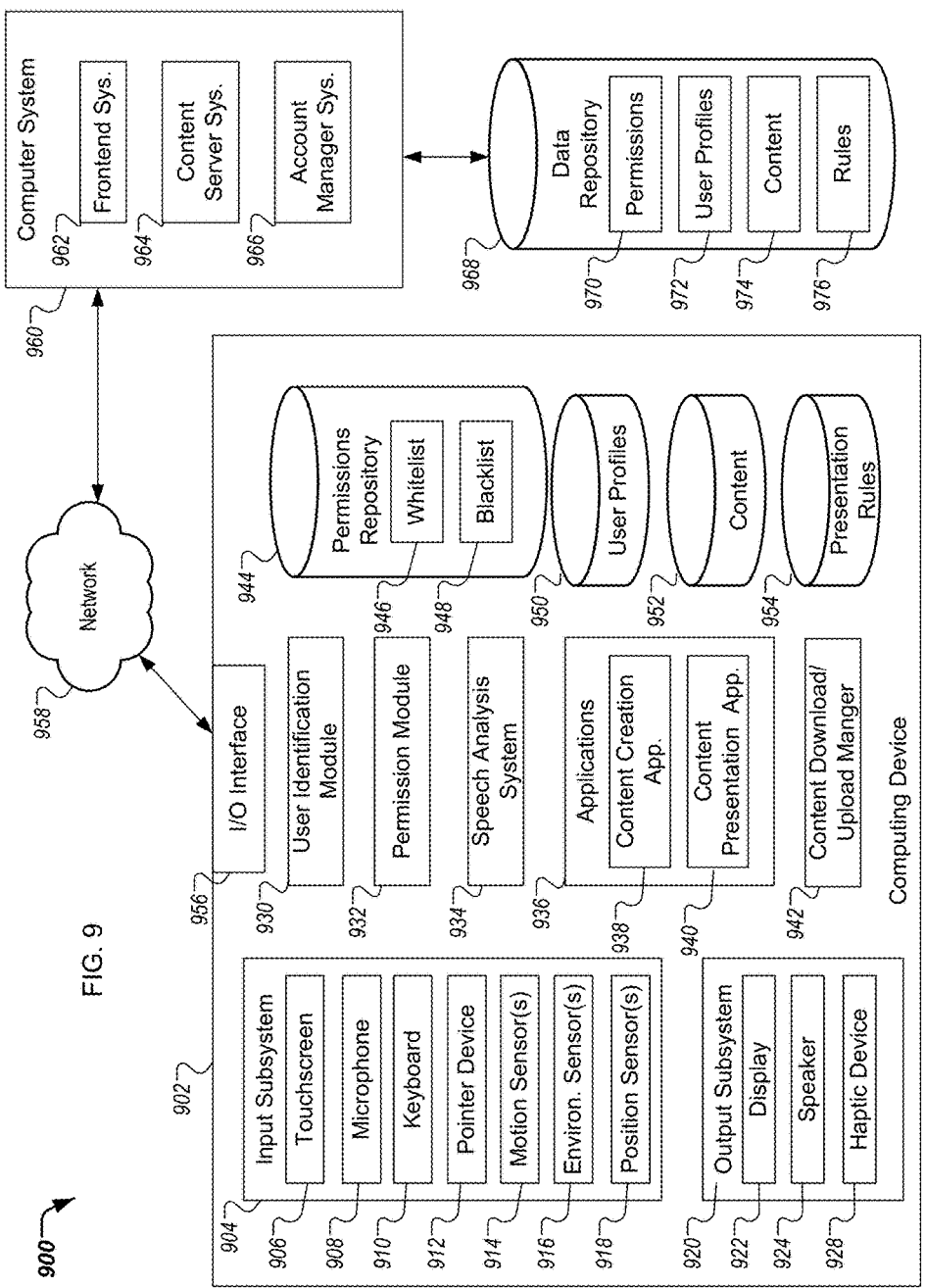
FIG. 9 is a block diagram of example computing systems, repositories, and modules.

FIG. 9 is a block diagram of an example system 900 for providing an interactive interface on an example computing device 902. The example system 900 includes a computing device 902 that can be any of a variety of appropriate computer systems, such as a desktop computer, a laptop computer, a smartphone, a tablet computer, and/or a network of one or more computing devices.

The computing device 902 includes an input subsystem 904 with one or more components such as a touchscreen 906 through which touch-based user input can be received. The touchscreen 906 can include resistive touchscreens, surface acoustic wave touchscreens, capacitive touchscreens, infrared grid touchscreens, dispersive signal touchscreens, acoustic pulse recognition, and/or other touchscreen input recognition technologies. Other components of the input subsystem 904 are also possible and can include a microphone 908, a keyboard 910, a pointer device 912 (e.g., mouse, stylus), motion sensors 914 (e.g., accelerometers, gyroscopes), environment sensors 916 (e.g., temperature sensors, light sensors, pressure sensors, humidity sensors), and/or position sensors 918 (e.g., geomagnetic field sensors, orientation sensors). With these components, the computing device 902 can measure motion, orientation, and various environmental conditions. For example, the motion sensors 914 can measure acceleration forces and rotational forces along three axes and include accelerometers, gravity sensors, gyroscopes, and rotational vector sensors. The environmental sensors 916 measure various environmental parameters, such as ambient air temperature and pressure, illumination, and humidity and include barometers, photometers, and thermometers. The position sensors 918 measure the physical position of a device, such as through GPS, orientation sensors and magnetometers.

The input subsystem 904 can include additional and/or alternative components that are not depicted in FIG. 9. For example, the input subsystem 904 can also include assistive technologies, such as one or more switch accesses and switch interfaces. A switch access can be a device with a mechanism for a user with physical or cognitive impairment to provide input to a computer device, such as sip-puff inputs, pushing inputs, pulling inputs, pressing inputs, blink-based input, and/or squeezing inputs. Switch accesses can be customized for particular user abilities, such as having adjustable press and/or push sensitivity, and/or adjustable physical components to best suit a user's ability.

The computing device 902 can also include an output subsystem 920 through which output can be provided by the computing device 902. The output subsystem 920 can include a display 922 (e.g., display underlying and/or integrated with a touch-sensitive surface), a speaker 924, and/or a haptic device 928 (e.g., device capable of providing haptic feedback to users). Other components of the input subsystem 940 and/or the output subsystem 920 are also possible.

The input subsystem 904 of the computing device 902 can be programmed to receive user input from one or more of the input devices 906-918. Additionally, the input that is received can be interpreted differently depending on the particular user who is using the device 902. For instance, some users may have particular visual or physical impairments that cause them to bias touch-based input in particular directions, orientations, touch patterns, force amounts, and/or other variations. For example, a particular user may have an impairment that causes the user's touch-based input to be biased to the right—meaning that the user contacts the touchscreen to the right of selectable elements that are displayed on the touchscreen. To accommodate different biases, which be the result of various user impairments, the device 902 can create, store, and use customized user profiles (stored in a user profile repository 950, such as a database) that are specific to each user and that specifies parameters or other criteria specific to the input devices of the input subsystem 904. The raw inputs to the input subsystem 904 can be correlated with the parameters and criteria associated with that user through his/her user profile 950 resulting in more accurate assessment of the user's intended input. In this way, the user's unique abilities to interact with the computing device 902 may be accounted for and use to more accurately interpret input from users, regardless of impairments. For instance, a first user may have the motion sensors deactivated, relying solely on the touchscreen and the microphone. In another case, a second user may use only the motion sensors and a pointer device (e.g., a stylus). In other cases, a specific user may rely on any combination of one or more input devices of the input subsystem 904.

The computing device 902 may also include a speech analysis system 934 that can detect and interpret speech that is received through the microphone 908. The input detected from the speech analysis system 934 can be provided as input to the one or more applications 936.

The output subsystem 920 of the computing device 902 can include a haptic device 928. The haptic device 928 provides haptic feedback to the user by recreating the sense of touch by applying forces, vibrations, or motions to the user in response to their inputs or in conjunction with other outputs. For instance, haptic devices may enhance the control of devices and may incorporate tactile sensors that measure forces exerted by the user on the interface.

The computing device 902 may include a permission module 932. The computing device 902 may further include a user identification module 930 that can be programmed to identify a user by comparing information provided by a component of the input subsystem 904 to information contained in user profiles repository 950 that contains unique information for users (e.g., performing biometric identification of a user, such as through fingerprint scanning and/or optical comparisons of user features (e.g., eye, ear, face)). User identifications from the user identification module 930 can be provided to a permission module 932 that is programmed to determine whether an identified user is permitted to access the computing device 902 and/or applications 936 he/she has selected. The permission module 932 can use a permissions repository 944 to make such determinations. The permissions repository 944 may facilitate distributing and editing content when multiple users access a particular computing device 902. The permissions repository 944 can include a map of users to the applications 936 they are permitted to access, a whitelist 946 that identifies users who are permitted access to the computing device 902 or applications 936, and a blacklist 948 that identifies users who are not permitted such access. When a user is identified as not to be permitted such access, the permission module 932 can provide denial of access information to an output subsystem 920 or to one or more other computer systems 960 using an I/O interface 956 (e.g., network interface) and a communications network 958 (e.g., LAN, WAN, WLAN, VPN, internet).

The components and subsystems 904, 906-918, 920, 922-928, 956, 930, 932, 934, 936, 938-940, 942, 944, 946-948, 950, 952, 954 of the computing device 902 can be implemented in hardware, software, and/or firmware.

As shown in FIG. 9, the system 900 includes another computer system 960 that is programmed to manage content and accounts that are used by the computing device 902 (and other computing devices not depicted). The computer system 960 may include one or more computing devices that can communicate with the computing device 902, such as a server system, a cloud system, another computing device 902, and/or other computing system. The computer system 960 contains a frontend system 962, a content server system 964, and an account manager system 966. The fronted system 962 communicates with the computing device 902 via the network 958 or other modes including memory and storage devices and direct link cables (e.g. USB, RS-232, Thunderbolt).

The content server system 964 serves content to the computing device 902 facilitated by communication with the content download manager 942. The account manager system 966 manages user accounts and facilitates the distribution of information from the data repository 968 to computing devices 902 based on the user associated with the device. For instance, a user of the computing device 902 may log in to the device 902. The user identification module 930 may verify the identity of the user and can be programmed to identify the current user of the computing device 902 so that the appropriate user profile 950 can be retrieved and loaded for use. The computing device 902 may then verify the user's permissions using the permission module 932, the permissions repository 944, and the permissions 970 of the data repository 968. The computing device 902 can additionally load the user's profile 950, content 952, and presentation rules 954, and verify that such information is up to date by communicating with the computer system 960 and the data repository 968 via the network 958. The computing device 902 can receive updated permissions 970, user profiles 972, content 974, and rules 976 from the data repository 968 via the computer system 960 and the network 958. The computing device can update its local permission repository 944, user profiles 950, content 952, and presentation rules 954 with this information received from the computer system 960 and the data repository 968. The data repository 968 can receive updates to permissions 970, user profiles 972, content 974, and rules 976 from the computer system 960 and computing device 902.

The applications 936 (e.g., mobile apps, software applications, application specific integrated circuits (ASICs)), which can be, for example, downloaded and installed on the computing device 902, can include a content creation application 938 and a content presentation application 940. The content creation application 938 can be programmed to assist users in creating content for users with disabilities. The content creation application 938 can be programmed to create content 952 and presentation rules 954 that may be stored as content 974 and rules 976 that are uploaded to the computer system 960 and stored in the data repository 968. The content presentation application 940 can be programmed to present content in a manner that is effective for people with disabilities. For example, the content presentation application 940 can present content in user interfaces that provide consistent with the presentation rules 954 and the user profile 950 associated with the current user. The applications 936, including the content creation application 938 and the content presentation application 940, can use presentation rules 954 of the computing device or rules 976 of the data repository 968. There may be multiple different types of rules 976 and presentation rules 954 associated with the content. These multiple different types of rules 976 and presentation rules 954 may be selected from by the content creation application 938 and/or used by the content presentation application 940 to tailor the presentation to the user based on the user profile 950.

The content download/upload manager 942 of the computing device 902 can be programmed to synchronize content with the computer system 960. For example, the content download/upload manager 942 will retrieve content from and upload content to the computer system 960 when a connection between the computer system 960 and the computing device 902 is present, such as through the network 958. To accomplish this, the content download/upload manager 942 may be programmed to download or upload data when the data requires synchronization. The content download/upload manager may then synchronize the data immediately or delay the download/upload until a more opportune time (e.g., when network traffic levels are low). The content download/upload manager 942 may coordinate with the content server system 964 of the computer system 960 to push or pull content between device 902 and system 960; the content download/upload manager 942 may also stream the content as needed from the content server system 966.

The user profiles repository 950 of the computing device 902 can store user profiles that are used to determine how best to present content and tailor user interfaces to each particular user who is using the computing device 902. The content repository 952 contains content to be presented to the user. The content may be generated on the computing device 902 and/or downloaded from the computer system 960. The presentation rules repository 954 contains rules dictating how the content is to be presented to the user via the user interface. Presentation rules 954 may dictate, inter alia, spacing (e.g., minimum, maximum) between graphical elements (e.g., icons, prompts for input on the touchscreen 906), the size and/or bias of selection areas surrounding graphical elements (e.g., selectable areas for icons and/or prompts may different (e.g., larger, biased in one or more direction) from the graphical icons and prompts that are displayed on a touchscreen, for example, to facilitate receipt of input from users without complete fine digital motor control), textual display parameters (e.g., font, text size, contrast between font and background, font weighting, line size and spacing), the amount/number of visual elements displayed at once (e.g., number of graphical elements on the screen at a given time), identification of components of the output subsystem 920 that should be used to output information to the user, identification of components of the input subsystem 904 that should be used to obtain input from the user, and/or other appropriate designations (e.g., defining the minimum and maximum length of content, including lengths of descriptions, lengths of words in the descriptions, numbers of steps, numbers of steps in a task, numbers of tasks in a job, length of audio/video clips, playback speeds, playback volume, automatic playback settings, and textual and audio/video content tailored to different cognitive levels of users).

Figure 10:
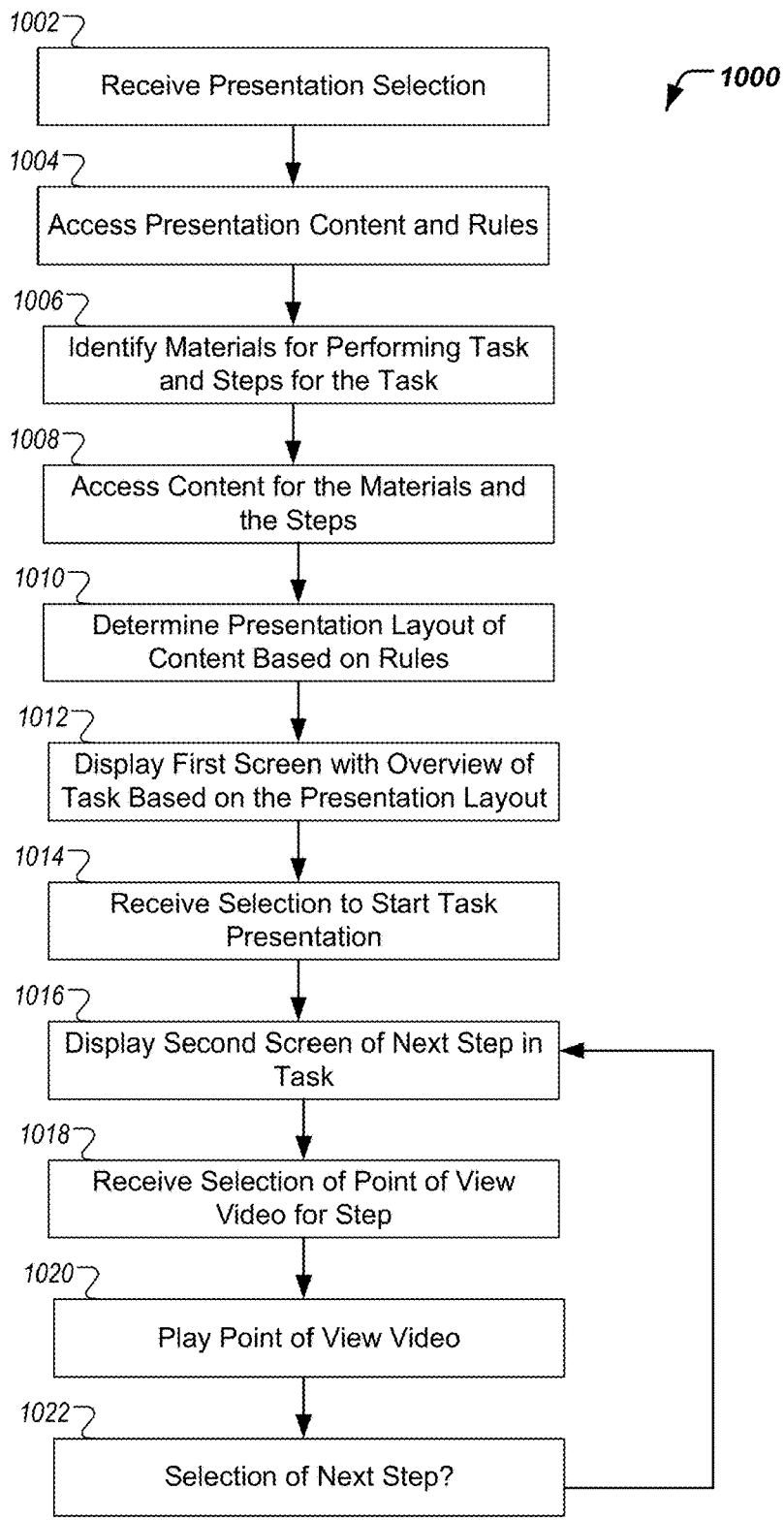
FIG. 10 is a flowchart of example processes for configuring, administering, or using the interactive interfaces.

FIG. 10 is a flowchart of an example technique 1000 for providing a disability-accessible user interface on a computing device. The example technique 1000 can be performed on any of a variety of appropriate computing devices, such as the computing device 902 described above with regard to FIG. 9.

Selection of an interactive presentation with step by step instructions for users with disabilities to learn a task can be received (1002). For example, a user can select one of the images depicted in FIG. 11A (described below) that are associated with tasks. In response to receiving the selection, content for the selected interactive presentation and rules for presenting a user interface for the interactive presentation in a manner that is suitable for a user with disabilities can be accessed (1004). For example, the computing device 902 can retrieve content from the content repository 952 and rules from the presentation rules repository 954. The rules that are retrieved may be specific to the user, the particular presentation/task, the computing device 902, the input subsystem 904, the output subsystem 920, or combinations thereof.

Materials for performing the task and steps for the task can be identified (1006). For example, the computing device 902 can identify materials that a user would need to perform the task, such as ingredients for a recipe, raw materials that will be combined into a finished product, and/or other materials that are appropriate for the selected task. Information that is identified for the materials can include, for example, digital images that represent the materials, text that describes the materials, audio files that describe/identify the materials, video that depict the materials, and/or combinations there. The computing device 902 can identify the steps for the task that is depicted in the selected presentation. Each task can include one or more steps, and each step can include associated content that can be used to teach a user about the steps. For example, the information that is identified for the steps can include videos depicting the steps (e.g., point of view videos so that a user can view the step being performed as if they were performing it), text describing the steps, and/or warning codes to notify users of potential dangers associated with the steps. The content for the materials and the steps that have been identified for the presentation can be accessed (1008). For example, the computing device 902 can retrieve relevant content describing the materials and the steps from the content repository 952 for the selected presentation. This content can include, for example, digital images, text, videos, warning codes, and/or other appropriate information.

A presentation layout for the content can be determined based on the rules (1010). For example, a presentation layout can include layout parameters that are customized for the particular user of the device 902, the particular presentation that has been selected, and/or the particular output subsystem 920 of the computing device 902 (e.g., customized for the size of the display 922, the capacity of the speakers 924, the type of haptic device 928). For instance, the presentation layout can include identifying a minimum image size for digital images, a minimum video size for videos, a minimum spacing between the visual elements in the user interface, a minimum font size for particular textual items, a maximum number of visual elements and/or an amount of text to present, and/or other appropriate limitations. The steps 1004-1010 may be performed in advance (e.g., cached in volatile memory) of presenting the selected interactive presentation so that the interactive presentation is presented without delay, interruption, or loading that may be associated with identifying and/or retrieving content from non-volatile memory and/or from a networked resource.

A first screen providing a user interface with an overview of the task for the selected presentation can be displayed (1012). For example, this display of the first screen can include displaying digital images sized according to a minimum image size and arranged apart from each other by at least a minimum spacing, displaying a first text using a minimum font size and adjacent to and separated from corresponding digital images with at least the minimum spacing, and displaying a button (or other selectable element) to begin the selected presentation separated from the digital images and text by at least a minimum spacing. For instance, the user interface depicted in FIG. 11B is an example first screen that can be displayed.

A selection to start the task presentation can be received (1014). For example, a user can select a button to begin displaying a first step in the task on the touchscreen 906 of the computing device 902. In response to receiving the selection, a second screen of the user interface can be displayed that includes a next step for the task (1016). This can include displaying, for example, a video that displays the step (such as a point of view video, text describing the step and/or the video, warnings associated with the step, and/or a repeat button to repeat the video. In some implementations, the video may start playing automatically when the second screen is displayed and/or after a delay period (e.g., 5 seconds after the second screen loads, 10 seconds after the second screen loads). For instance, an example of a second screen is depicted in FIG. 11C. Selection of an area of the touchscreen that is associated with the video can be received (1018) and, in response to receiving the selection, the video can be played (1020).

If a user selects a next step for the task that is part of the interactive presentation, then the next step can be displayed (1022). If there is a next step and the user has selected presentation of the next step, then the steps 1016-1022 can be repeated.

Figure 11A:
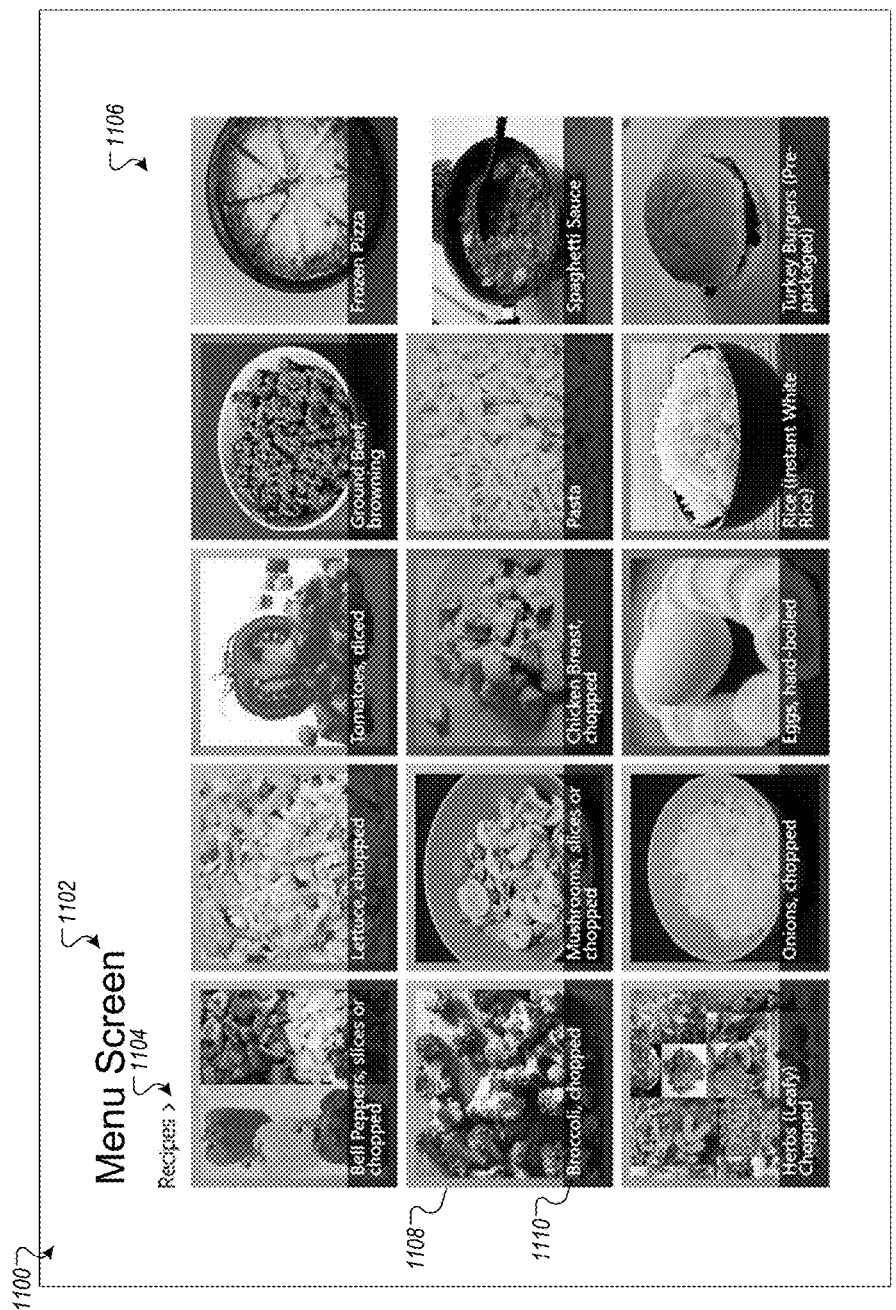
FIGS. 11A-C depict example screens from an interactive presentation.
Figure 11B:
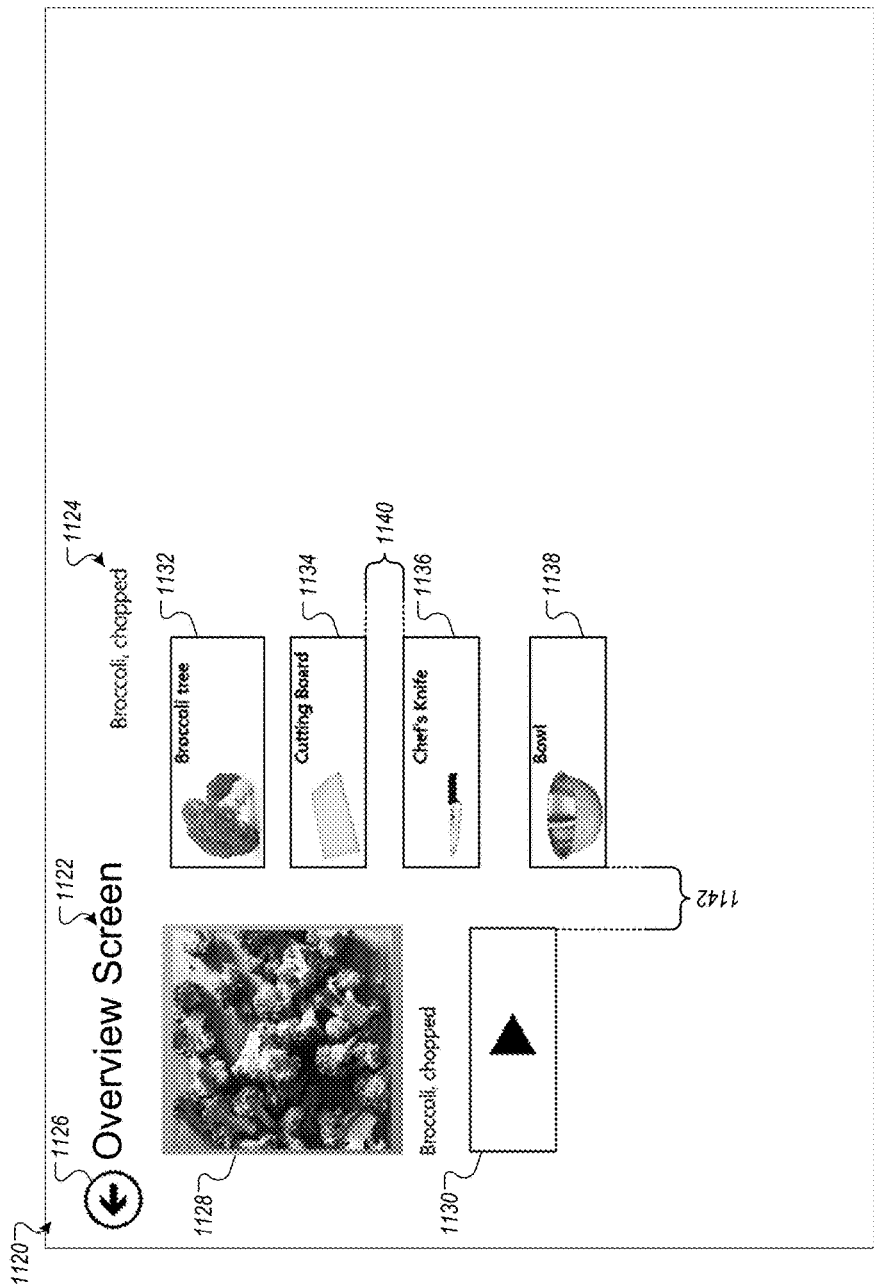
Figure 11C:
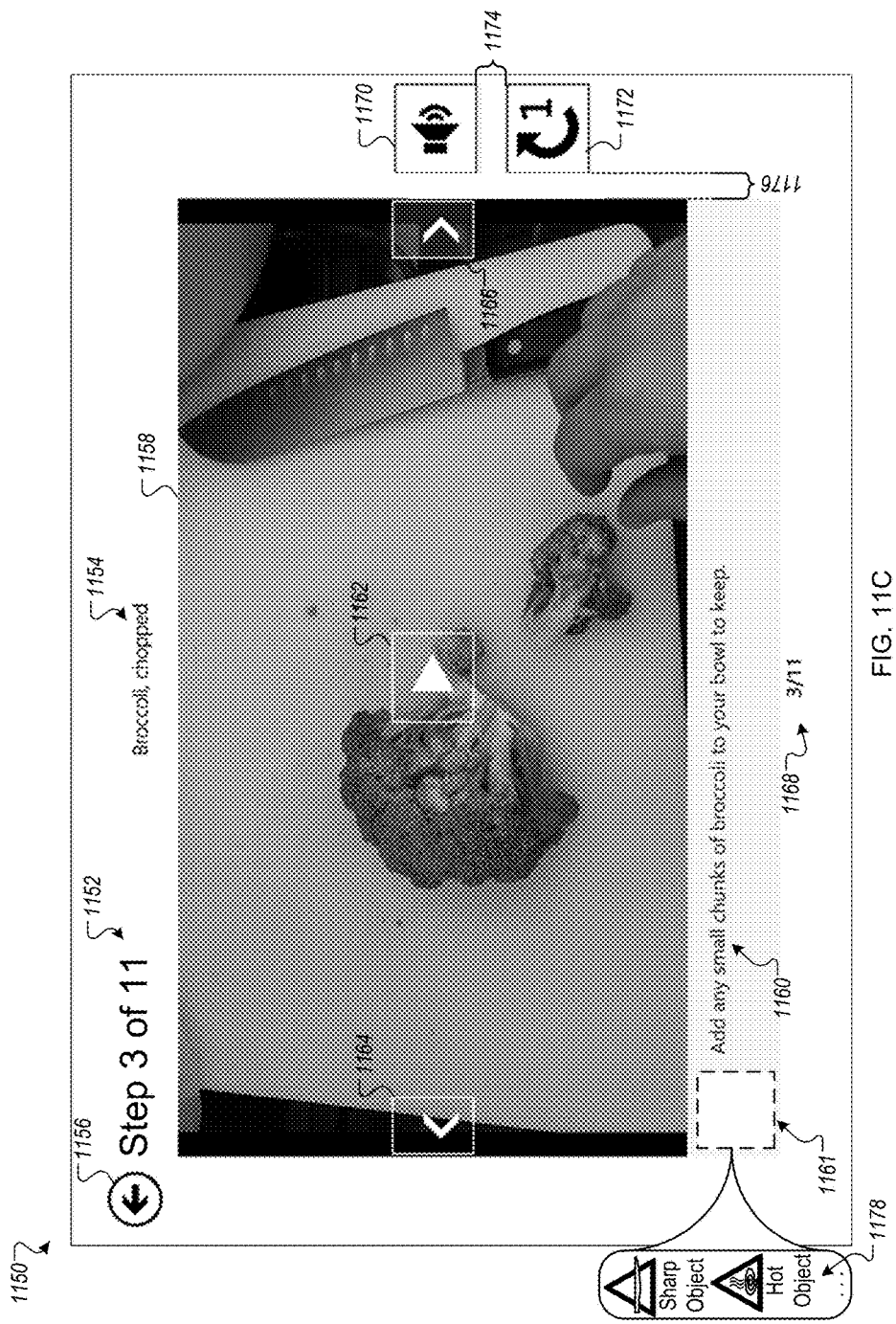

FIGS. 11A-C are screenshots of example user interfaces for presenting content to users. The example user interfaces depicted in FIGS. 11A-C can be presented, for example, by the content presentation application 940 on the computing device 902.

FIG. 11A is menu screen 1106 of the user interface 1100 showing exemplary jobs or lessons that can be selected. The menu screen 1106 includes a title 1102, a navigation path 1104, images of the job or lesson 1108, and descriptive text of the job or lesson 1110. The user interface 1100 may be displayed in a variety of ways. The user interface 1100 display may vary based on the individual user, including as defined in the user profiles 950, the content 952, and the presentation rules 954. Here, the jobs or lessons relate to food service, but the jobs or lessons may relate to other industries. Some further examples include product assembly, product packing and shipping, logistics, building services, education, worker training, and other industries. Selecting a jobs or lessons transitions the device to the screen displayed in FIG. 11B.

FIG. 11B is an overview screen 1120 for a job or lesson. The overview screen 1120 includes an image 1128 of the job or lesson, a title related to the current screen 1122, a description of the job or lesson 1124, and a back button 1126 to navigate to the previous screen, here the menu screen 1106 of FIG. 11A. The overview screen also contains a list of supplies 1132-1138 and a button 1130 to start the job or lesson. The supplies 1132-1138 can be selectable and when selected can provide more information about that selected supply (e.g., audio describing the selected supply, video showing the supply, video showing interactions with the supply, video showing the supply relative to other supplies in the job or lesson, information identifying where the supply may be found). The supplies 1132-1138 are separated by a minimum horizontal spacing 1142 and a minimum vertical spacing 1140. The minimum horizontal spacing 1142 and minimum vertical spacing 1140 may be defined as presentation rules 954, 976 for each user in the user profiles 950, 972 and also may be defined for each cognitive level of user. The minimum horizontal and vertical spacings 1142, 1140 may differ with respect to each other and may be modified to maintain a constant spacing ratio.

FIG. 11C is an example screen 1150 of the lesson or job. The example screen 1150 includes an image or video 1158 of the job or lesson, a title related to the current screen 1152, a description of the job or lesson 1154, and a back button 1156 to navigate to the previous screen, here the overview screen 1120 of FIG. 11B. The image or video 1158 is depicted in FIG. 11C as a point-of-view video, but may be a video, image, or animation from any perspective. The example screen 1150 also contains a text box 1160 describing the step. The rules related to allowable text of the text box 1160 may be defined as presentation rules 954, 976 for each user in the user profiles 950, 972 and also may be defined for each cognitive level of user. A warning area 1161 may be pre-defined to appear in a consistent location according to the presentation rules 954, 976. The warning area 1161 provides an area where warnings associated with the lesson or job or current step of the lesson or job may be presented, when applicable, to the user. Example warnings 1178 here may include sharp object or hot object to remind the user that the present task involves a knife and may involve cooked broccoli. A play button 1162 allows the user to play the video or animation 1158 (after the video has played in response to the play button 1162 being selected, the play button 1162 can reappear to allow the user to select it again and to repeat the video). The back button 1164 allows the user to move back to the preceding step and the forward button 1166 allows the user to move forward to the next step of the lesson or job. An audio button 1170 may be provided to adjust the volume of, or mute or unmute, any voice guidance or audio presentation associated with the step. A repeat button 1172 allows the user to return to the first step of the presentation regardless of which step the user is currently on for the lesson or job. Minimum horizontal spacing 1176 and minimum vertical spacing 1174 may be defined and associated with any of the audio button 1170, the return to the first step button 1172, the warning area, 1161, the description 1154, the text box 1160, and the image, video, or animation 1158. The minimum horizontal spacing 1176 and minimum vertical spacing 1174 may be defined as presentation rules 954, 976 for each user in the user profiles 950, 972 and also may be defined for each cognitive level of user. The minimum horizontal and vertical spacings 1176, 1174 may differ with respect to each other and may be modified to maintain a constant spacing ratio. A progress indicator 1168 may be presented to the user indicating the current step or time remaining in the lesson or job. The progress indicator 1168 may be text or any other visual representation of progress, including a meter or bar.

The user interface may be presented on a variety of devices, including a touchscreen tablet, a touchscreen monitor, a virtual reality headset (e.g., Oculus Rift), or any other interactive display. Similarly, input from the user can be received in a variety of ways, including touch, verbal commands, motion, neural stimulation, etc.

FIGS. 12A-E are screenshots of example user interfaces for creating and managing jobs or lessons to be presented to users. FIGS. 12B-E present exemplary user interfaces presuming selection of the specific example job 1226. The example user interfaces depicted in FIGS. 12A-E can be presented, for example, by the content creation application 938 on the computing device 902.

Figure 12A:
FIGS. 12A-E depict example configuration or administration interfaces.

FIG. 12A shows an overview interface of the computer system 960. The overview interface may contain a header 1200 with title and navigable headings that represent types of jobs or lessons. Selection of a navigable heading results in display of all jobs or lessons of a single type. The display of all jobs or lessons of a single type may span multiple pages or screens and an interface may be provided to navigate between pages or screens listing the jobs or lessons of a single type. FIG. 12A provides an example where the Recipe navigable heading type 1202 has been selected. Recipes and Production are two types of jobs or lessons shown here as navigable heading types; other categories of jobs or lessons may be created and associated with a different navigable heading type. The overview interface allows a supervisor or educator to create new 1204 jobs or lessons, view jobs or lessons in a list or table 1208, and change the order 1206 of the jobs or lessons. A list or table 1208 of the jobs or lessons for the selected category may provide a name 1210, a status 1212, one or more associated images, videos, animations, or audio files 1214, an edit button or link 1216, a details button or link 1218, a delete button or link 1220, a supplies button or link 1222, an instructions button or link 1224, and other content generation or modification options. Selecting the edit link 1216 takes the user to the edit interface of FIG. 12E. Selecting the details button 1218 takes the user to the details interface. The details interface may provide information such as which users are authorized for the lesson or job, which devices are loaded with the lesson or job, when the lesson or job was created, who created the lesson or job, and the user ability level required of the lesson or job. Selecting the delete link 1220 deletes that lesson or job; a confirmation screen may be presented to the user when the delete link is selected. Selecting the supplies link 1222 takes the user to the supplies interface of FIG. 12B. Selecting the instructions link 1224 takes the user to the instructions interface of FIG. 12D.

Figure 12B:
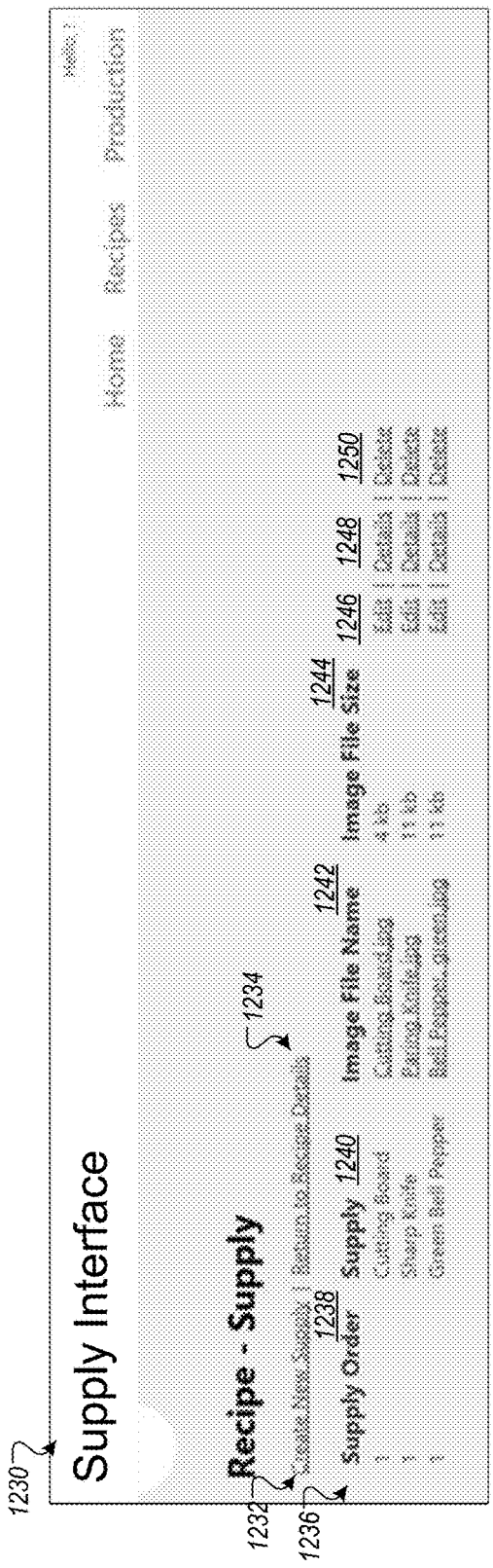

FIG. 12B depicts an example of the supply interface displayed to the user following selection of the supplies button 1222 for example recipe 1226 of FIG. 12A. The supply interface may also contain a header 1230 with title and navigable headings that represent types of jobs or lessons. The supply interface also contains buttons or links 1232, 1234 to associate a new supply with the job or lesson and to navigate back to the job or lesson overview screen. The supply interface contains a list of the supplies 1236 associated with the recipe 1226. The list of supplies 1236 provides a supply order 1238 (e.g., feature to allow for ordering a quantity of supplies when making a request in production environments, which could appear in the communication to, for example, a site supervisor, such as the communication in FIG. 4I that would include the quantity of the requested supply based on what was entered in 1256) indicating the order for using the supplies or whether they are all used at the same time, the name 1240 of the supply, an associated image, video, animation, or audio file 1242, and file size information 1244. The supply interface also provides the ability to edit 1246, receive details 1248 about, and delete 1250 a supply. Selecting details 1248 may provide the user with information such as which users are authorized to use the supply, which user ability levels are authorized to use the supply, the availability of the supply, and the location of the supply. A confirmation screen may be presented to the user when the delete link 1250 is selected. Selecting edit 1246 takes the user to the supply edit interface of FIG. 12C.

Figure 12C:
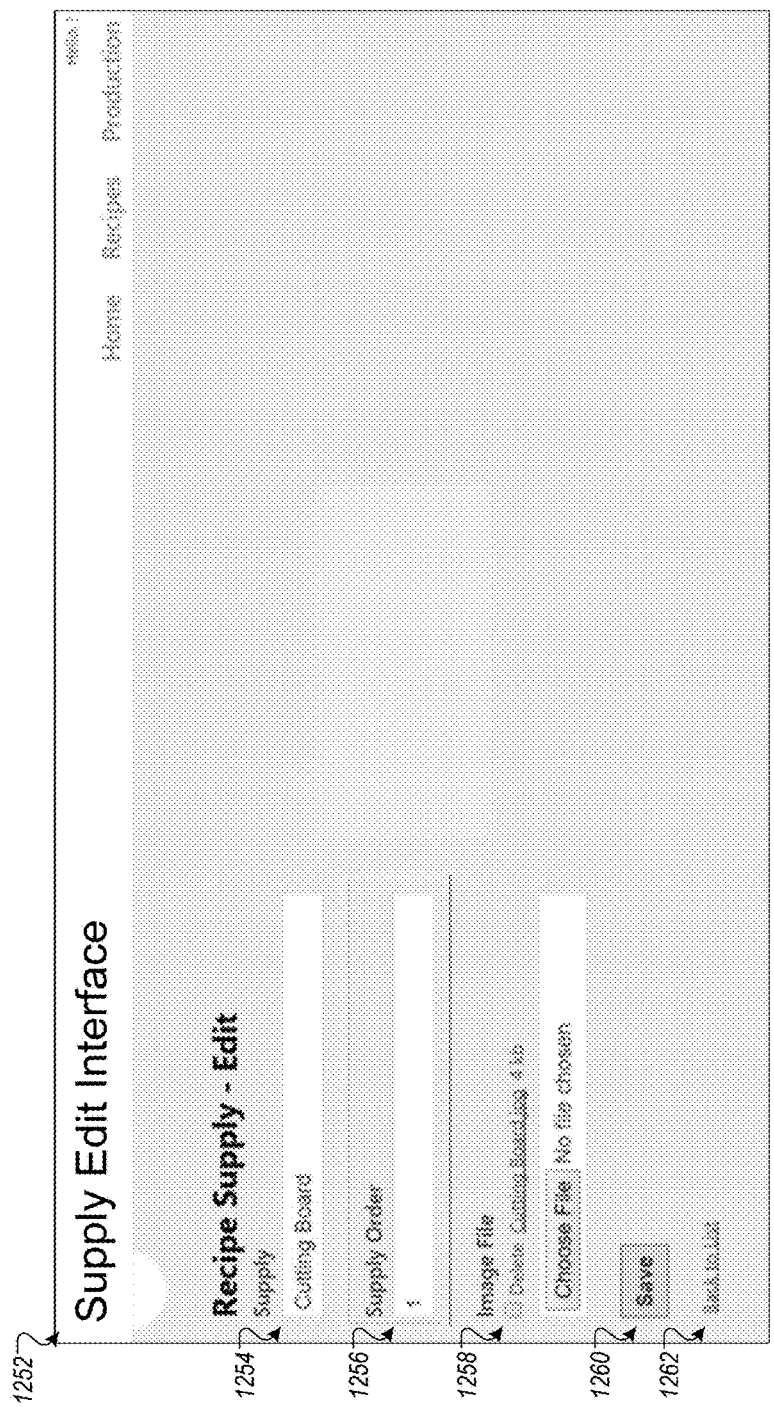

FIG. 12C depicts an example of the supply edit interface that allows a user to edit the supplies 1236 listed in the supply interface of FIG. 12B. The example supply edit interface depicted in FIG. 12C is based on selection of the first supply 1236 of FIG. 12B. The supply edit interface may also contain a header 1252 with title and navigable headings that represent types of jobs or lessons. The supply edit interface contains editable text for the supply name 1254 and supply order 1256. An image, video, animation, or audio file may be selected for association with the supply or deleted from association with the supply through a file selection area 1258. A save button 1260 is provided that when clicked applies changes to the editable text 1254, 1256 and file selection area 1258 and saves the updated supply record to the content repository 952, 974. A back button or link 1262 is also provided to return the user to the supply interface of FIG. 12B.

Figure 12D:
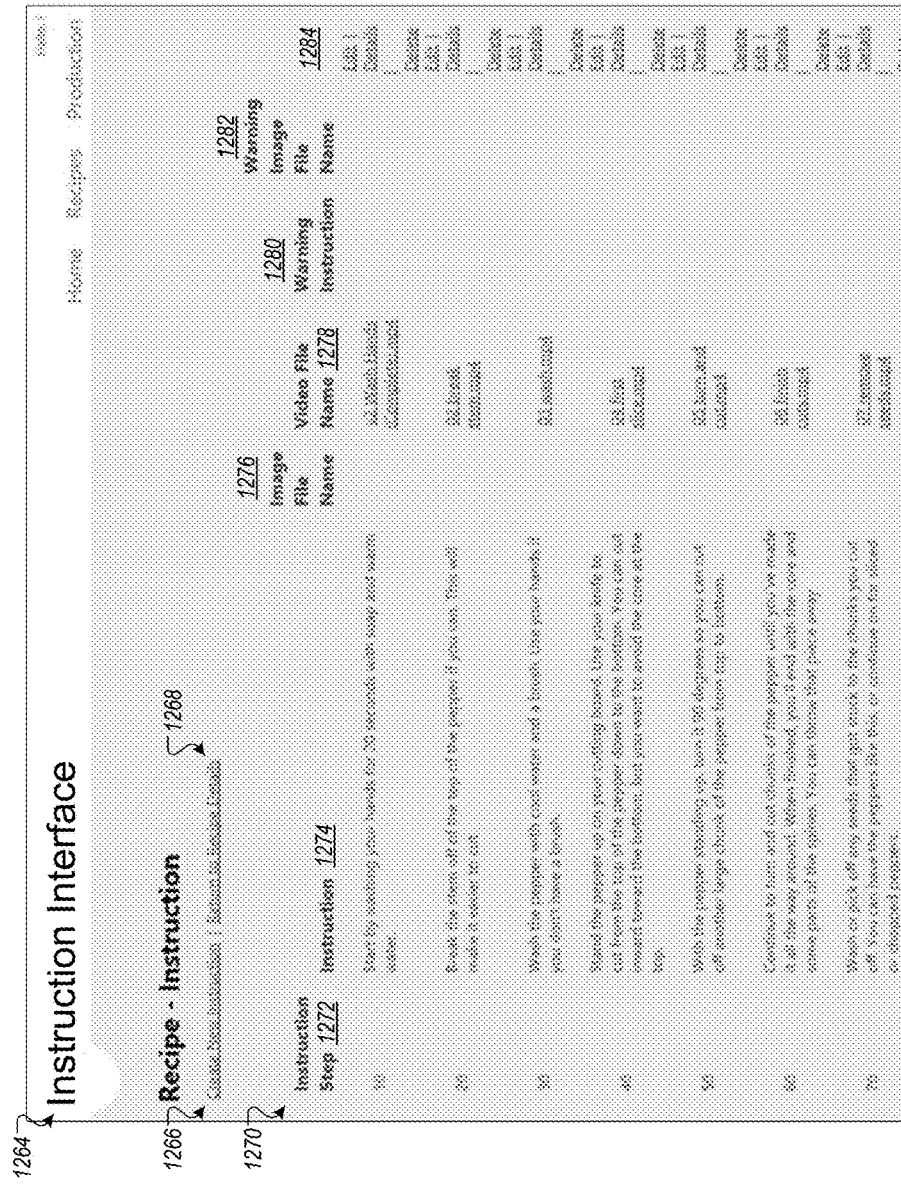

FIG. 12D depicts an example of the instruction interface. The instruction interface may contain a header 1264 with title and navigable headings that represent types of jobs or lessons. The supply interface also contains buttons or links 1266, 1268 to create a new instruction for the job or lesson and to navigate back to the job or lesson overview screen. The instruction interface contains a list of the instructions 1270 associated with the recipe 1226. The list of instructions contains an indication of the order 1272 in which to present the instructions to the user, the instruction text 1274, an image file 1276 associated with the instruction, a video file 1278 associated with the instruction, a warning 1280 associated with the instruction, and a warning image 1282 associated with the instruction. The image file 1276, video file 1280, and warning image 1282 may be selectable such that the image or video is displayed upon selection. The display may be an overlay on top of the instruction interface. The instruction interface also provides the ability to edit, receive details about, and delete an instruction 1284. Selecting details may provide the user with information such as which user ability levels are associated with the instruction and supplies related to the instruction. A confirmation screen may be presented to the user when the delete link is selected. Selecting edit takes the user to the instruction edit interface of FIG. 12E.

Figure 12E:
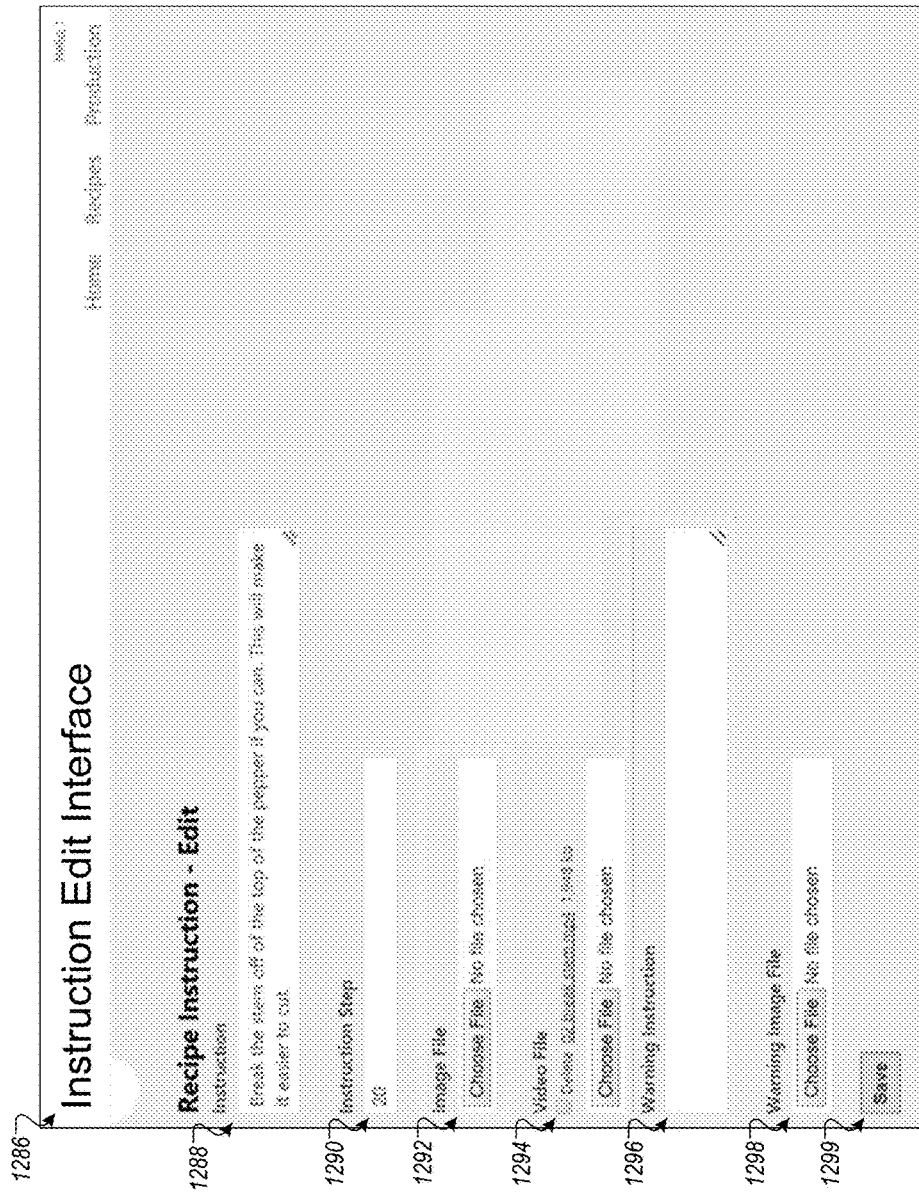

FIG. 12E depicts an example of the instruction edit interface that allows a user to edit the instructions 1270 listed in the instruction interface of FIG. 12D. The example instruction edit interface depicted in FIG. 12C is based on selection of the second instruction 1270 of FIG. 12D. The instruction edit interface may also contain a header 1286 with title and navigable headings that represent types of jobs or lessons. The instruction edit interface contains editable text for the instruction text 1288 and warning instruction 1296. The instruction interface also provides for modifying the instruction order 1290. An image, animation, or audio file may be selected for association with the instruction or deleted from association with the instruction through a file selection area 1292. A video file may be selected for association with the instruction or deleted from association with the instruction through a video file selection area 1294. A warning image file may be selected for association with the instruction or deleted from association with the instruction through a warning file selection area 1298. The file selection area 1292, video file selection area 1294, and warning file selection area 1298 may provide selectable links to view the file or video file. A save button 1299 is provided that when clicked applies changes to the instruction text 1288, instruction order 1290, file selection area 1292, video file selection area 1294, warning instruction text 1296, and warning file 1298 and saves the updated supply record to the content repository 952, 974. A back button or link may also be provided to return the user to the instruction interface of FIG. 12D.

Figure 8:
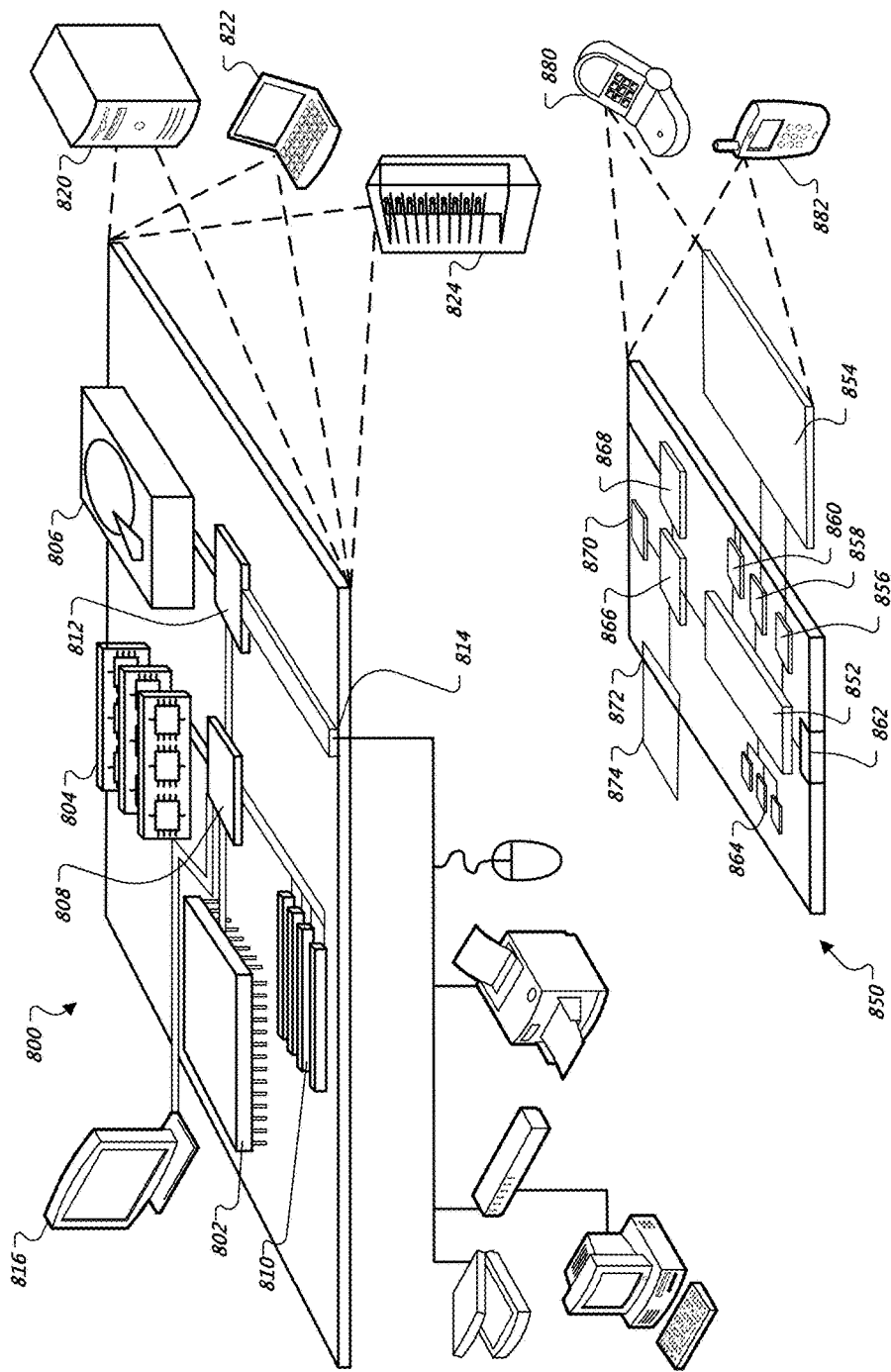
FIG. 8 is a block diagram of example computing devices.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor 852 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for providing interactive surfaces may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving, at a computing device with a touchscreen display, first user input that selects a particular interactive presentation from among a plurality of interactive presentations, wherein each of the plurality of interactive presentations provides step by step instructions on how to perform a task in a user interface that is configured for users with disabilities, the first user input being provided by a user with one or more disabilities;
accessing, by the computing device and in response to receiving the first user input, content for the particular interactive presentation and rules for presenting the user interface in a manner that is configured for users with disabilities, wherein the rules are selected from among a predetermined group of rules for the particular user with the one or more disabilities;
identifying, by the computing device and from the content, materials for performing a particular task that is depicted in the particular interactive presentation, wherein the materials are associated with, at least, (i) digital images that depict the materials and (ii) first text that corresponds to names for the materials;
identifying, by the computing device and from the content, information identifying steps for the particular interactive presentation, wherein the steps are associated with (i) videos depicting the steps, (ii) second text describing the steps, and (iii) warning codes that identify potential physical dangers associated with the steps when performed by the user with the one or more disabilities, wherein the first text is different from the second text, and the materials are different from the steps;
accessing, by the computing device, (i) the digital images, (ii) the first text, (iii) the videos, (iv) the second text, and (v) the warning codes;
identifying, by the computing device and based on the rules, a minimum image size for the digital images, a minimum video size for the videos, a minimum spacing between the visual elements in the user interface, and a minimum font size for the first text, wherein the image size, the minimum video size, the minimum spacing, and the minimum font size being identified using the rules so that the user interface presents content in a manner that is suitable for the one or more disabilities of the user;
displaying, by the computing device in a first screen of the user interface and before presenting any of the steps, (i) the digital images sized according to the minimum image size and arranged apart from each other by at least the minimum spacing, (ii) the first text using the minimum font size and adjacent to and separated from corresponding ones of the digital images with at least the minimum spacing, and (iii) a selectable button to begin the particular presentation separated from the digital images and the first text by at least the minimum spacing, wherein the digital images are presented in association with selectable areas on the touchscreen display;
receiving, through the touchscreen display of the computing device, a selection of the selectable button;
displaying, by the computing device in a second screen of the user interface and after displaying the first screen, (i) a first video, from the videos, with at least the minimum video size, (ii) a portion of the second text corresponding to the first video, (iii) a warning image associated with a warning code that identifies the potential physical dangers to which the user with the one or more disabilities will be exposed by following the steps for the first video, and (iv) a return button to return to a first step of the particular interactive presentation, wherein the second screen is different from the first screen and is presented without any of the digital images, the first text, or the selectable button included in the first screen;
receiving, through the touchscreen display of the computing device, a selection of an area on the touchscreen corresponding to the first video; and
playing, on the touchscreen display of the computing device and in response to the selection of the area on the touchscreen, the first video.

2. The computer-implemented method of claim 1, further comprising:
receiving, through the touchscreen display of the computing device, a selection of a particular area that is associated with a particular one of the digital images; and audibly outputting, using one or more speakers that are associated with the computing device, a verbal pronunciation of a portion of the first text that is associated with the selected one of the digital images.

3. The computer-implemented method of claim 1, wherein the first video, the portion of the second text, the warning image, and the repeat button are separated from each other by at least the minimum spacing.

4. The computer-implemented method of claim 1, wherein the rules related to the minimum image size for the digital images, the minimum video size for the videos, the minimum spacing between the visual elements in the user interface, and the minimum font size for the first text correspond to one or more user ability levels.

5. The computer implemented method of claim 4, wherein the one or more user-ability levels are comprised of one or more of motor ability, cognitive ability, speaking ability, and audiological ability.

6. The computer-implemented method of claim 1, wherein the first user input comprises a touch input.

7. The computer-implemented method of claim 1, wherein the minimum image size comprises a minimum area of the display screen.

8. The computer implemented method of claim 1, wherein the selection of the selectable button comprises detecting touch-based input in a selectable area on the touchscreen that corresponds to the selectable button.

9. The computer implemented method of claim 8, wherein the selectable area is larger than the selectable button.

10. The computer implemented method of claim 9, wherein a policy comprised of one or more of a presentation rule and a user profile defines a relative positioning of the selectable area on the touchscreen with regard to a location at which the selectable button is displayed.

11. A computing device comprising:
a touchscreen display;
one or more processors;
memory storing instructions that, when executed, cause the one or more processors to perform operations comprising:
receiving first user input that selects a particular interactive presentation from among a plurality of interactive presentations, wherein each of the plurality of interactive presentations provides step by step instructions on how to perform a task in a user interface that is configured for users with disabilities, the first user input being provided by a user with one or more disabilities;
accessing, in response to receiving the first user input, content for the particular interactive presentation and rules for presenting the user interface in a manner that is configured for users with disabilities, wherein the rules are selected from among a predetermined group of rules for the particular user with the one or more disabilities;
identifying, from the content, materials for performing a particular task that is depicted in the particular interactive presentation, wherein the materials are associated with, at least, (i) digital images that depict the materials and (ii) first text that corresponds to names for the materials;
identifying, from the content, information identifying steps for the particular interactive presentation, wherein the steps are associated with (i) videos depicting the steps, (ii) second text describing the steps, and (iii) warning codes that identify potential physical dangers associated with the steps when performed by the user with the one or more disabilities, wherein the first text is different from the second text, and the materials are different from the steps;
accessing (i) the digital images, (ii) the first text, (iii) the videos, (iv) the second text, and (v) the warning codes;
identifying, based on the rules, a minimum image size for the digital images, a minimum video size for the videos, a minimum spacing between the visual elements in the user interface, and a minimum font size for the first text, wherein the image size, the minimum video size, the minimum spacing, and the minimum font size being identified using the rules so that the user interface presents content in a manner that is suitable for the one or more disabilities of the user;
displaying, in a first screen of the user interface and before presenting any of the steps, (i) the digital images sized according to the minimum image size and arranged apart from each other by at least the minimum spacing, (ii) the first text using the minimum font size and adjacent to and separated from corresponding ones of the digital images with at least the minimum spacing, and (iii) a selectable button to begin the particular presentation separated from the digital images and the first text by at least the minimum spacing, wherein the digital images are presented in association with selectable areas on the touchscreen display;
receiving, through the touchscreen display, a selection of the selectable button;
displaying, in a second screen of the user interface and after displaying the first screen, (i) a first video, from the videos, with at least the minimum video size, (ii) a portion of the second text corresponding to the first video, (iii) a warning image associated with a warning code that identifies potential physical dangers to which the user with the one or more disabilities will be exposed by following the steps for the first video, and (iv) a return button to return to a first step of the particular interactive presentation, wherein the second screen is different from the first screen and is presented without any of the digital images, the first text, or the selectable button included in the first screen;
receiving, through the touchscreen display, a selection of an area on the touchscreen corresponding to the first video; and
playing, on the touchscreen display and in response to the selection of the area on the touchscreen, the first video.

12. The computing device of claim 11, further comprising:
one or more audio speakers;
wherein the processor is further programmed to:
receive, through the touchscreen display, a selection of a particular area that is associated with a particular one of the digital images; and
audibly output, using the one or more speakers, a verbal pronunciation of a portion of the first text that is associated with the selected one of the digital images.

13. The computing device of claim 11, wherein the first video, the portion of the second text, the warning image, and the repeat button are separated from each other by at least the minimum spacing.

14. The computing device of claim 11, wherein the rules related to the minimum image size for the digital images, the minimum video size for the videos, the minimum spacing between the visual elements in the user interface, and the minimum font size for the first text correspond to one or more user ability levels.

15. The computing device of claim 14, wherein the one or more user-ability levels are comprised of one or more of motor ability, cognitive ability, speaking ability, and audiological ability.

16. The computing device of claim 11, wherein the first user input comprises a touch input.

17. The computing device of claim 11, wherein the minimum image size comprises a minimum area of the display screen.

18. The computing device of claim 11, wherein the selection of the selectable button comprises detecting touch-based input in a selectable area on the touchscreen that corresponds to the selectable button.

19. The computing device of claim 18, wherein the selectable area is larger than the selectable button.

20. The computing device of claim 19, wherein a policy comprised of one or more of a presentation rule and a user profile defines a relative positioning of the selectable area on the touchscreen with regard to a location at which the selectable button is displayed.

\* \* \* \* \*